(12) United States Patent
Shank et al.

(10) Patent No.: US 7,657,961 B2
(45) Date of Patent: Feb. 9, 2010

(54) VEHICLE WINDSHIELD CLEANING SYSTEM

(75) Inventors: David Shank, Hersey, MI (US); John Washeleski, Cadillac, MI (US); Peter Strom, Big Rapids, MI (US)

(73) Assignee: SBR Investments Company LLC, Birmingham, MI (US)

( * ) Notice: Subject to any disclaimer, the term of this patent is extended or adjusted under 35 U.S.C. 154(b) by 163 days.

(21) Appl. No.: 11/688,289

(22) Filed: Mar. 20, 2007

(65) Prior Publication Data

US 2007/0284457 A1   Dec. 13, 2007

Related U.S. Application Data

(63) Continuation-in-part of application No. 11/341,116, filed on Jan. 27, 2006, now Pat. No. 7,588,194, which is a continuation-in-part of application No. 10/894,266, filed on Jul. 19, 2004, which is a continuation-in-part of application No. 10/653,827, filed on Sep. 3, 2003, now Pat. No. 6,902,118, which is a continuation-in-part of application No. 10/269,647, filed on Oct. 11, 2002, now Pat. No. 6,851,624.

(60) Provisional application No. 60/551,571, filed on Mar. 9, 2004, provisional application No. 60/415,552, filed on Oct. 2, 2002.

(51) Int. Cl.
*B60S 1/46* (2006.01)
*B60S 1/48* (2006.01)
*B05B 1/24* (2006.01)
*B05B 17/04* (2006.01)
*B05B 1/10* (2006.01)

(52) U.S. Cl. .............. 15/250.02; 15/250.01; 239/130; 239/284.1; 239/284.2; 239/135; 392/465; 392/478; 392/480; 392/488

(58) Field of Classification Search .. 15/250.01–250.05, 15/250.3; 239/130, 284.1, 284.2, 135, 128, 239/139; 392/465, 478, 480, 488
See application file for complete search history.

(56) References Cited

U.S. PATENT DOCUMENTS 2,005,581 A * 6/1935 Gary et al. ............... 15/250.01

(Continued)

FOREIGN PATENT DOCUMENTS

EP   0 219 126 A2   4/1987

(Continued)

OTHER PUBLICATIONS

International Search Report and Written Opinion (8 pages) for International Application No. PCT/US08/07878, mailing date Sep. 29, 2008.

*Primary Examiner*—Gary K Graham
(74) *Attorney, Agent, or Firm*—Tarolli, Sundheim, Covell & Tummino LLP

(57) ABSTRACT

Apparatus and method for providing a heated cleaning fluid to a vehicle surface. The apparatus has an inlet port for receiving an amount of fluid; an outlet port for dispensing an amount of heated fluid; a heating element coil or tube covered with a plastic sheath that heats up fluid passing from the inlet to the outlet; and a control circuit for energizing at least a portion of the heating element with a voltage to heat the fluid passing from the inlet to the outlet. The apparatus also has expandable and compressible features and parts for protection against freezing.

6 Claims, 37 Drawing Sheets

U.S. PATENT DOCUMENTS

| | | | |
|---|---|---|---|
| 3,148,399 A * | 9/1964 | Ziogler | 15/250.02 |
| 3,610,781 A * | 10/1971 | Kolb et al. | 417/319 |
| 4,090,668 A | 5/1978 | Kochenour | |
| 4,233,494 A | 11/1980 | Pawlik et al. | |
| 5,012,977 A | 5/1991 | Karklins et al. | |
| 5,203,602 A * | 4/1993 | Eustache | 296/96.15 |
| 5,271,120 A * | 12/1993 | Eustache et al. | 15/250.01 |
| 5,354,965 A | 10/1994 | Lee | |
| 5,509,606 A | 4/1996 | Breithaupt et al. | |
| 5,561,882 A * | 10/1996 | Eustache et al. | 15/250.001 |
| 5,927,608 A | 7/1999 | Scorsiroli | |
| 5,957,384 A | 9/1999 | Lansinger | |
| 6,029,908 A | 2/2000 | Petzold | |
| 6,032,324 A | 3/2000 | Lansinger | |
| 6,133,546 A | 10/2000 | Bains | |
| 6,164,564 A | 12/2000 | Franco et al. | |
| 6,364,010 B1 | 4/2002 | Richman et al. | |
| 6,465,765 B2 | 10/2002 | Katayama et al. | |
| 6,601,776 B1 | 8/2003 | Oljaca et al. | |
| 6,615,438 B1 | 9/2003 | Franco et al. | |
| 6,669,109 B2 | 12/2003 | Ivanov et al. | |
| 6,892,417 B2 | 5/2005 | Franco et al. | |
| 6,952,524 B2 | 10/2005 | Bissonnette et al. | |
| 7,108,754 B2 | 9/2006 | Franco et al. | |
| 7,128,136 B2 | 10/2006 | Gregory | |
| 2002/0137455 A1 | 9/2002 | Ivanov et al. | |
| 2003/0141381 A1 | 7/2003 | Bissonnette | |
| 2004/0226127 A1 | 11/2004 | Kaplan | |
| 2005/0083638 A1 | 4/2005 | Warren et al. | |
| 2006/0196448 A1 | 9/2006 | Hayworth et al. | |

FOREIGN PATENT DOCUMENTS

| | | | |
|---|---|---|---|
| EP | 0489630 | * | 6/1992 |
| EP | 1 213 197 A | | 6/2002 |
| FR | 2 763 549 A | | 11/1998 |
| GB | 2 253 339 A | | 9/1992 |
| WO | WO 98/58826 A | | 12/1998 |
| WO | WO 02/092237 A | | 11/2002 |

* cited by examiner

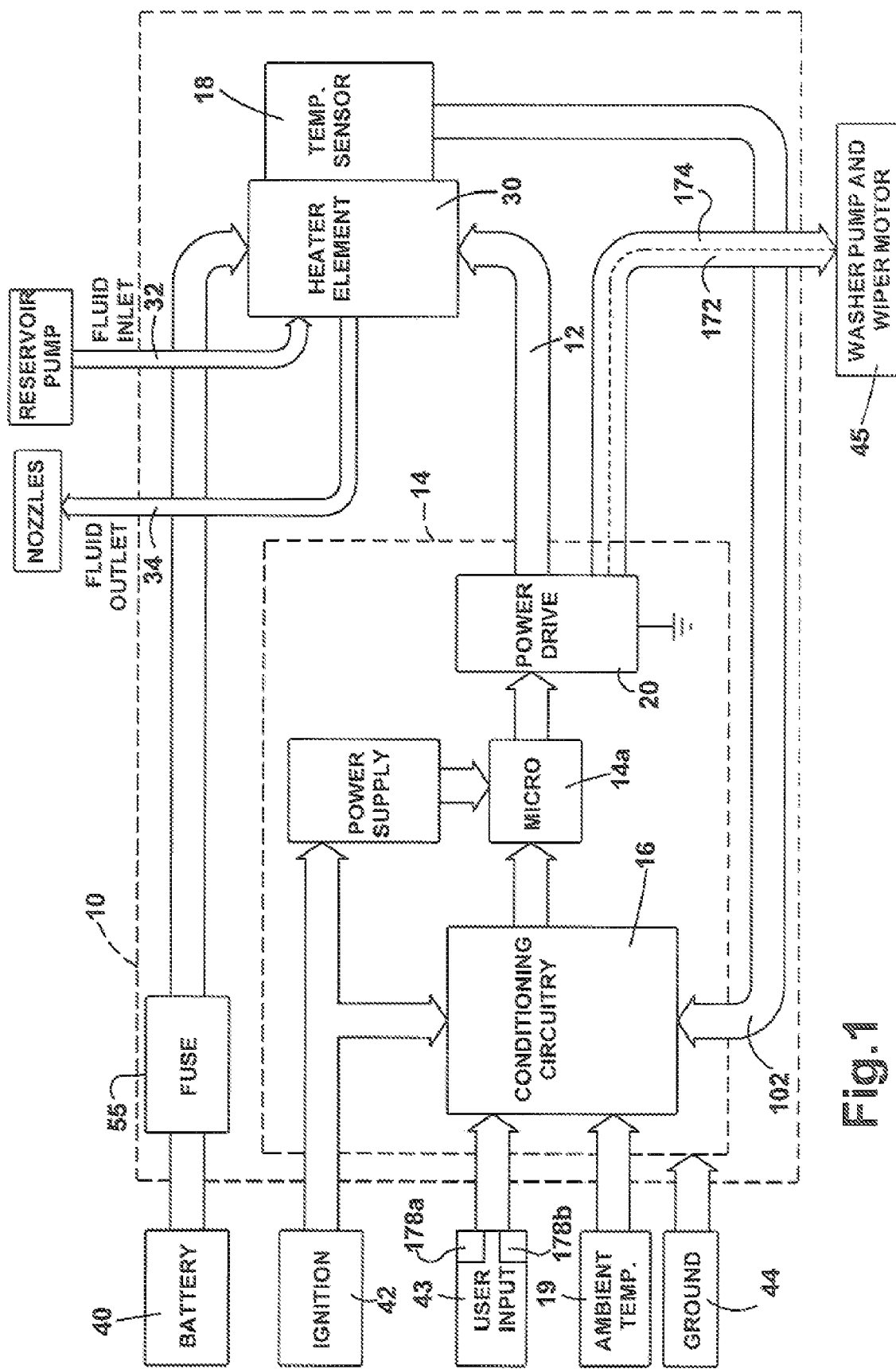

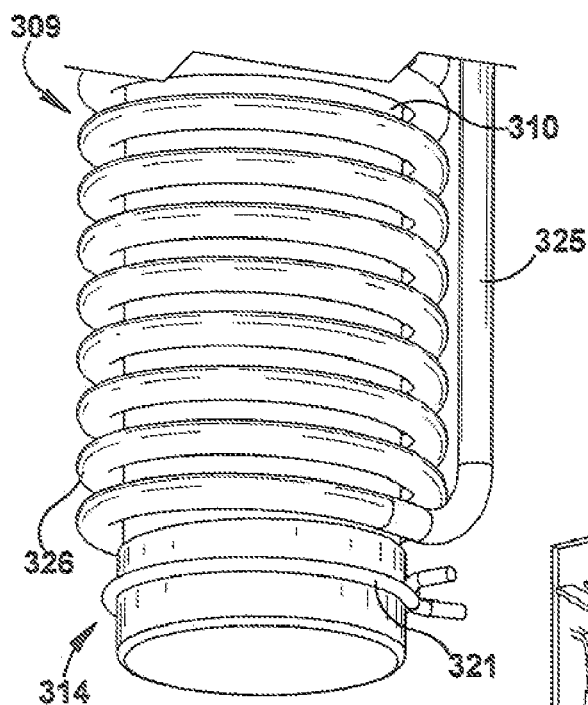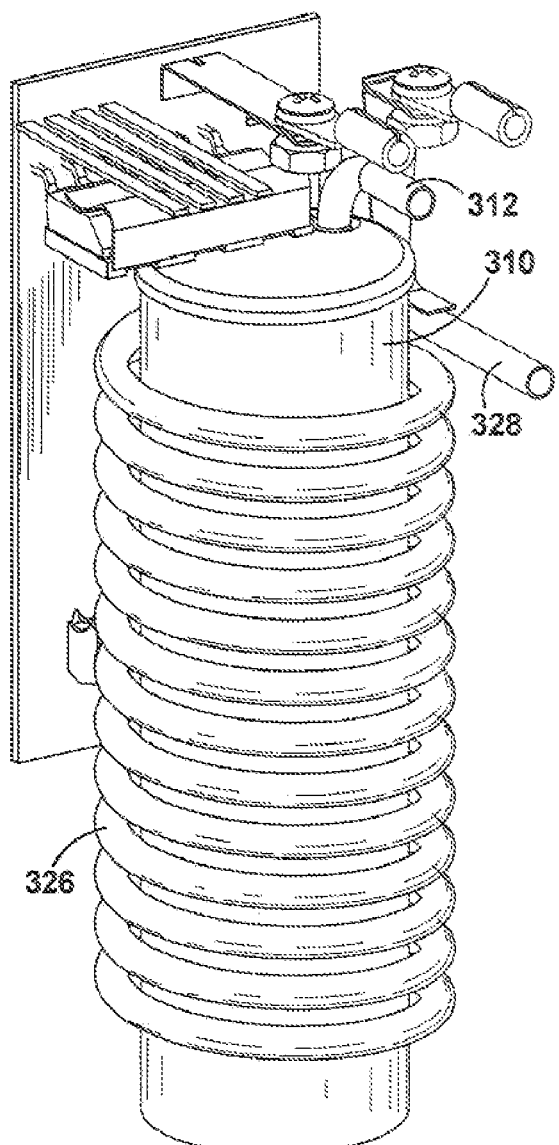

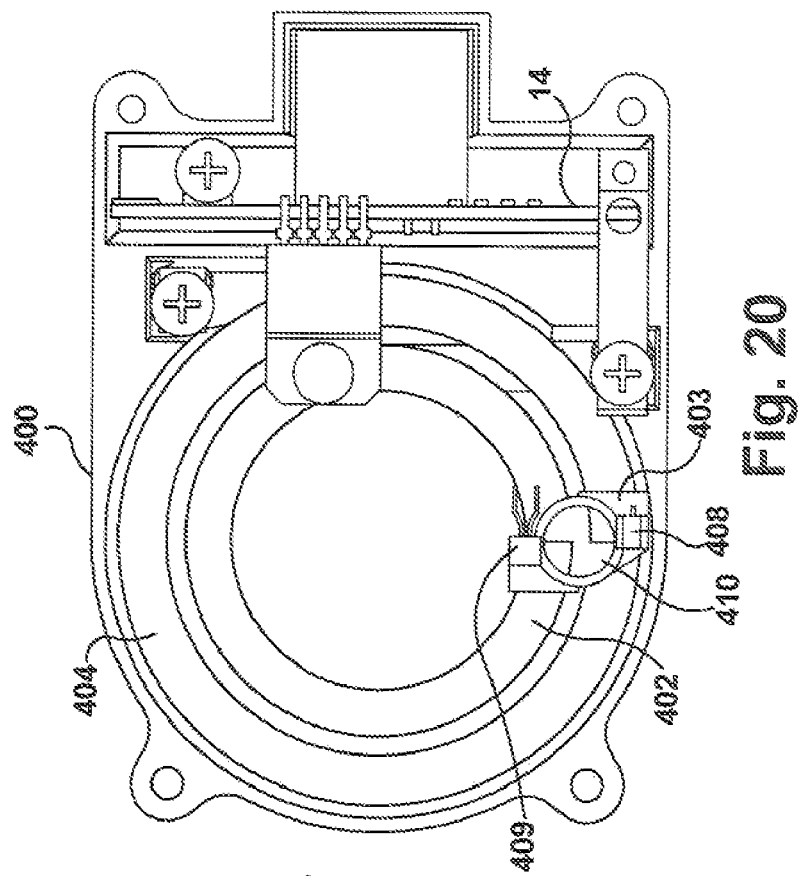
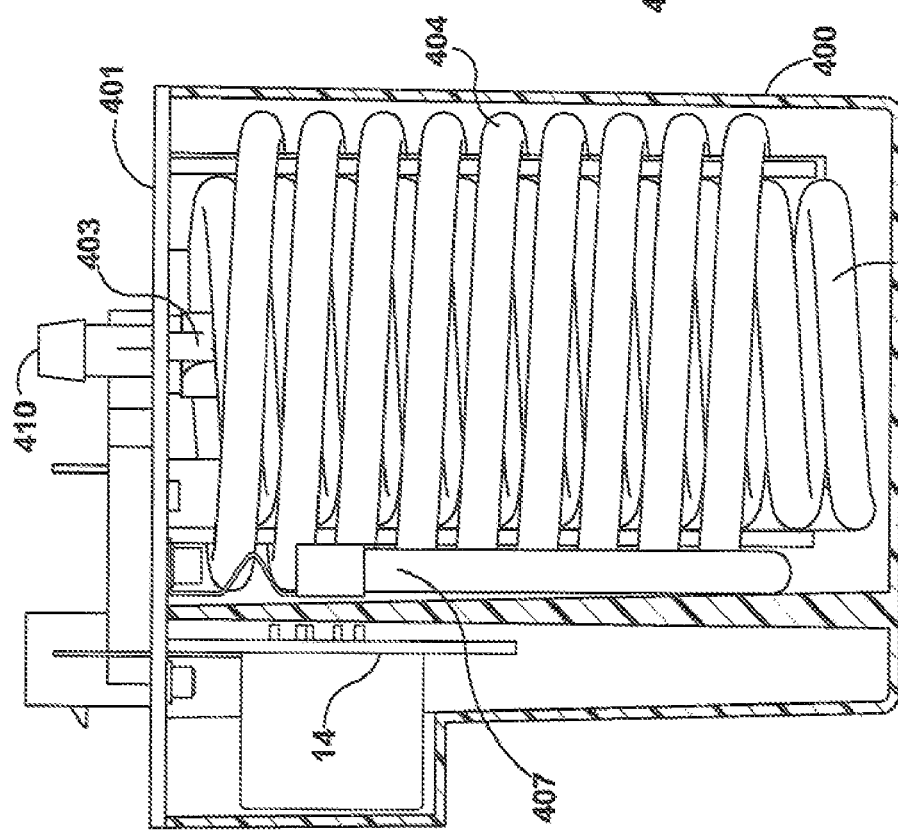

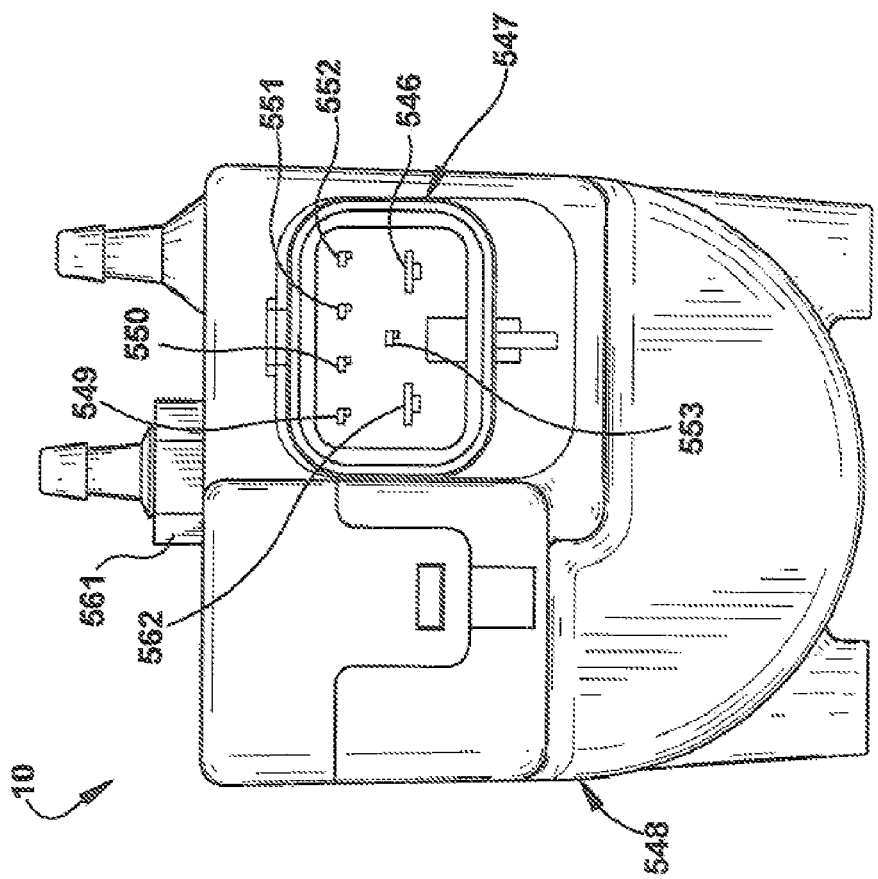
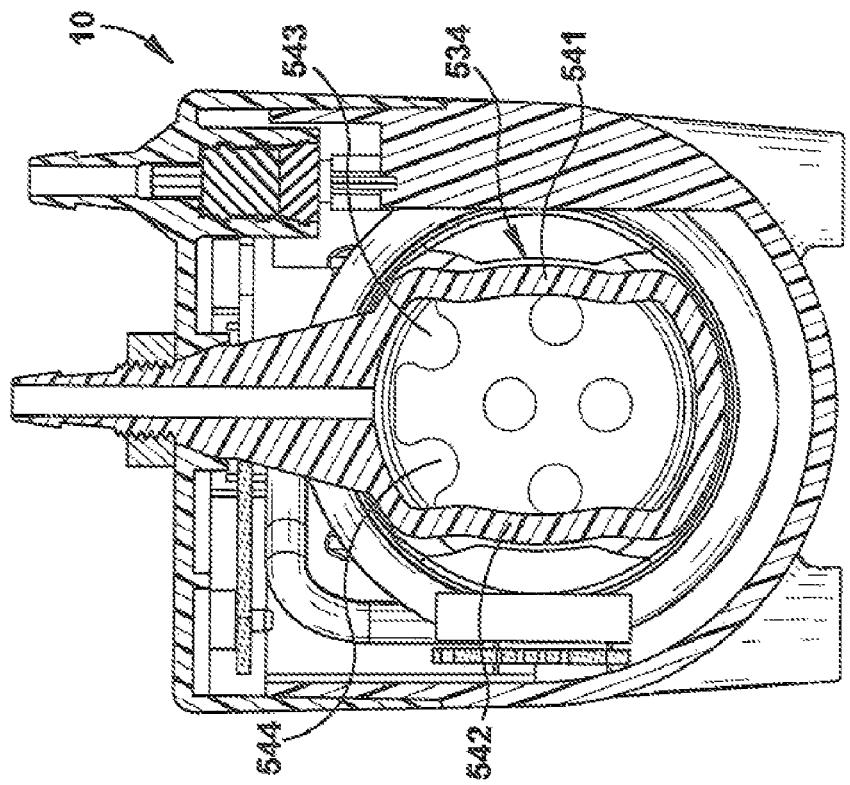

VEHICLE WINDSHIELD CLEANING SYSTEM

RELATE BACK

The present invention is a continuation in part of co-pending application Ser. No. 11/341,116 filed Jan. 27, 2006 which is a continuation in part of application Ser. No. 10/894,266, filed Jul. 19, 2004 (claiming priority from provisional application 60/551,571), which is a continuation in part of application Ser. No. 10/653,827 filed on Sep. 3, 2003, now U.S. Pat. No. 6,902,118 which is a continuation in part of U.S. Ser. No. 10/269,647 filed Oct. 11, 2002 (claiming priority from U.S. provisional application 60/415,552), now U.S. Pat. No. 6,851,624, all of which are incorporated herein by reference and from which priority is claimed.

FIELD OF THE INVENTION

The present invention concerns a windshield cleaning system, and more particularly to a windshield cleaning system that heats cleaning fluid applied to the windshield.

BACKGROUND ART

U.S. Pat. No. 6,364,010 entitled "Device to Provide Heated Washer Fluid" to Richman et al. concerns an apparatus and method for improving the cleaning and deicing effectiveness of a washer fluid in a motor vehicle before spraying it against a windshield, headlamps, etc, and utilizes the heat from the engine coolant to elevate the temperature of the washer fluid. U.S. Pat. Nos. 5,957,384 and 6,032,324 also concern de-icing of a windshield.

SUMMARY OF THE INVENTION

The invention concerns apparatus and method for providing a large amount of heated cleaning fluid to a vehicle surface. A system constructed with an exemplary embodiment of the invention has an inlet port for receiving an amount of fluid; an outlet port for dispensing an amount of heated fluid; a heating element that heats up fluid passing from the inlet to the outlet; and a control circuit for energizing at least a portion of the heating element with a voltage to heat the fluid passing from the inlet to the outlet.

In one exemplary embodiment, the system provides heated cleaning fluid to a vehicle surface and includes structure defining an inlet port for receiving an amount of fluid, an outlet port in fluid communication with the reservoir for dispensing an amount of heated fluid; and a metal heating coil for heating fluid that passes from the inlet to the outlet. The exemplary heater coil is covered by an elastic material for containing fluid in the event of a ruptured heating element caused by one or more freeze/thaw expansion and contraction cycles. A control circuit for energizing at least a portion of the metal heating coil with a voltage to heat the heating element and the fluid passing from the inlet to the outlet.

In accordance with another feature apparatus for providing a heated cleaning fluid to a motor vehicle surface includes a heating vessel having an interior and an inlet and outlet port. Heating fluid passes from the inlet to the outlet through the vessel. A controller has an energizing component for heating fluid passing from the inlet to the outlet, and an integral wiper motor control for actuating a motor vehicle surface wiper.

These and other objects advantages and features of the invention will become better understood from the following detailed description of one exemplary embodiment of the present invention which is described in conjunction with the accompanying drawings.

BRIEF DESCRIPTION OF THE DRAWINGS

FIG. 1 is a block diagram schematic of a representative system for use with the present invention;

FIG. 10 is a perspective view of a heating assembly including the heating element illustrated in FIG. 11, and a freeze expansion feature including a freeze expansion boot and a freeze expansion boot clamp;

FIG. 11 is a perspective view of top portion of the heating assembly of FIG. 10;

FIGS. 18 and 19 are front and back elevation views of the FIG. 17 embodiment of a washer control system that addresses concerns about excessive fluid pressure drop caused by flow through a continuous heater coil;

FIG. 20 is a top plan view of the washer control system of FIG. 17 with a top cover removed;

FIG. 31 is an end sectional view of a heating assembly shown in FIG. 28;

FIG. 32 is an end sectional view of a heating assembly shown in FIG. 28;

EXEMPLARY EMBODIMENT FOR PRACTICING THE INVENTION

The drawings depict embodiments of the present invention that concern a washer control system 10 for use with a vehicle. In the disclosed exemplary embodiments of the invention, the control system 10 is used in conjunction with a windshield washer apparatus. The control system 10 includes a control circuit 14 that includes an electronic output drive signal circuit 20 and an input signal interpretation or conditioning circuit 16.

Figure 1A:
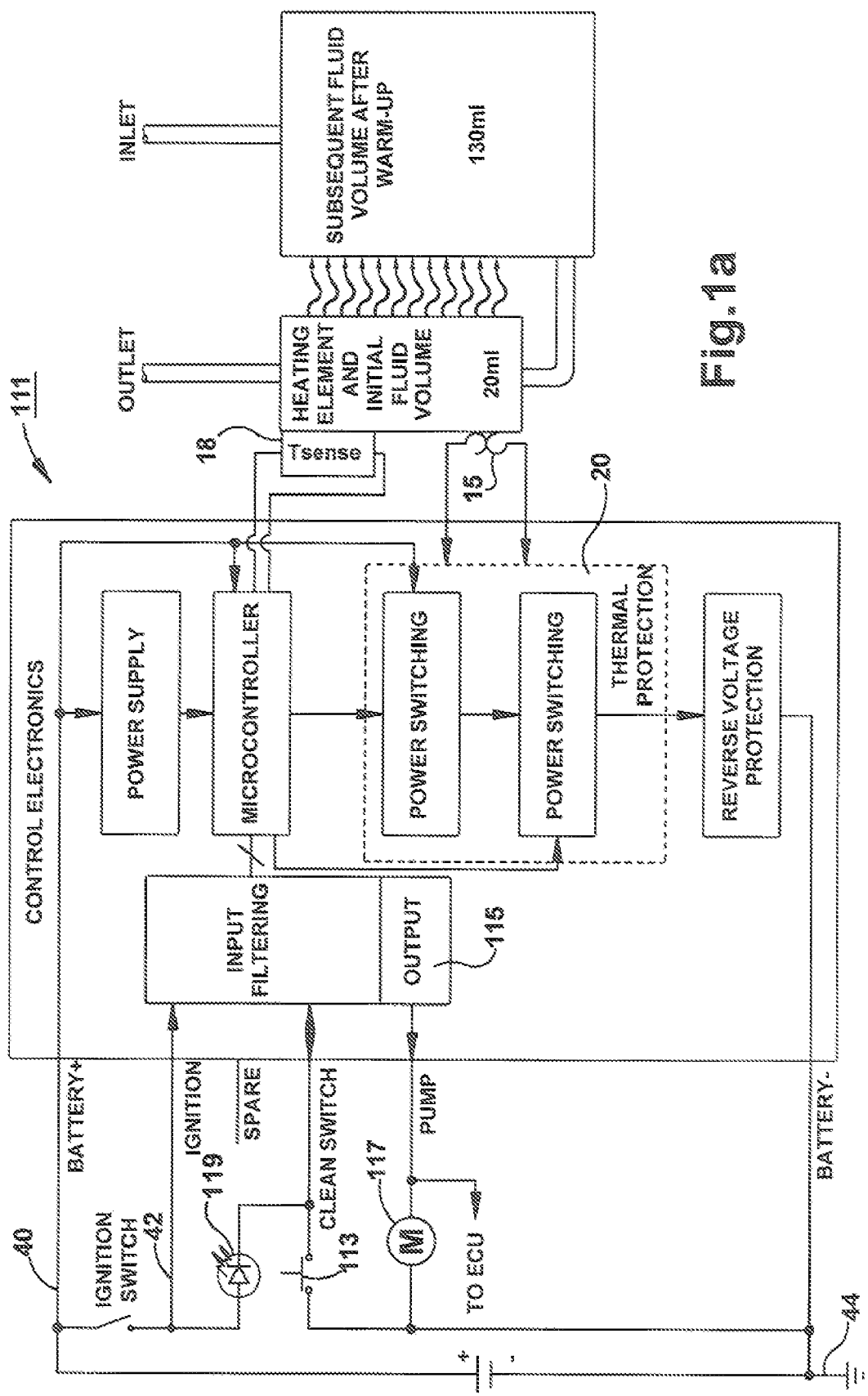
FIG. 1a is an alternate block diagram schematic of a representative system for use with the present invention.

The input signal interpretation circuit 16 electronically interfaces with at least one temperature sensor 18. In one embodiment of the invention, the temperature sensor provides output signals related to the temperature of the washer fluid supplied to windshield spray nozzles on the vehicle. In one embodiment of the invention, the control system also includes an electronic output circuit that drives output power control for at least one heating element 30 that applies heat to the windshield washer fluid. The illustrated module output is a "low side" type drive, meaning the module activates and deactivates the heater element by controlling the electrical circuit path to ground. In accordance with an alternate control system, an electronic output coupled to a vehicular communication bus makes available data for system diagnostics. An alternate control system could have an output drive that is a "high side" type. Another alternate control system could have both "high side" and "low side" type drives working together as illustrated in FIG. 1a.

The control circuit 14 includes a programmable controller 14a that implements control algorithms for washer heater control output functions in response to vehicle input signals. As seen in the functional schematic of FIG. 1, the control system 10 includes an electronic output 12 from the control circuit 14 for providing controlled current to the heating element 30. The control circuit 14 also includes an input signal interpretation circuit 16, or interface, to monitor input signals from, as one example, the temperature sensor 18. The temperature sensor 18 provides signals that allow for control of the amount of power delivered to the heating element 30. The controller monitors inputs from a vehicle battery 40 and vehicle ignition 42. In accordance with an alternate embodiment, the controller also monitors ambient temperature by means of the temperature sensor 19. In accordance with another alternate embodiment as illustrated in functional schematic of FIG. 1a, the controller also monitors a user input and drives a vehicle washer fluid pump 45a (FIG. 7) having a pump motor 117.

The control system also includes an electronic output circuit 20 to control power coupled to at least one heater element 30. In the embodiment, the heater element 30 heats windshield washer fluid as the fluid passes through the heating element 30. A heating element that windshield washer fluid flows through, rather than a heating element that is submersed in the washer fluid, minimizes the formation and/or size of mineral deposits that could potentially clog application nozzles 37. The illustrated heating element 30 includes a length of stainless steel tubing with electrical connections 60, 62 (FIG. 2) electrically coupled to ends of the tubing. The use of a stainless steel heating element, instead of a heating element made from another material such as aluminum, also minimizes the formation of nozzle clogging mineral deposits. For example, an aluminum reservoir exposed to an air pocket or dissolved oxygen might be susceptible to oxidation. After the aluminum oxides form to some depth, the washer fluid could act to break off the aluminum oxide. The aluminum oxide particles could flow to the nozzle, causing a clog. Agitation during movement of the vehicle would also cause pieces of the aluminum oxide to break off and flow to the nozzle 37.

Figure 2:
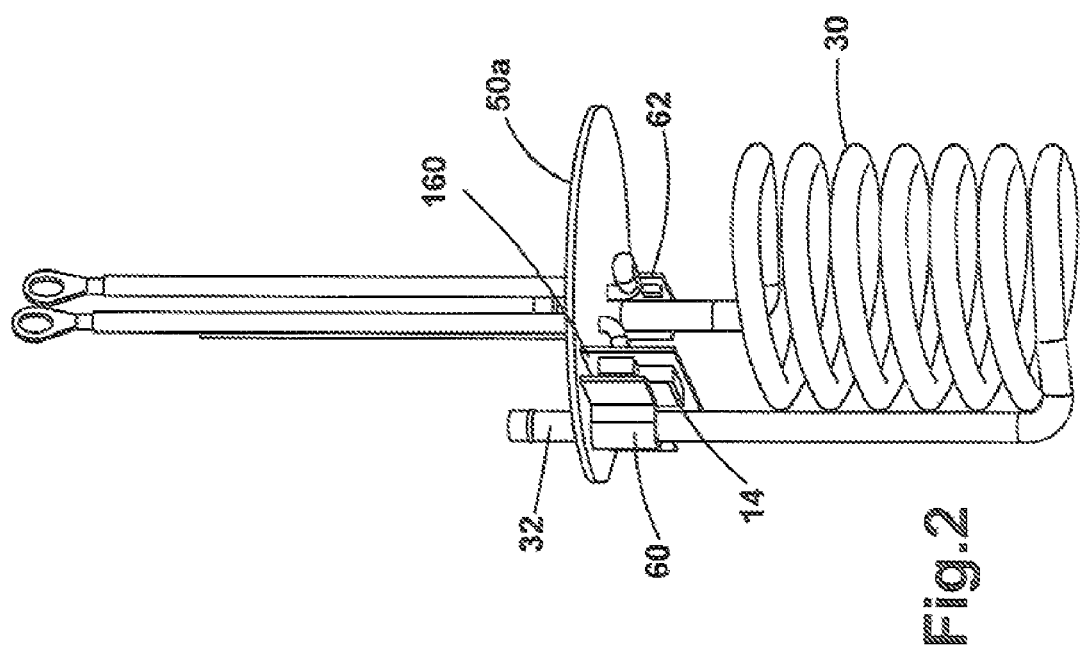
FIG. 2 is a perspective view of an embodiment of the invention showing a heating assembly without an outside housing.

As seen in the Figures the system has an inlet 32 and an outlet 34. The inlet receives washer fluid from a fluid reservoir 35 (FIG. 7) of a motor vehicle and the outlet 34 delivers heated washer fluid to nozzles 37 mounted to the vehicle which direct the washer fluid against the vehicle surface, typically a windshield, lamp etc. The heating element 30 can be constructed from other metals such as brass and the like having electrical resistivity properties such that they sufficiently resist current flow to generate the required heat. In FIG. 2 a stainless steel tube is shown coiled to reduce the overall size of the heating system. Alternative embodiments could have the heater element in other bent or un-bent shapes such as serpentine or straight tube configurations. The heating element of FIG. 2 has an uncoiled length of approximately 4 to 5 feet and is constructed of 5/16 inch diameter stainless steel tubing. When coiled to the configuration shown in FIG. 2 the coiled heating element has an inside diameter of 1 and 11/16 inch.

Figure 6:
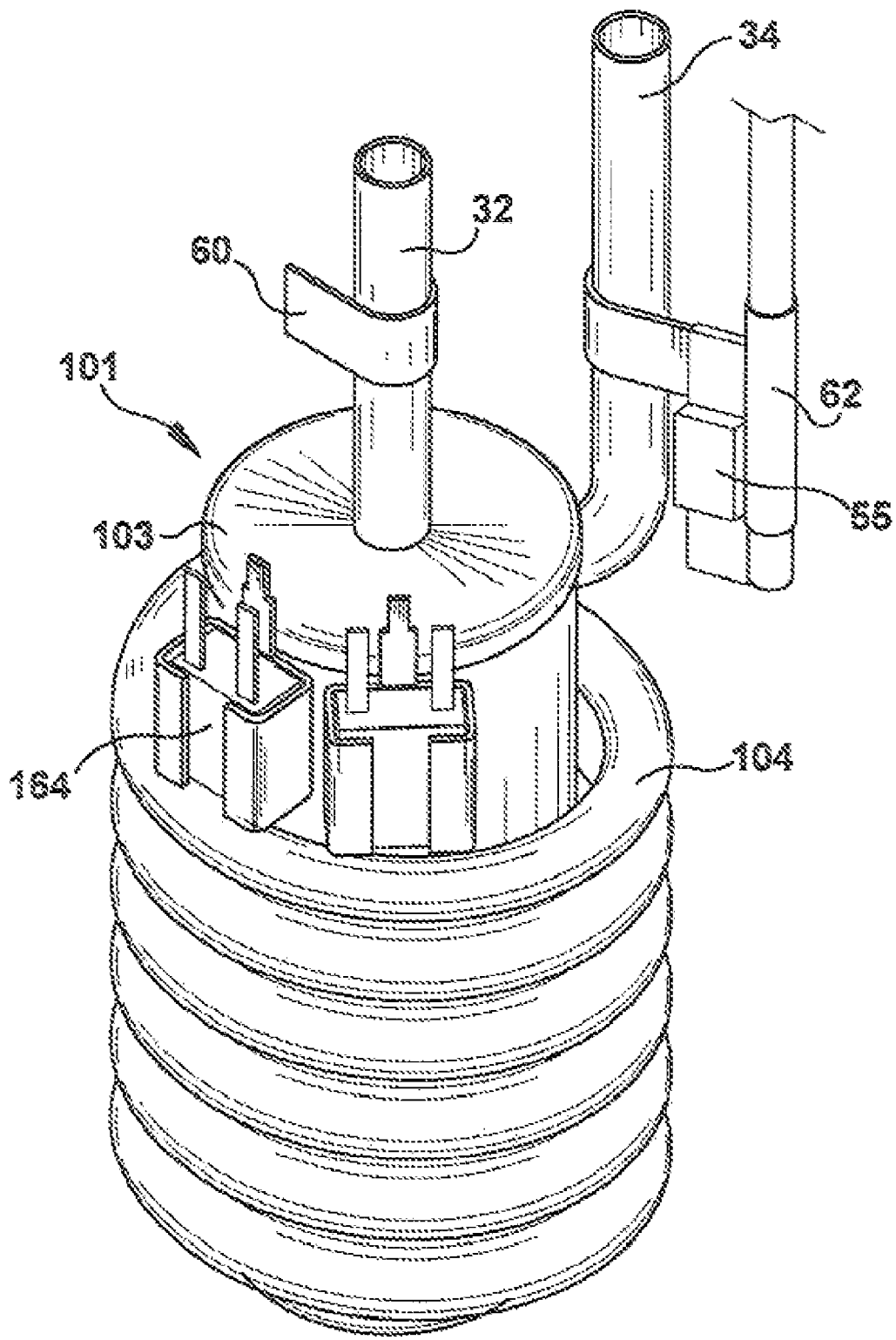
FIG. 6 is a perspective view of an alternative heating element from the heating element depicted in FIG. 2.
Figure 7:
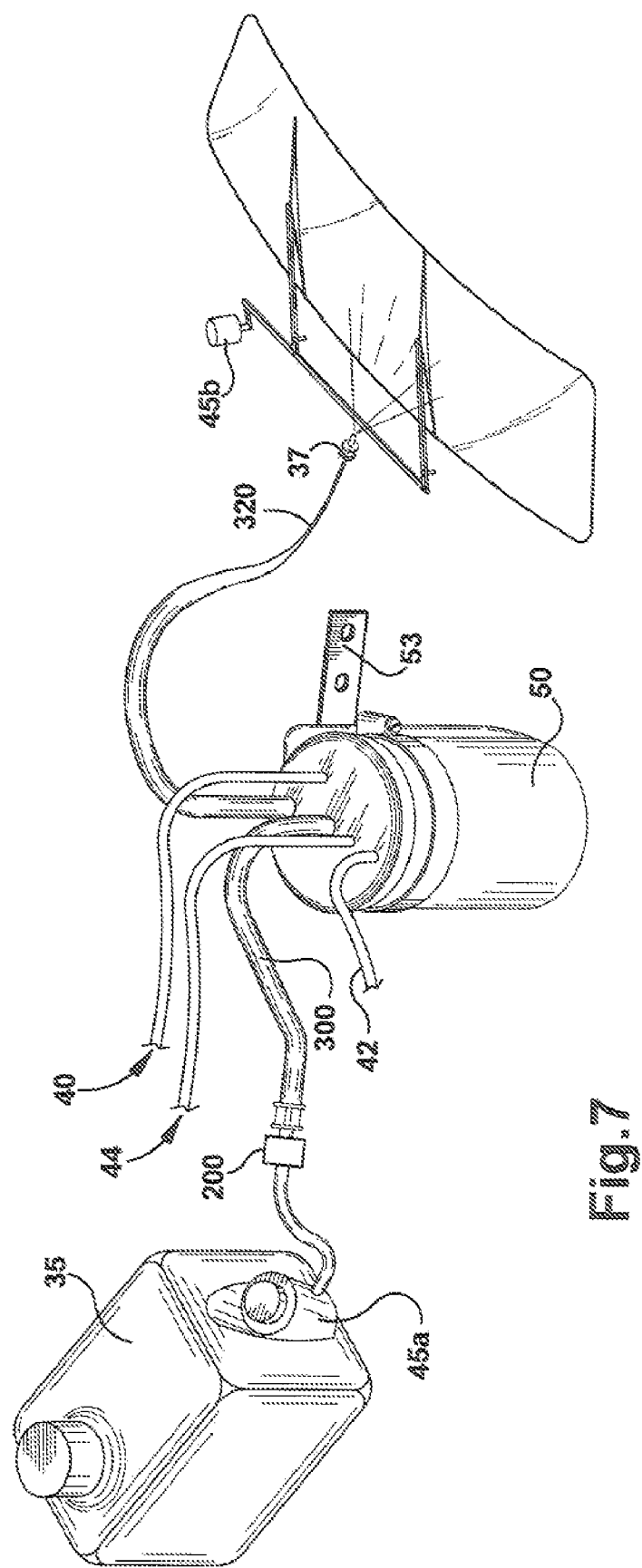
FIG. 7 is a perspective view of a heating assembly coupled to a fluid pump.

FIGS. 6 and 7 depict another embodiment of a heating element 101 made up of a central reservoir 103 and a serially connected coiled heater tube 104. A fluid tight engagement between the reservoir 103 and the coiled heater tube is accomplished by coupling the tube and the reservoir by silver soldering or welding. Fluid is routed from vehicle reservoir 35 through flexible tubing 300 into the central reservoir 103 by means of an electrically conductive coupling. In one embodiment, a central reservoir 103 is constructed from a length of copper tubing and has an outer diameter of approximately 1½ inches. Alternately, the central reservoir could be constructed from brass, stainless steel or other electrically conductive materials. In this embodiment, the central reservoir is constructed from stainless steel.

It is realized that the more resistive the material, the more resistance heating will occur, adding to the heating of fluid in the central reservoir. For example, a stainless steel central reservoir is more resistive and would provide more heating. The coiled heater tube 104 is constructed of stainless steel having a 5/16 inch diameter. The smaller diameter tube 104 is connected to an outlet 34 that routes heated fluid to nozzles or the like. This outer tube is coiled to an inside diameter of 1 and 11/16 inches.

In the illustrated embodiment, an energizing signal is applied to the ends of the series connected central reservoir 103 and heater tube 104 so that current passes through both the reservoir 103 and the tube 104. When the coiled heater tube 104 is made from stainless steel and the central reservoir 103 is made from copper, the stainless steel coiled heater tube 104 has a higher resistivity than the copper central reservoir 103 and therefore heats to a higher temperature more quickly, and acts as the primary heating source. In this example, the inner larger diameter reservoir is heated by some resistance heating but mainly by conduction heating from the coil.

The reservoir 103 and heater tube 104 in this embodiment are thermally coupled by an encapsulant 105 (see FIG. 8) within the housing to provide secondary heating of the reservoir 103 by the heater tube 104. Both elements in this embodiment are surrounded by insulation within the housing 50. The insulation could be air, foam, or potting encapsulant, however air is preferred. It is well known that air is a poor conductor of heat, making it an excellent insulator to prevent heat from escaping and cold from conducting in. One suitable encapsulant 105 is S7252 commercially available from Epic Resins.

The thermal coupling of potting encapsulant 105 between reservoir 103 and heater tube 104, along with the insulating feature already described provides additional advantages. In addition to being thermally conductive, another function of the encapsulant 105 is heat retention, so that sustained heating of the reservoir 103 occurs when electrical energy is not being applied to the heater tube 14. When surrounded by the previously mentioned insulation, the thermal energy of encapsulant 105 is maintained for extended periods of time. The thermal resistance of encapsulant 105 has an effect on how quickly the heater tube comes to temperature and how quickly the reservoir is heated through conduction. If an encapsulant is chosen with a lower thermal resistance, heat from the heater will quickly be dissipated into the potting and hence more quickly into the reservoir. This will give an operator of the system a longer initial heating time of the smaller volume of fluid contained in the tube, but faster heating of the larger volume of fluid contained in the reservoir. Conversely, an encapsulant could be chosen with a higher thermal resistance. The higher thermal resistance encapsulant will not dissipate heat from the heater as quickly as an encapsulant of low thermal resistance does thus allowing the heater to rise in temperature faster. This will provide an operator of the system with a shorter initial heating time of the smaller volume of fluid contained in the tube, but a slower heating of the larger volume of fluid contained in the reservoir. The thermal transfer properties of a commercially available encapsulant can be modified by additives or fillers resulting in a desirable thermal communication medium The distance between the heater and the reservoir will have a similar effect on the heating of the heater tube and the reservoir. A lesser distance between the heater and the reservoir will have a similar heating effect as a lower thermal resistance encapsulant and a greater distance between the heater and the reservoir will have a similar heating effect as a higher thermal resistance encapsulant. In addition, the reservoir construction material and its thickness contribute to the thermal transfer characteristics.

Figure 9:
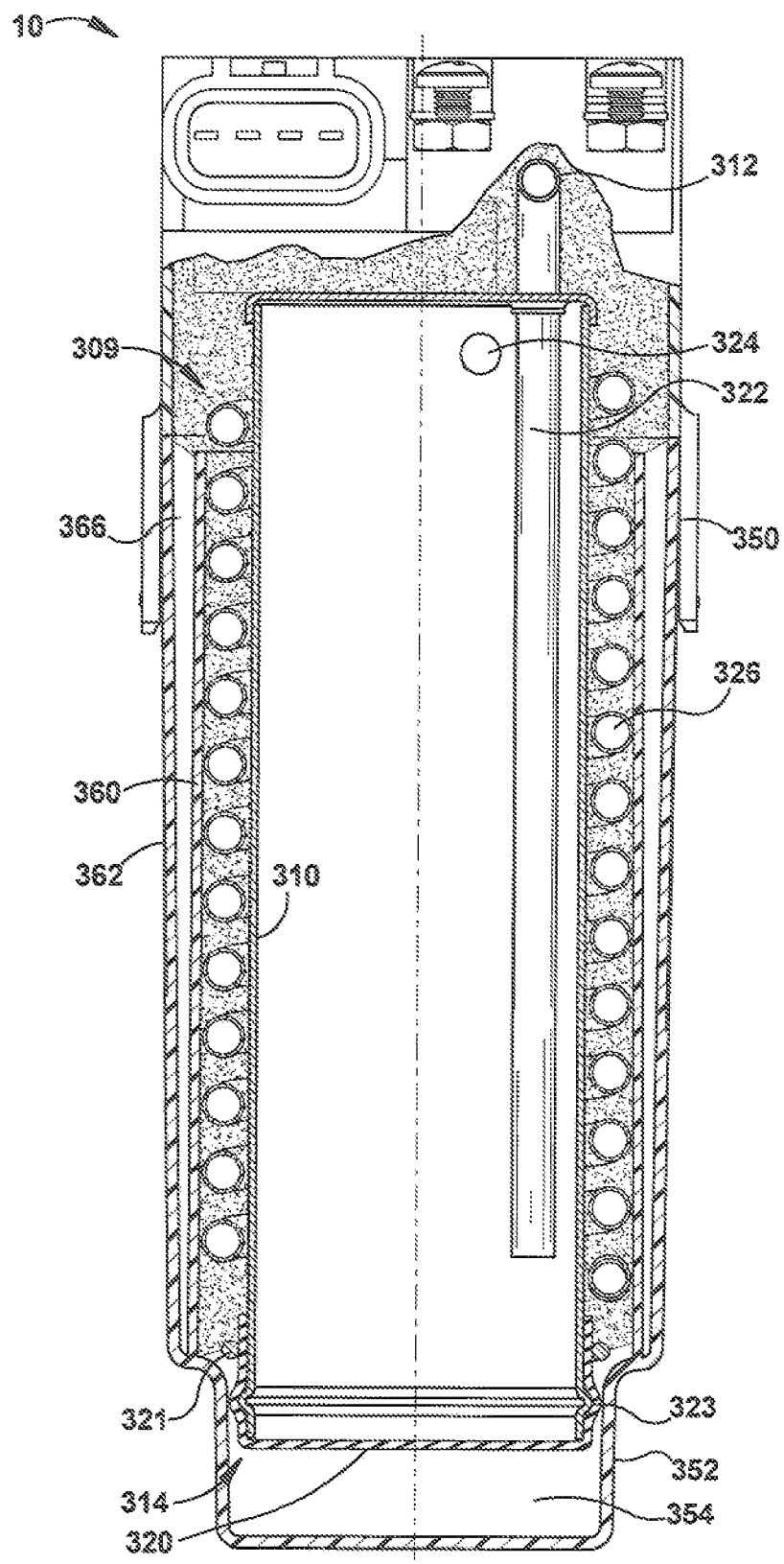
FIG. 9 is a sectional view of a heating assembly including the heating element illustrated in FIG. 11 and a freeze expansion feature.
Figure 12:
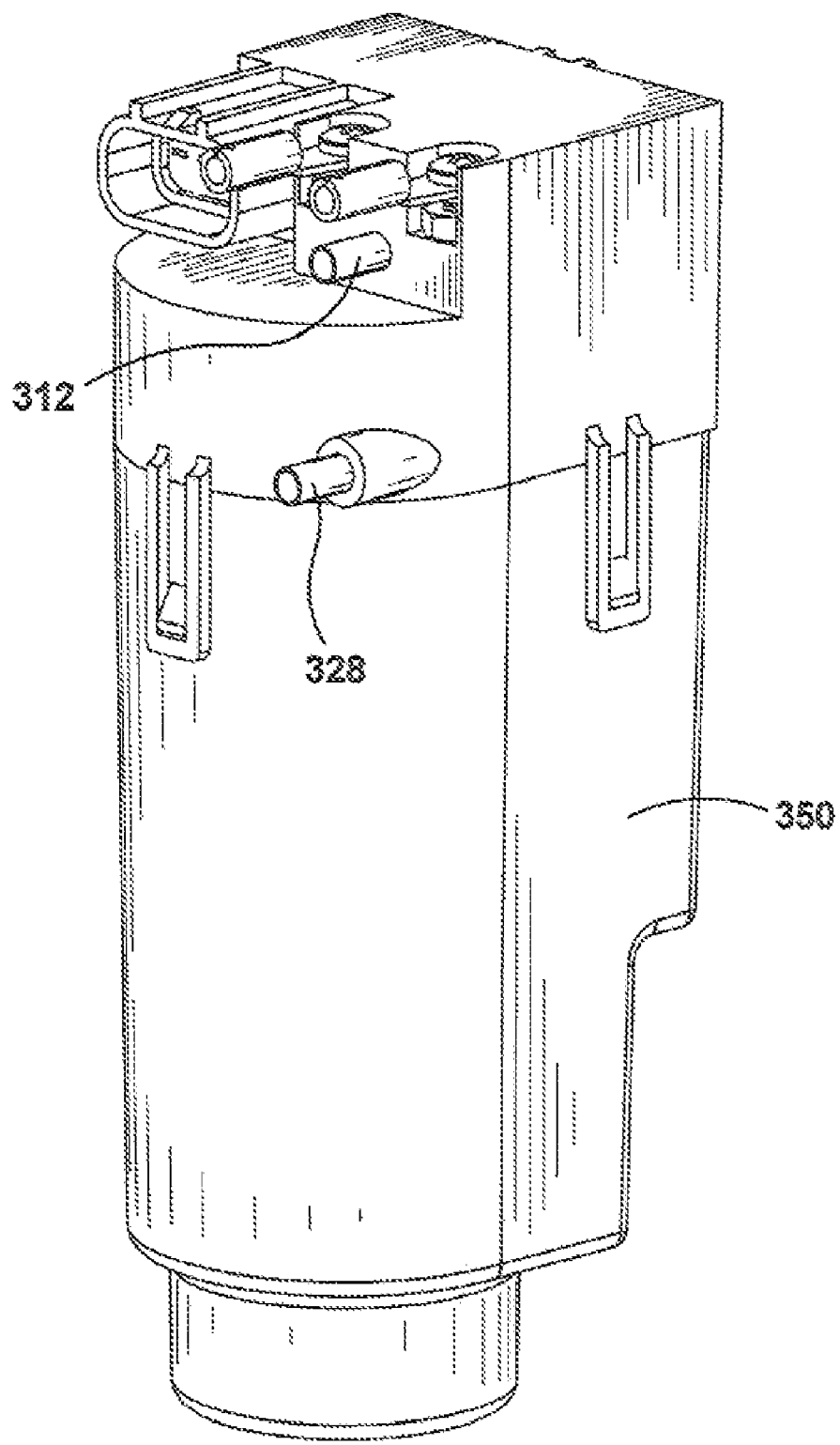
FIG. 12 is a perspective view of a heating assembly housing.
Figure 15:
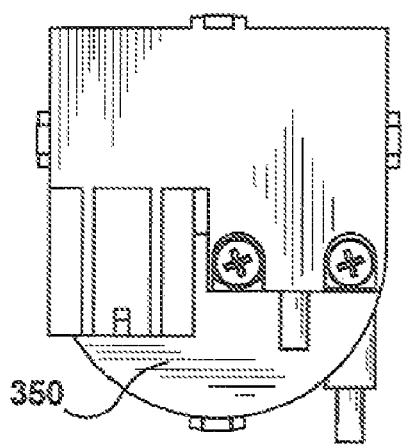
FIG. 15 is a top plan view of the heating assembly housing of FIG. 12.
Figure 13:
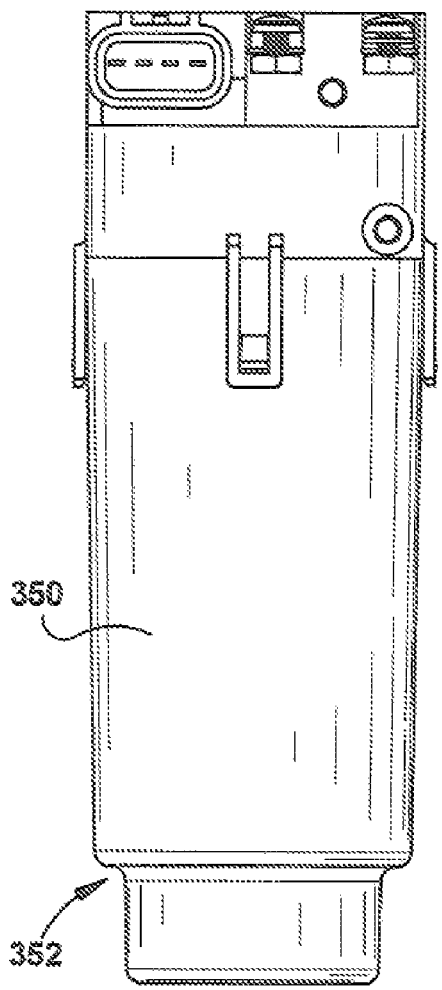
FIG. 13 is a front elevation view of the heating assembly housing of FIG. 12.
Figure 14:
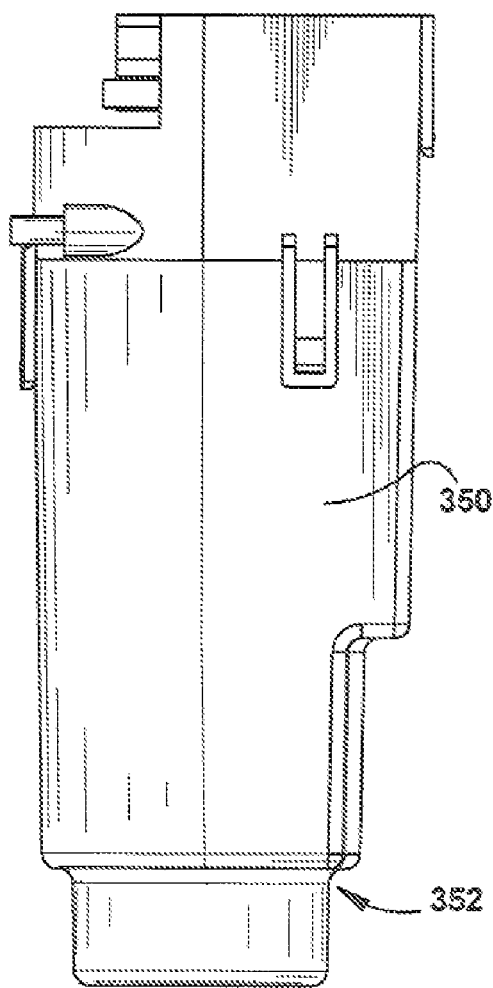
FIG. 14 is a side elevation view of the heating assembly housing of FIG. 12.

FIGS. 9 and 10 depict an embodiment of control system 10 with heating element 309. A reservoir 310 is in fluid communication with the inlet port 312 for storing a reserve of fluid. The reservoir 310 employs an expandable portion 314 at the bottom to protect the reservoir 310 from damage in the event that water freezes in the reservoir. An expandable boot 320 is made from a thermoplastic such as Neoprene or Santoprene™ and covers an open end of the reservoir 310. One suitable boot is constructed from Santoprene™ 201-55 available from Advanced Elastomer Systems, 388 S. Main St., Akron, Ohio 44311. It is held in place by a circumferentially extending clamp 321 similar to a hose clamp. An outwardly extending lip 323 of the reservoir impedes slippage of the clamp and securely holds the boot in place.

The durometer rating of the thermoplastic rubber for the boot 320 is chosen to ensure that the boot has minimal expansion during normal usage of the washer system. This is because if a material is chosen that has significant expansion and contraction during normal washer usage, the nozzles will continue to weep fluid after the pump has been turned off as the system pressure is equalized to atmosphere. However, the selected material should not be so hard that it does not allow the material to flex when frozen liquid pushes on it. This could cause material fatigue and fracture in metallic components. The selected material should remain stiff during high temperature exposure and not take a set, and should remain pliable enough under low temperature exposure to adequately compensate for the expansion of liquid/solid matter.

Figure 3:
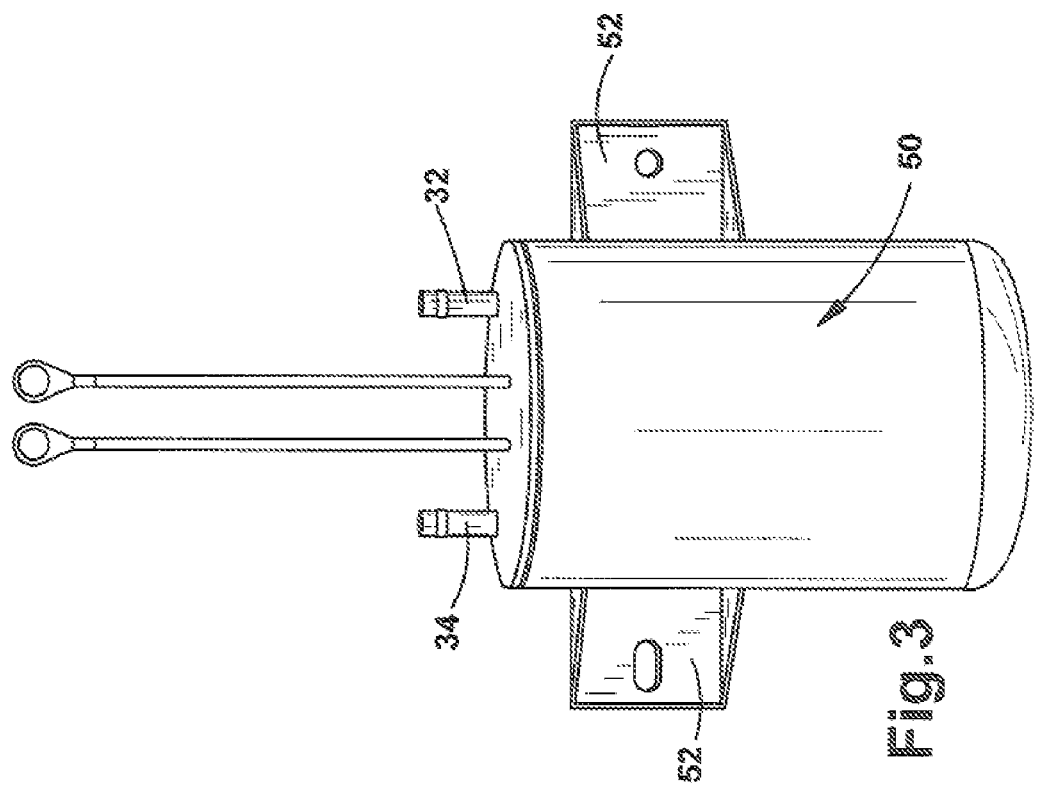
FIG. 3 is a perspective view of the FIG. 2 embodiment of the invention with a housing in place.
Figure 8:
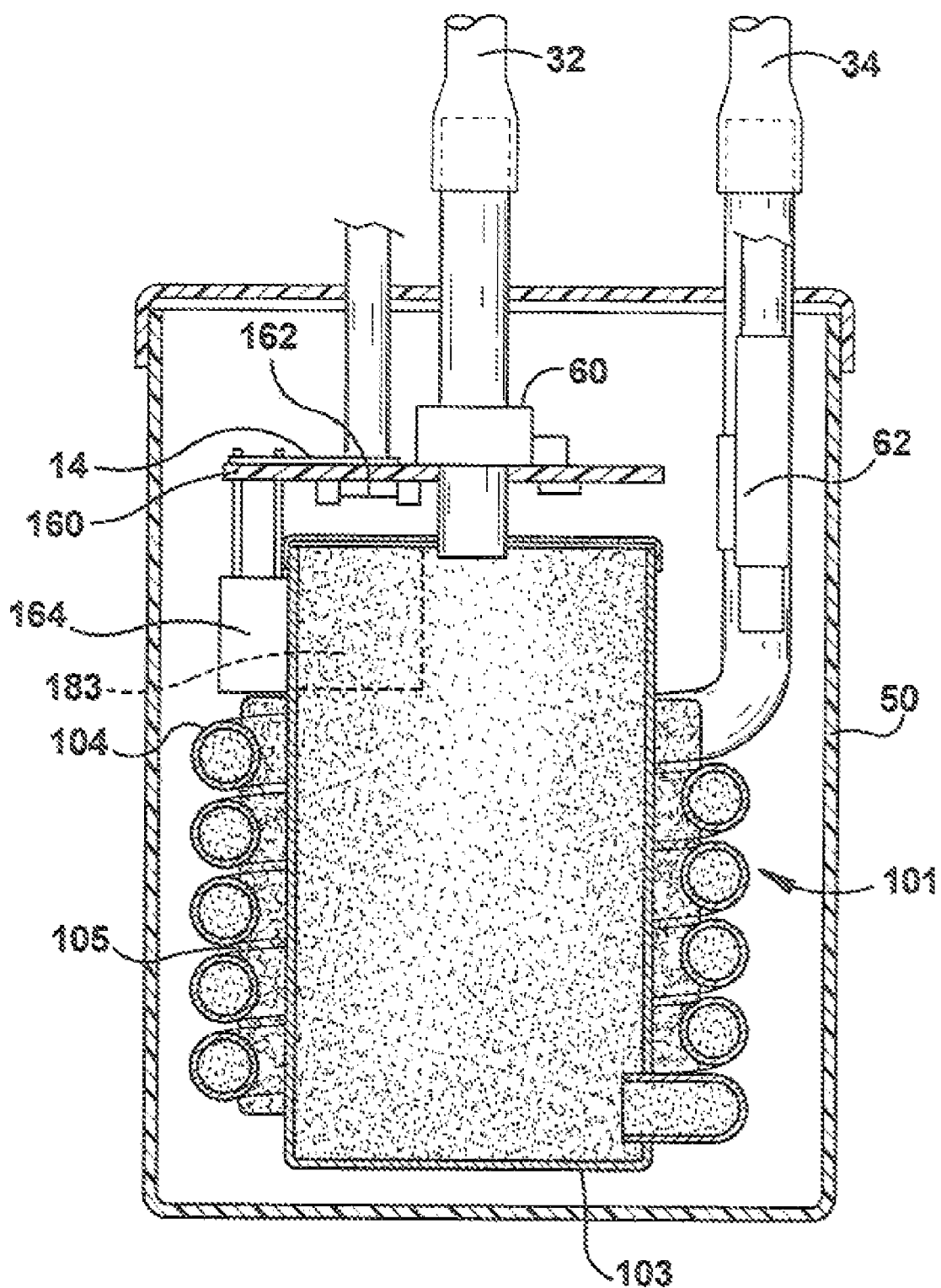
FIG. 8 is a sectional view of a heating assembly including the heating element illustrated by FIG. 6.

Referring to FIG. 3, the embodiments of FIGS. 8 and 9 are packaged in a housing that is located in the engine compartment of the vehicle. Flanges 52 extend from sides of the housing 50 to allow the housing to be attached to a wall of the vehicle engine compartment in one embodiment. FIG. 7 shows an alternate attachment method using a band clamp 53 with a mounting tab. Although there are other methods available for heating fluid, the embodiment of the invention as described above is advantageous for heating a given volume of fluid rapidly. The relatively high surface area of the heater compared to the volume of fluid being surrounded makes rapid fluid heating possible. Also, in this embodiment, fluid is being forced into the heater tube, where the fluid is then resident for a given period of time sufficient to heat it to the desired temperature.

Figure 5:
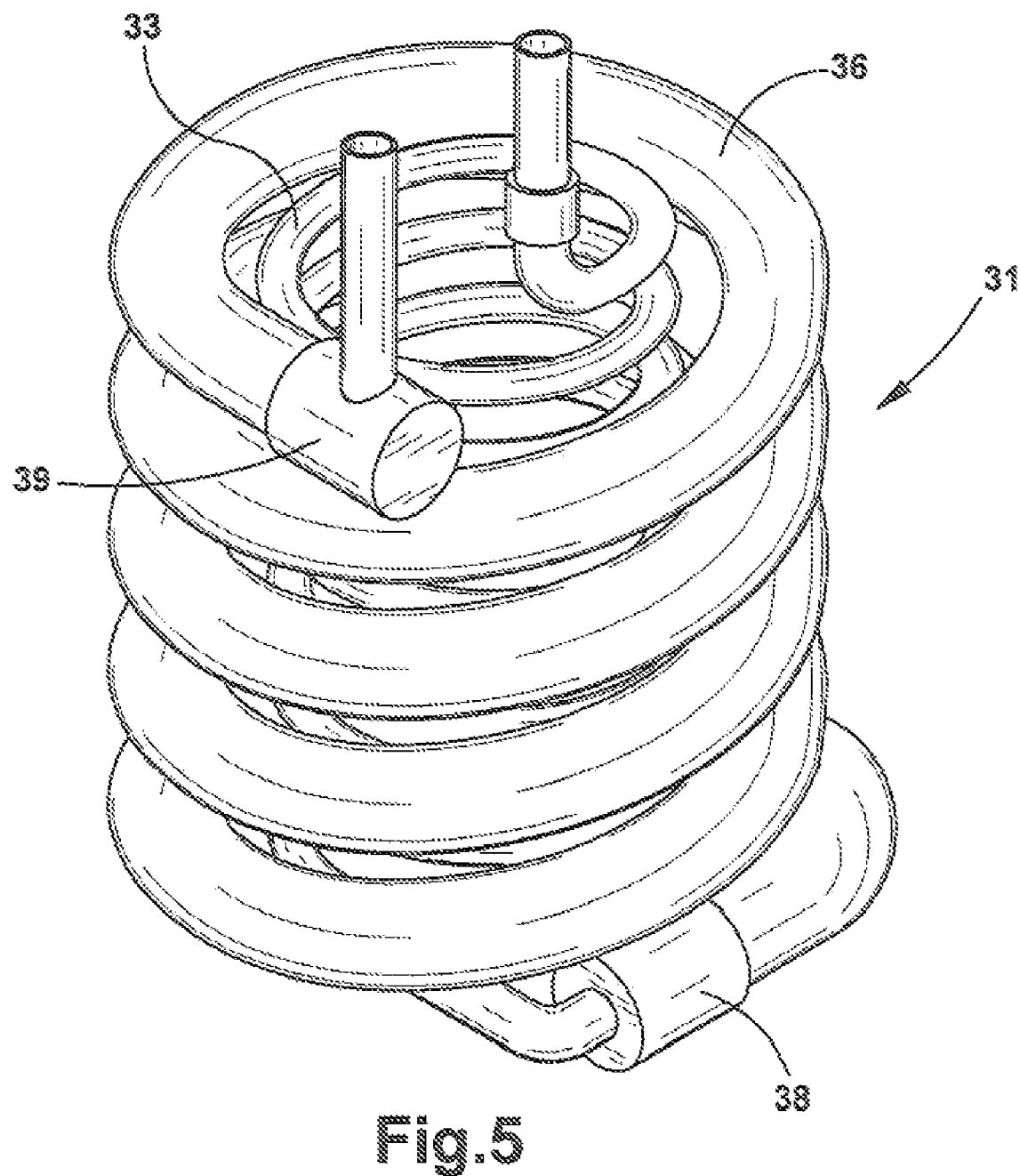
FIG. 5 is a perspective view of an alternative heating element from the heating element depicted in FIG. 2.

FIG. 5 illustrates a deicing system 31 for use with a vehicle. Apparatus of the system has an inlet port for receiving a fluid; an outlet port for dispensing a heated fluid; an electrically conductive tube made up of two parts 33, 36 connected by a coupling 38 for delivering fluid between the inlet port and the outlet port for heating fluid passing through the tube from the inlet to the outlet. A control circuit energizes opposite ends of the coiled tube with a voltage to heat the tube and the fluid passing through the tube. See issued U.S. Pat. No. 6,851,624 (incorporated herein by reference) for additional details.

The programmable controller 14 constructed in accordance with the exemplary embodiment of the invention also implements control algorithms for washer heater control output functions in response to vehicle input signals. As washer fluid temperature changes due to ambient temperature changes, battery voltage changes, and the like, the amount of applied heat is increased or decreased in order to maintain a washer fluid at or near a target temperature.

Controller Schematics

The system block diagram shown in Figures, 11*a*, 45 and 46 depict operation of the control system 10.

Figure 4:
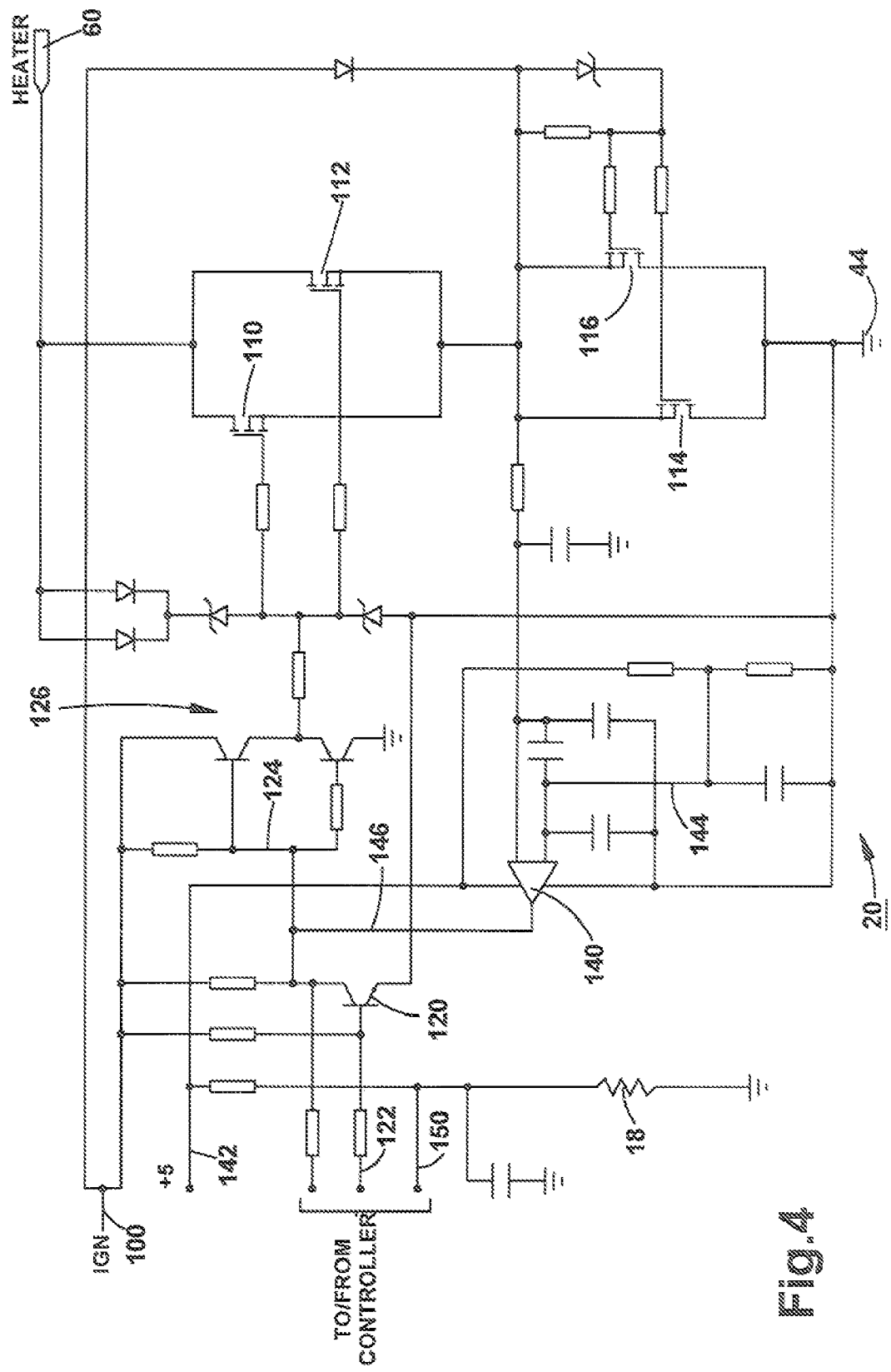
FIG. 4 is a schematic diagram of a drive circuit coupled to a fluid heating element that forms part of the FIG. 2 heating assembly.

The block diagram shown in FIG. 1 and the more detailed schematic of FIG. 4 depict operation of a control system 10 having external electrical connections, which include Battery 40, Ground 44, and Ignition 42. The system block diagram 111 shown in FIG. 1*a* shows further external electrical connections including a user operated Clean Switch 113 and an output 115 to drive a vehicle washer pump motor 117. The Battery input connection 40 provides the voltage supply needed by the control system 10. This connection allows the high current flow required by the heating element. The Ground connection 44 provides the current return path to the battery negative terminal. This ground connection allows the high current flow required by the heating element plus the requirement of the control system 10. A fuse 55 (FIG. 6) is located in series with the battery connection and the heater element. An Ignition input 42 provides power to the controller. The battery voltage is monitored by the controller 14 to determine if there is sufficient voltage present to allow the control system to operate.

An input 102 from the temperature sensor 18 in physical contact with the heating element 30 is directly related to washer fluid temperature. Washer fluid temperature is monitored by using a temperature sensor such as a thermistor, RTD, or the like. The washer fluid is monitored non-invasively by attaching the temperature sensor to the stainless steel tube of the heater. The temperature of the tube corresponds to the temperature of the fluid within the tube. Alternatively, the fluid temperature could be monitored invasively by placing a temperature sensor directly into the fluid through a threaded fitting or other suitable attachment method.

Operation

The controller receives a wake-up command signal from the Ignition input 100 (FIG. 4). When the Ignition input is above a predetermined voltage, the controller 14 drives the heater element 30, the series connected tubes of the heater 31 depicted in FIG. 5 or the reservoir and tube of the heater 101 low if the following are true:

1. The ignition voltage is greater than a first predetermined level and less than a second predetermined level.
2. The sensed Heater element temperature is less than a predetermined level.

Figure 45:
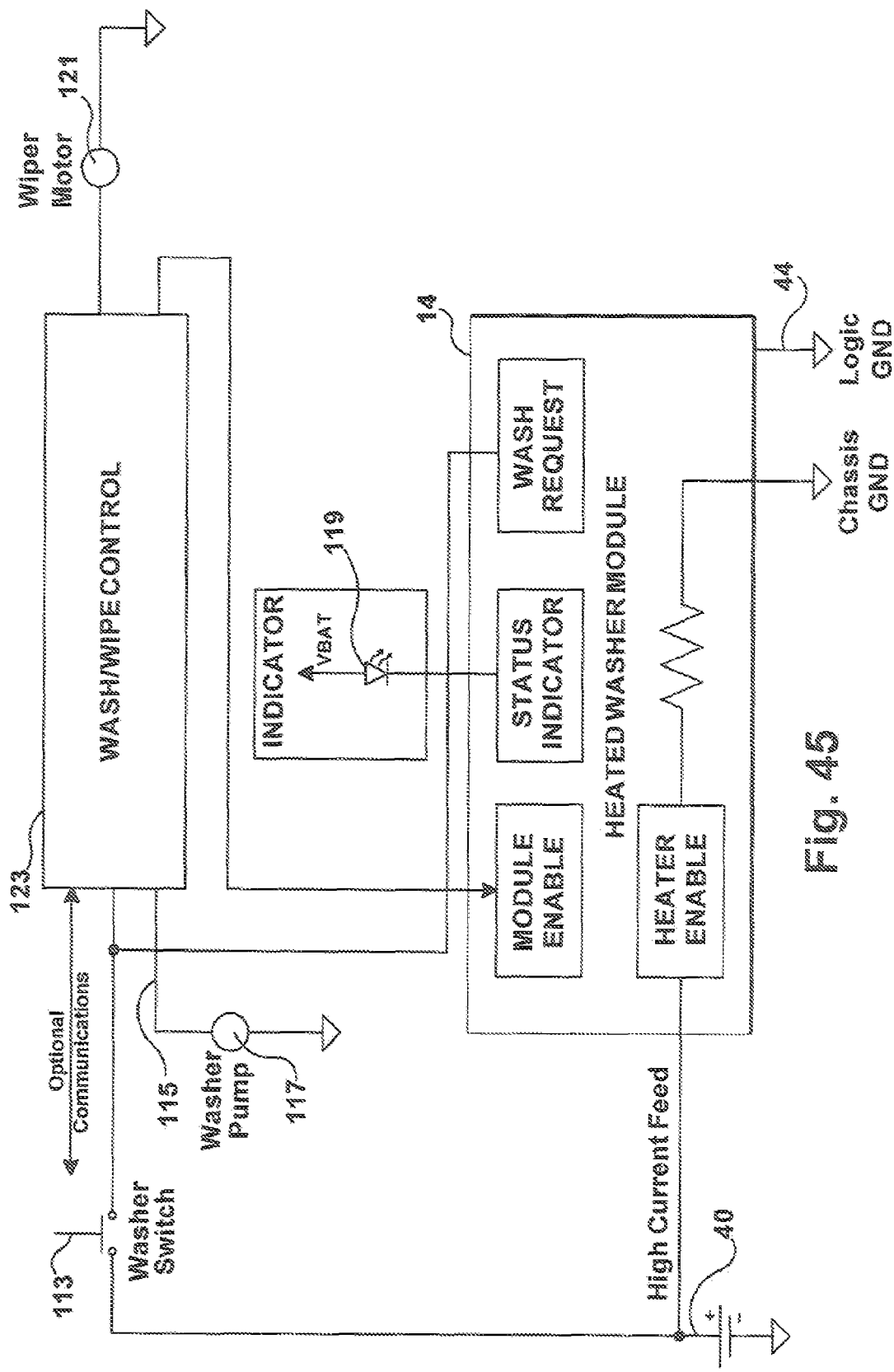
FIG. 45-47 schematically illustrate an integrated heater/wiper control system in accordance with one embodiment of the intention
Figure 46:
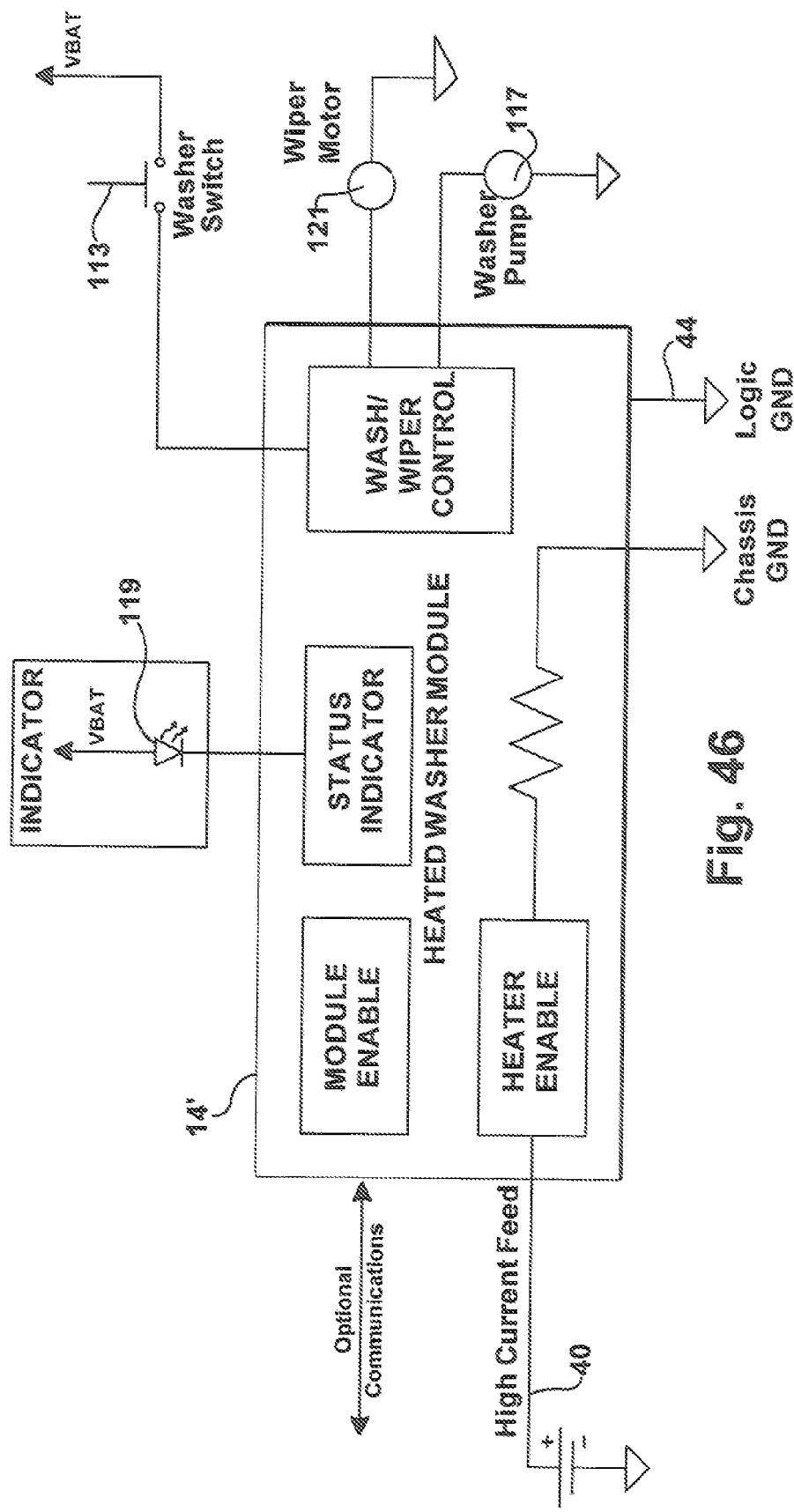

Cleaning the windshield with warmed fluid can be accomplished by the following:
1. Turning to FIGS. 1*a*, 45 and 46:
   a. Application of ignition 42 will cause the unit to heat the volume of fluid. During the heating time an indicator LED 119 flashes. The LED is shown as part of the clean switch 113, but a skilled artisan could move the indicator external to the switch.
   b. When the indicator lamp is illuminated (not flashing), momentarily activating the clean switch 113, initiates a smart mode consisting of the energization of a washer pump and wiper motor.
   c. Output 115 activates the washer pump 117 to dispense fluid on the windshield. In the embodiment shown in FIG. 45, an external controller 123 activates a wiper motor 121 in response to a signal from the washer switch 113. One skilled in the art could have the same controller 14' activate the wiper motor 121 and the washer pump 117 this embodiment is illustrated schematically in FIG. 46.
   d. Hot fluid will be sprayed on the windshield and the windshield wipers will cycle automatically, when the hot fluid reduces to a predetermined temperature, output 115 deactivates, thus completing the smart mode and washer spray/wiper cycling will halt. Momentarily pressing clean switch 113 during the smart mode will cancel the operation.
2. With ignition 42 applied and when indicator 119 is illuminated (not flashing) indicating warm fluid is available, the activation of the existing vehicle wash switch will dispense fluid for as long as the switch is closed for on-demand cleaning.
3. The activation of the existing vehicle wash switch will dispense fluid for as long as the switch is closed for on-demand cleaning regardless of fluid temperature.

An output driver 20 depicted in FIG. 1 and FIG. 1*a* applies power to the heater after starting the heating cycle. The output driver will then begin applying power to the heater at a rate of one hundred cycles per second by means of a pulse width modulated (PWM) output to maintain the temperature of the fluid. The fuse 55 is located between the battery connection and the heater element external to the housing 50 in the illustrated embodiment as shown in FIG. 6. An alternative embodiment could have the fuse internal to the housing as shown in FIG. 1. In the exemplary embodiment of the invention, the desired heater temperature is predetermined to be in a range between 120 and 150 degrees Fahrenheit. Placing the temperature sensor 18 in physical contact with the heating element and maintaining the heater temperature at a temperature at or below 150 degrees Fahrenheit prevents the heating element from heating the cleaning fluid to an undesirable temperature, such as boiling. This helps prevent the formation of mineral deposits that could potentially clog the nozzle 37. If the temperature sensor is not mounted directly on the heating element, but is rather located in the fluid reservoir, only an approximate, latent measurement of the heating element temperature is sensed. This would allow the heating element to heat to a temperature that is hotter than the desired fluid temperature and potentially cause the formation of nozzle clogging mineral deposits. The output driver 20 will remain active as long as the ignition voltage is above a predetermined voltage and the heater temperature is below the desired heater temperature as determined by the temperature sensor 18. When the ignition is turned off, the controller is deactivated.

Turning now to FIG. 4, the output circuit 20 is depicted in greater detail. A heater connection 60 is shown in the upper right hand portion of the FIG. 4 depiction. This connection is grounded by means of initiating conduction of two power Field Effect Transistors (FET) 110, 112 which provide a current path to ground from the heater connection 60 to the ground connection 44 through a pair of reverse polarity protection FET transistors 114, 116. The two transistors 110, 112 are turned on or rendered conductive by means of a pre-drive transistor 120 that is coupled to an output 122 from the microprocessor controller 14a. First consider a high output from the controller 14a at this output 122. This turns on transistor 120 that pulls an input 124 of a totem pole transistor combination 126 low. This signal turns on a lower of the two transistors of the totem pole combination to send activation signal that turns off the two FETs 110, 112.

When the controller provides a low output from the controller 14a at the output 122, the transistor 120 turns off and pulls an input 124 to a totem pole transistor combination 126 high. This signal turns on an uppermost of the two transistors of the totem pole combination to send an activation signal that turns on the two FETs 110, 112.

In one embodiment, a comparator 140 monitors current through the transistors 114, 116 (and by inference the transistors 110,112) and deactivates the transistors in the event too high a current is sensed. A five volt signal that is supplied at an input 142 from a power supply (FIG. 1) provides a reference input 144 to the comparator 140. When the non-reference input exceeds the reference input due to a rise in the current through the transistors 110, 112 (and associated rise in the voltage across the transistors 114, 116) the output 146 of the comparator goes low and removes the input from the gate of the FETs 110, 112 that causes them to conduct. This low signal at the output 146 is also coupled to the controller so that the controller can respond to the over current condition.

In accordance with the exemplary embodiment of the invention a thermistor temperature sensor 18 is also coupled to the controller. A signal at a junction between the temperature sensor 18 and a resistor coupled to the five volt input 142 generates a signal at an input 150 related to the temperature of the heater 30.

Referring to FIG. 2, in one embodiment, the control circuit 14 is mounted to a printed circuit board 160 supported by a cover 50a of the housing. As seen in FIG. 2, the illustrated connector 60 is a bent metallic member that attaches to the heating element 30 in the vicinity of the printed circuit board 160 and is in physical contact with the circuit components on the printed circuit board. The connector 60 thereby not only acts as a path to ground for current passing through the heating element 30 but acts as a heat sink that transmits heat away from the printed circuit board to the tube of the heating element 30 in the region of the inlet where the reservoir pump 45a routes cleaning fluid into the tube. Once the connections to the heating element have been completed, the housing 50 is attached to the cover 50a and a foam core material is placed into the housing. The material acts as an insulator to impede heat loss from the outer surface of the heating element.

The exemplary control circuit includes a microcontroller running at an internal clock frequency of 4.0 Megahertz. In the exemplary embodiment, the microcontroller 14a selectively energizes the heating element based on a voltage applied to the control circuit. This voltage may be the battery voltage and/or the ignition voltage. When the ignition input voltage goes high, the control circuit will power up, come out of reset, and wait for a start delay time imposed by the controller to allow the vehicle's electrical system to become stable. After this start delay, the control circuit monitors the ignition voltage to determine if the ignition is above a minimum enable voltage. A temperature signal from the sensor 18 is also monitored to see if the temperature of the fluid is below a set point temperature. The output drive feedback signal is also monitored to ensure that the output is in the correct state. If all conditions are such that the output can be enabled, the output 122 to the transistor 120 is pulled low. This initiates fluid heating. Initially, the output drive is on 100% for a maximum on time or until the feedback temperature reading approaches a set point temperature. In one embodiment, a preset maximum on time is empirically derived to stay below the boiling point of the cleaning fluid. Subsequently the control will read the heating tube temperature and make a determination if power should be reapplied to the tube. If the sensed temperature is below the desired setpoint, the output will be re-enabled at a variable duty cycle so that the tube is heated to the setpoint goal temperature as quickly as possible without exceeding a maximum allowable overshoot temperature.

Normal operation consists of maintaining the fluid temperature at the desired setpoint temperature by varying the duty cycle at which voltage is applied across the tube. The output duty cycle changes based on how far the sensed temperature is below the set point temperature.

In the event of excessive current flow through the output, the output will automatically be disabled. In this event the signal at the output 146 from the comparator 140 (FIG. 4) will go low. When this occurs the controller 14a disables the output to the transistor for a period of time equal to an output retry rate programmed into the controller 14a. If the fault condition is removed, normal operation of the temperature set point control is re-instituted. An alternate embodiment could have the current sense capability implemented by the comparator 140 omitted.

In the event the operating voltage from the battery (and ignition) is too high or too low ($\geqq 16.5$ and $\leqq 8$ volts respectively) the controller 14a disables the output for a timeout period. After the timeout period, if voltage conditions are within normal parameters, the controller again enables the output. The exemplary system also incorporates a soft turn-on and turn-off of the heating element. The soft turn-on and turn-off is accomplished by a slow ramp up or down of the PWM signal from the microprocessor 14a that drives the heating element. The ramping of power reduces the amount of flickering that can be observed from the vehicle headlights. It is recognized that the FET drivers could be run linearly (instead of pulse width modulated) to accomplish the soft turn-on and turn-off of the heating element. It is also recognized that the FET drivers could be run linearly to regulate the temperature of the heating element. It is further recognized that if the FET drivers are run linearly they will produce quantities of heat that will aid in the heating of fluid in the system.

Turning to FIGS. 9-11, the embodiment includes a tube 322 that extends from the inlet port 312 through a length of the reservoir 310 to route unheated cleaning fluid, for example cold water, to the bottom of the reservoir. As the cleaning fluid heats inside the reservoir it tends to rise. The cleaning fluid in the reservoir exits an exit port 324 at the top of the reservoir passes through a tube 325 along an outer surface of the reservoir and then spirals up through the coiled outer heater tube 326 to an exit port 328 (See FIG. 11).

As also depicted in FIG. 9 a plastic housing 350 of the presently preferred embodiment has a stepped bottom portion 352 that has an open chamber 354 sized to allow the boot 320 to expand outwardly into the chamber. The housing 350 is a molded plastic and includes inner and outer walls 360, 362 that define an air gap 366 between the walls. During construction of the assembly 10, a potting compound is added to the housing interior and fills the region between coils of the heating tube 326. The potting compound does not fill the air gap, however and this air gap tends to insulate the tube and reservoir.

Alternative Embodiments

Additional features of the invention adapted for use with a motor vehicle can be realized as described below. These embodiments have the same electrical configuration and operate in the same manner as the preferred embodiment.

One alternative embodiment of the invention uses a communications interface to transmit ambient temperature, battery voltage, washer switch activation status, washer pump use, engine running information, and other such information to the controller. Likewise, the controller could transmit task commands to the vehicle such as start wipers, pump washer fluid, controller status, and the like.

An alternate embodiment could include electronic input and/or output circuitry to interface with at least one ambient air temperature sensor 19 that provides output signals related to a sensed state of ambient air temperature.

Another embodiment of the invention could use engine coolant to heat the washer fluid prior to flowing through the heating element. This will reduce the amount of power required to heat the fluid to predetermined temperature using the heating element.

In the embodiment illustrated by FIGS. 6, 8, and 9, the control circuit is disposed on a circuit board 160 positioned adjacent to the heating element 101, promoting heat transfer between the control circuit 14 and the heating element 101. A thermal fuse 162 on the printed circuit board 160 is in close proximity to the heating element. In the event that the heating element temperature surpassed a predetermined threshold, the fuse would open and disable the output drive. The control circuit 14 illustrated in FIGS. 6 and 8 includes one or more heat dissipating devices 164 mounted to the printed circuit board. In one embodiment, a heat dissipating device 164 of the control circuit is mounted to a heating element to provide additional heating of the fluid. One such heat dissipating device is a FET that drives the heating element. In the embodiment illustrated by FIG. 6 a heat dissipating device 164 is mounted to the reservoir 103. A heat dissipating device 164 could also be is mounted to a coil of one of the heating elements 30, 31, 101, 309.

Another embodiment of the invention could use a time varying signal from the vehicle alternator to determine if the engine is running. This could be used in conjunction with the ignition input or as a stand-alone signal eliminating ignition input.

Another embodiment of the invention could use the washer pump 45a to regulate the temperature of the washer fluid. In this embodiment the system would control the washer pump 45a as well as the heating element. When the controller receives a request for washer use, the output driver would activate, heating the fluid with the heating element. When the washer fluid was at temperature the washer pump would be enabled. After the volume of heated fluid was used the pump would be disabled, and the fluid would again start heating to a predetermined level. After the fluid achieves the desired temperature level the pump would again be activated.

In one embodiment, the control circuit 14 includes an output 172 that controls the washer pump and separate output 174 that controls the wiper motor. This allows the control circuit to disable the wiper motor for a predetermined period of time after energizing the heating element and/or applying the heated fluid. For example, the control circuit could disable the wiper motor during the first heat cycle after initialization. This would allow for the heated fluid to have a more significant impact on surface contamination such as frost before the wipers are activated.

Another embodiment would have separate user input devices 178a, 178b for independent control of the washer pump and the wiper motor respectively. The user could then spray heated fluid on the windshield as required for cleaning independent of wiper action which tends to force heated fluid from the windshield and thins the remaining liquid film causing more rapid cooling of the liquid that is left on the windshield.

Another embodiment would have an auxiliary heating element on the inner copper reservoir 103. This would allow for more direct heating of the fluid contained in the reservoir as compared to the conduction heating of the fluid by the outer coil through the encapsulant material. This would also allow for the outer coil to be disabled when the system has been in a mode of operation that only sustains the temperature of the fluid. This would allow for a lower power heat source to be enabled over longer periods of time, compared to the high power very short duration pulses that are applied to the main heater coil. Decreasing the high current requirements would decrease the wear on the vehicle's electrical system. It is further realized that auxiliary heating could come from the FET transistors that drive the heating element. It is further realized that the auxiliary heating could come from a patterned heater such as a thermofoil heater or electro-thermal conductive flexible graphite, also known as vermiform graphite, such as those available from Minco Products, Inc., 7300 Commerce Lane, Minneapolis, Minn. 55432-3177 U.S.A. or EGC Enterprises Inc., 140 Parker Court, Chardon, Ohio 44024.

Similarly, another embodiment would have an auxiliary heating element 183 (FIG. 8) in the inner reservoir. This would allow for more direct heating of the fluid contained in the reservoir as compared to the conduction heating of the fluid by the outer coil through the encapsulant material. This would also allow the outer coil to be disabled when the system has been in a mode of operation that only sustains the temperature of the fluid. This would allow a lower power heat source to be enabled over longer periods, compared to the high power, very short duration pulses that are applied to the main heater coil. Reducing the high current requirements would decrease the wear on the vehicle's electrical system.

Another embodiment would have two different heat modes, the first having a higher power, the second a lower power. The two modes of operation could be used based on ambient temperature conditions. If, for example, it is below 40 degrees Fahrenheit where frost could be present on a vehicle windshield, the unit would use high power mode to heat fluid quickly to aid the operator in its removal. Alternately, if ambient temperature were say 40 degrees Fahrenheit or greater, a lower power mode would be used. This would allow for heating of fluid to aid in the cleaning of the windshield, but at a slower heating rate. This would decrease wear on the vehicle's electrical system when fast heating times are not required. The lower power is achieved by having a lower duty cycle on the heater drive. It is understood that the decision to switch from a power level to another power level could be accomplished with an external jumper or switch. This would provide the user with means for controlling the power applied to the heater. It is also understood that the external switch or jumper could cause the selection of other functions or characteristics.

Another embodiment could have a multiplicity of reservoir tanks connected in series or parallel combination. This would give increased available volume of heated fluid. Alternately, instead of having multiple reservoir tanks connected in one unit, multiple units could be connected together forming a system. Another alternate configuration would be the invention in conjunction with windshields that have self-heating capabilities, such as those with a translucent oxide coating enabling electrical current to flow from one end of the glass to the other creating heat due to the resistance of the coating.

Another embodiment could use a flow switch 200 (FIG. 7) to determine when to heat the fluid. The control would activate the output driver when flow is detected so that the fluid is heated only when there is a demand. It is understood that the flow switch could be a magnet and reed switch combination, or a magnet and a Hall Effect sensor, or a paddle wheel type, and the like.

An alternative embodiment could use two fluid temperature sensors, one at the heater element inlet and the other at the heater element outlet. When the heater is in operation and fluid is flowing, there should be a temperature differential across the heater element. That is, a fluid of a given temperature goes into the heater element, and warmed fluid exits the heater element. If the control used the washer motor voltage as an input to initiate a heating cycle, the two fluid temperature sensors could be used to determine that fluid flow exists. If there is a temperature differential, there would be flow. If there were a minimal or negligible temperature differential, a zero or low flow condition would be indicated. In the event of a low or zero flow condition, the heating element would be de-energized.

Another embodiment could have a diagnostic output that could be used for evaluating system performance and for diagnosing system faults. Operational parameters will be sent via communications such as serial communications using a proprietary bus or other standard bus protocol. A computer could be connected to the module using an appropriate interface cable to allow for reading and interpreting data. In addition to reading data for diagnostics, the invention could include communications and interface means to allow for programming of the microcontroller after the assembly of the device is complete. This would allow for software upgrades on units that have finished the manufacturing process.

Another embodiment could include control of the windshield wiper motor and washer pump. A separate switch input 43 (FIGS. 1 and 1a) would activate a cycle to dispense the fluid.

Another embodiment could include control of the windshield wiper motor and washer pump. A switch input would activate an automatic cycle to dispense the fluid.

Another embodiment could include control of the windshield wiper motor and washer pump. A signal could be sent to an existing control module to initiate a washer and/or wiper sequence of operation as shown in FIG. 45. It is also understood that the heated washer module functionality and the vehicle washer/wiper control module could be combined to form a single integrated module illustrated in FIG. 46.

In another embodiment, the module would control delayed wiper functions and would also have a switch input for one-touch control of the wiper motor and washer pump for spraying of washer fluid in an automatic wash cycle with an automatic wash cycle consisting of a given number of washer pump cycles and given number of wiper motor excursions. It is understood that cycle counts and motor excursions could be substituted for given times.

Figure 16:
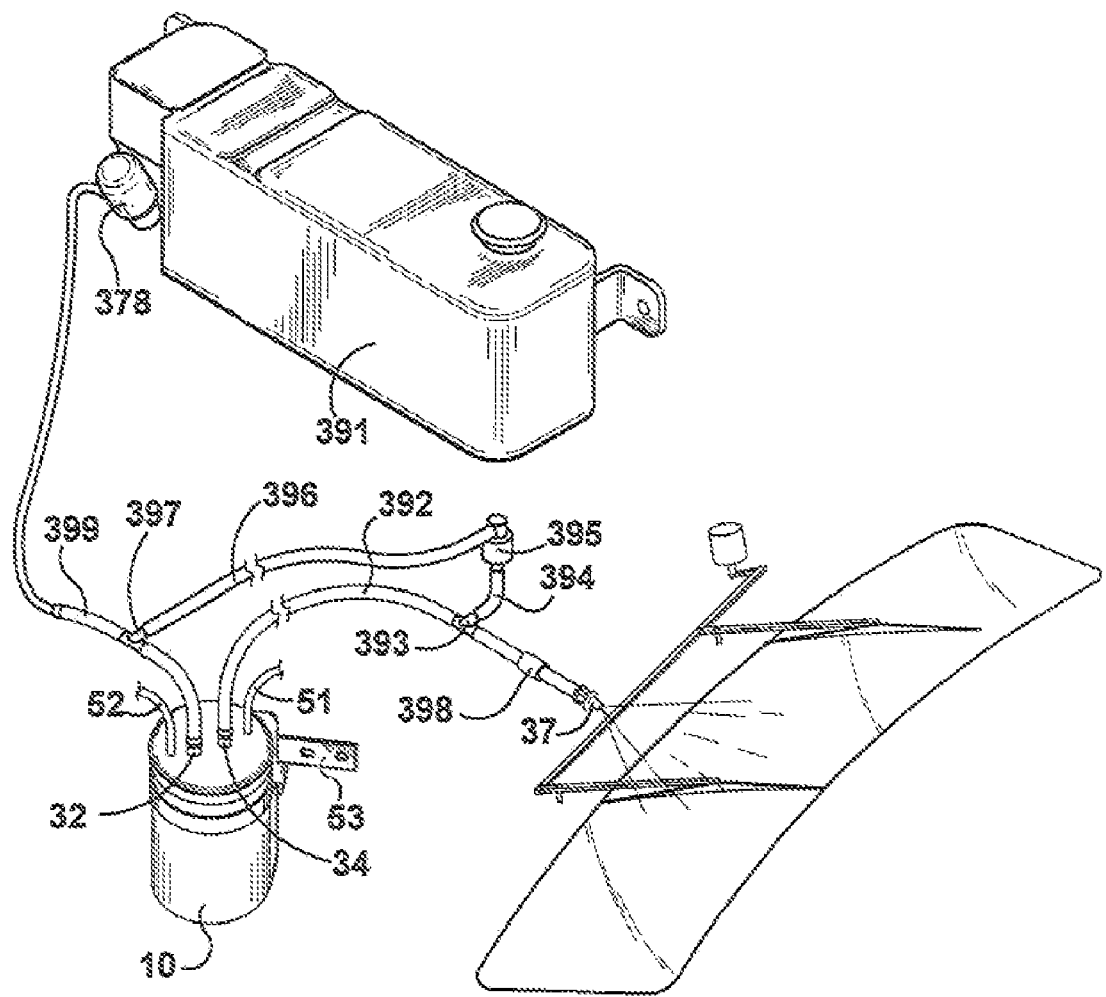
FIG. 16 is a schematic depiction of a vehicle system with a long fluid flow path to a spray nozzle location.

FIG. 16 is a schematic depiction of a vehicle system with a generally long fluid path to the spray nozzle locations.

Figure 23:
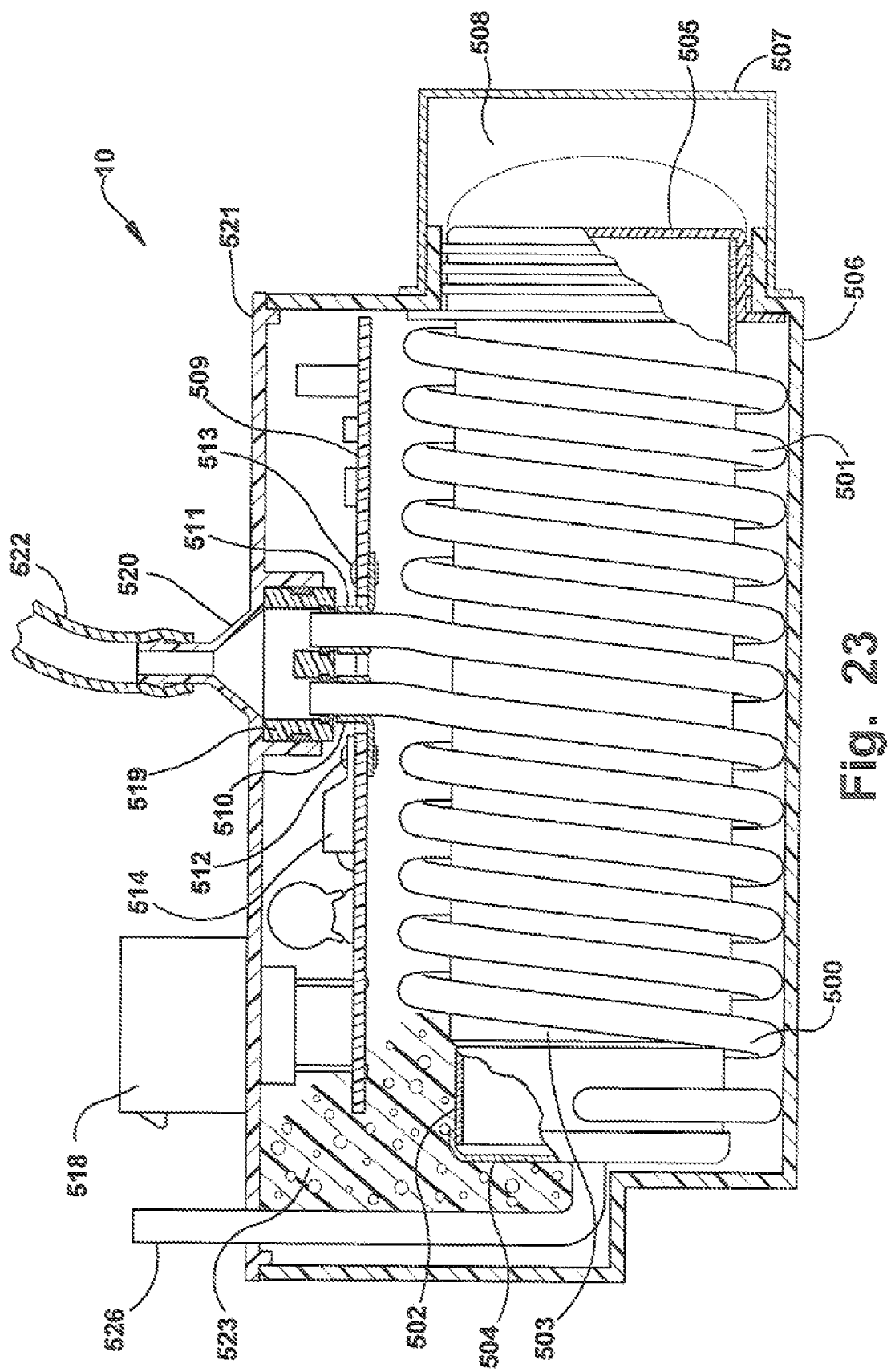
FIG. 23 is a sectional view of a heating assembly with dual heating coils constructed in accordance with an additional embodiment of the invention.

Between cycles of user activation, the time heated fluid remains in the fluid line 392 between the outlet 34 of washer control system 10 and spray nozzle(s) 37 can cause the resident fluid to cool. One embodiment of a vehicle washer system using a fluid re-circulation method is shown. "Y" or "T" fitting 393 is connected to fluid line 392 between outlet 34 and nozzle(s) 37. If the heated fluid remains in fluid line 392 a predetermined time between cycles of user activation, control circuit 14 of FIG. 8 would activate a second pump 395 to redirect the fluid through hose connections 394, 396 back to inlet 32 of washer control system 10 by means of "Y" or "T" fitting 397 into hose connection 399. Re-circulated fluid could alternatively be dispensed back into fluid bottle 391 if desired. Pressure sensitive check valve 398 would be used to effectively stop fluid flow ahead of nozzle(s) 37 and limit the dispensing of unwanted cool fluid to a small amount. An alternate method of providing heated fluid is to allow the fluid in the distribution tube to bleed back into the heated reservoir. Referring to FIG. 23, in the event that the vehicle has been off for an amount of time that allows the fluid in the distribution tube to cool to ambient temperature, a method is desirable to have only heated fluid spray on the windshield and not the cooled fluid. Bleed hole 450 in heater coil 355 allows fluid from the nozzles to the heater to drain back into chamber 383. Upon reactivation of system with vehicle start the fluid in chamber 383 and heater coil 355 will be heated to a desired temperature. When fluid use is desired fluid will be pumped into the distribution tube and dispensed through nozzles 37.

Figure 18:
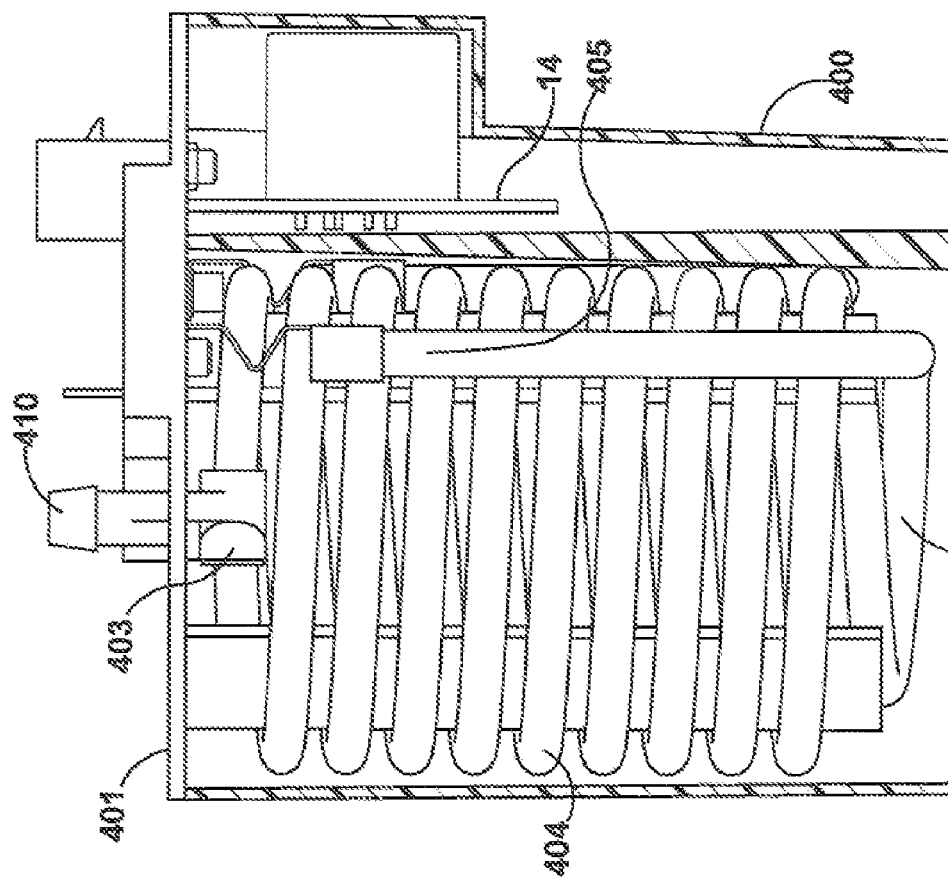
Figure 17:
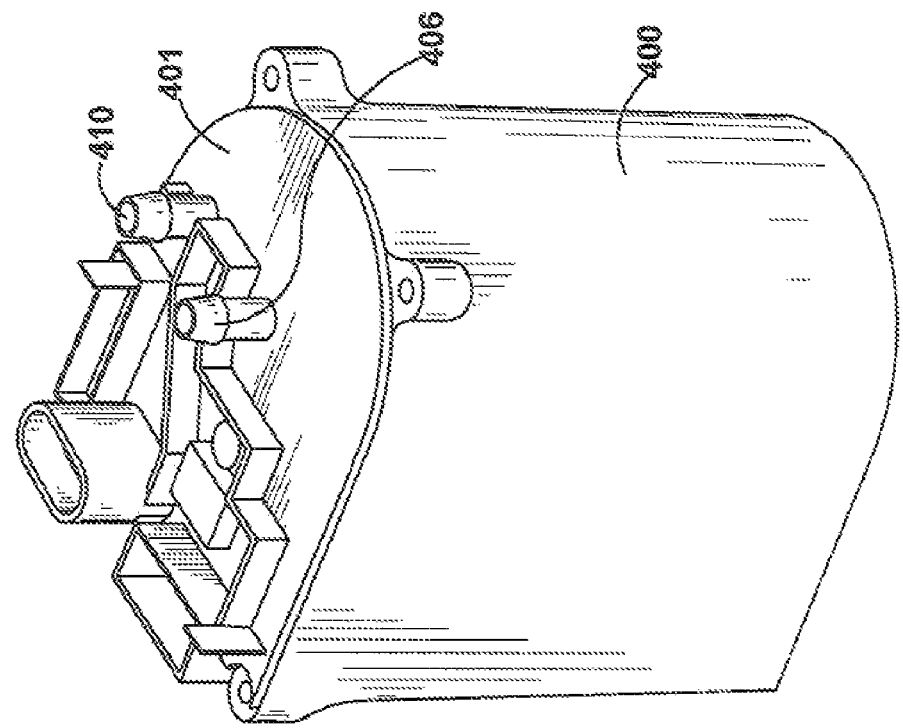
FIG. 17 is a perspective view of another embodiment of a washer control system.
Figure 22:
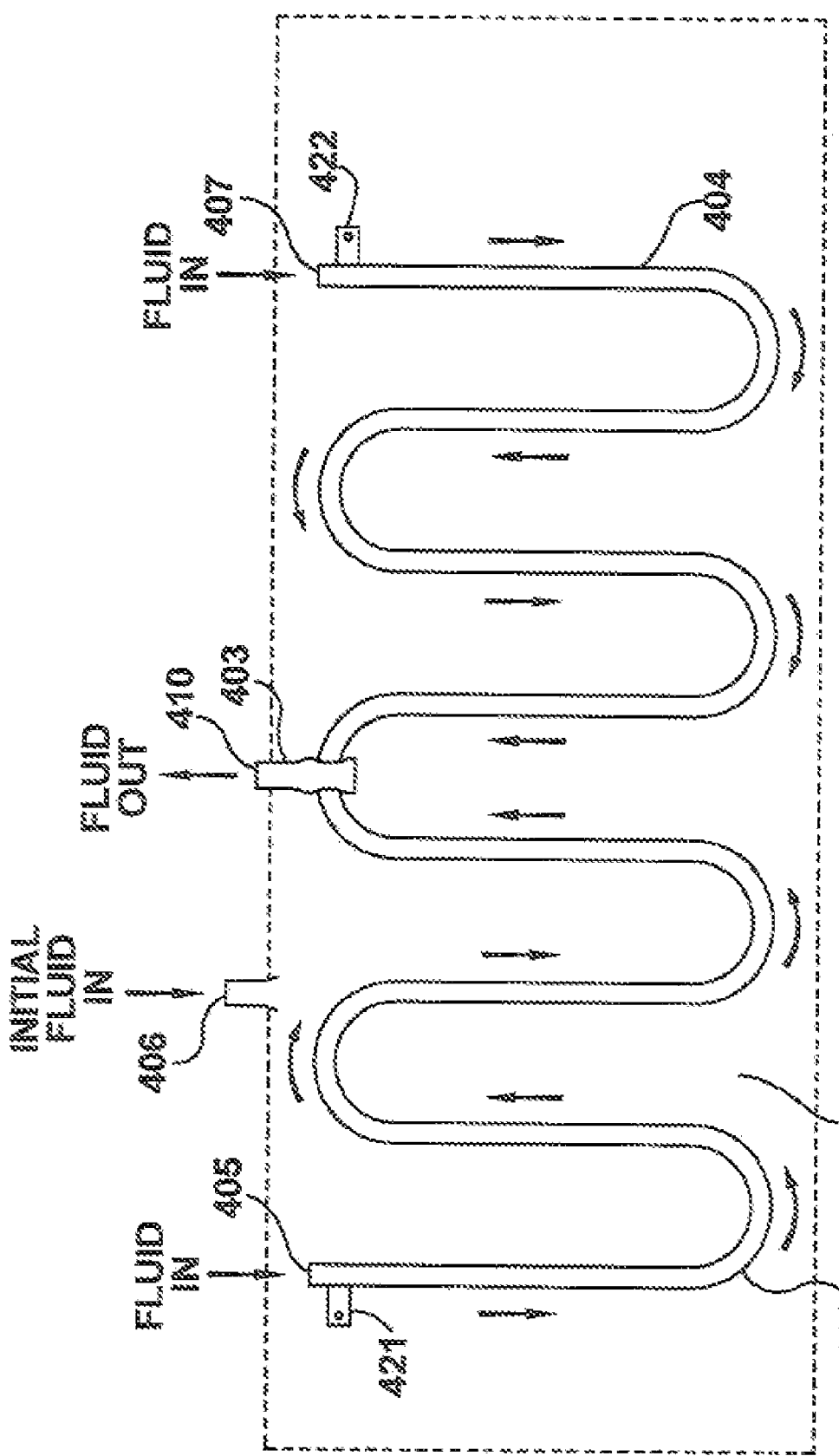
FIG. 22 is an alternate depiction showing a simplified flow diagram for the structure of FIG. 18.

FIGS. 17 and 18 depict an alternate embodiment of a washer control system 10 to address concerns about excessive fluid pressure drop caused by flow through a continuous heater coil. FIG. 18 depicts a heater coil configuration using two coils of the same diameter and wall thickness, joined together by a single adapter used to route fluid to an outlet 410. The heater coil material could be annealed 304 series stainless steel, or other materials high in electrical resistivity. As fluid is dispensed through first port 406, it fills housing reservoir 401. The first coil 402 receives the fluid through first inlet 405. At the same time, second coil 404 receives fluid through second inlet 407, as shown in FIG. 19. First coil 402 is connected to second coil 404 by means of adapter 403, best shown in FIG. 20. The preferred adapter 403 material is copper, made from a powdered metal process. FIG. 20 also shows integrating thermistor 408 and thermal fuse 409 into adapter 403, for measuring coil temperatures as a functional part of control circuit 14. The heated fluid then exits through second port 410 and is routed to the dispense nozzles onto the vehicle windshield, headlamps, etc. The combined fluid flow through each of the first inlet 405 and the second inlet 407 is half that of a continuous length of coil equaling the combined length of the two coils 402 and 404, with a resultant pressure drop equal to one quarter of a continuous coil. FIG. 22 is a schematic representation of the apparatus described in FIGS. 17-20. After reservoir 407 receives fluid through inlet 406, the schematic shows the dual path for the fluid flow through inlets 405 and 407 to outlet 410. Terminals 421 and 422 represent power connections to provide continuous current flow path for the entire length of combined heater coils 402 and 404.

Figure 21:
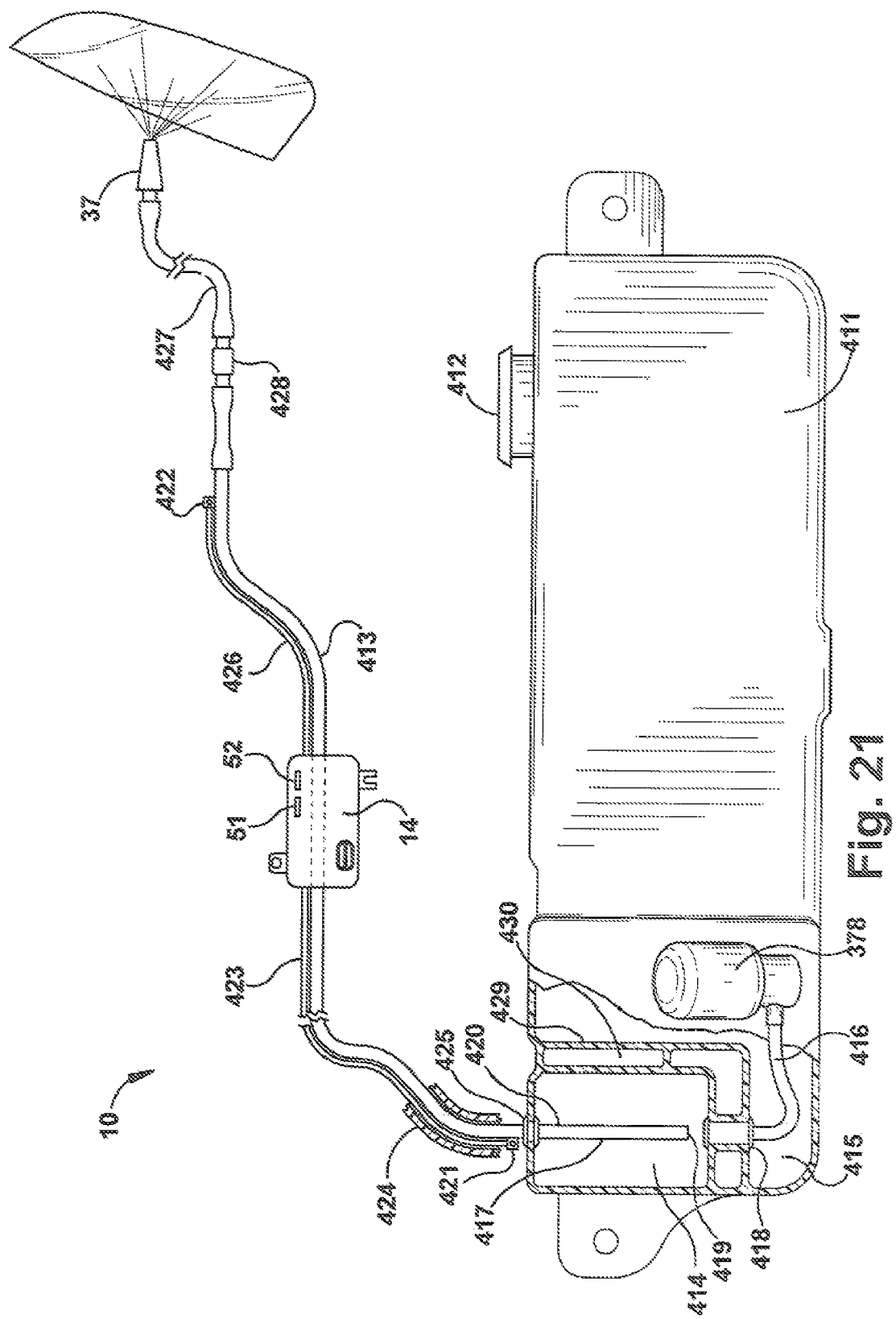
FIG. 21 is a schematic depiction of another alternate embodiment of a washer control system where a heating element is integrated into a fluid bottle on a motor vehicle.

FIG. 21 is a front view of another embodiment where a heating element is integrated with a fluid bottle on a motor vehicle, and where the fluid supply line serves as the heating element. The configuration depicts a cross-sectioned area of dual chambered fluid bottle 411, which is filled through filler neck 412 allowing fluid to enter into first chamber 415. Pump 378, exteriorly mounted to an outer wall of chamber 415, draws fluid from chamber 415 through hose connection 416, and dispenses into second chamber 414 through port 418.

Pump 378 is generally located for capability of drawing fluid from the bottom level of bottle 411 for pumping fluid to a near empty condition. As chamber 414 is pressurized, fluid is forced into an inlet 419 of continuous length heater tube 413. A first segment 417 of continuous length heater tube 413 is positioned inside walled chamber 414, and includes an opening or openings 420 at the highest elevation of the segment to allow an escape of trapped air as fluid fills the chamber 414. The heater tube 413 exits chamber 414 through a grommet seal 425 and includes electrical terminal connections 421 and 422 on each end. The segment of heater tube 413 exterior to fluid bottle 411 is the active heater element of washer control system 10. Heater tube 413 extends continuously through control circuit 14. Conductor wire 423 connects to terminal 421, and terminates to electrical battery connection 51 inside control circuit 14. Conductor wire 426 connects to terminal 422, and terminates to ground connection 52 inside control circuit 14. As power is applied, the fluid inside heater tube 413 is rapidly heated before exiting through flexible tube 427 and routed to the dispense nozzles 37 onto the vehicle windshield, headlamps, etc. Pressure sensitive check valve 428 could be used to effectively stop fluid flow between heater tube 413 and nozzles 37 at the conclusion of user activation and limit the dispensing of unwanted cool fluid to a small amount during the next user command. Heater tube 413 and conductor wires 423, 426 could be routed parallel to each other, and insulated commonly with a sleeve 424, which has thermal insulating properties to prevent heat loss. Sleeve 424 could also provide for environmental sealing of terminal connections 421, 422. The larger unheated volume of fluid is contained in the first chamber 415 of the fluid bottle 411, and double walled chamber 414 acts as a reserve for additional fluid, conductively heated by the first segment 417 of continuous length heater tube 413. The double wall 429 is separated by one or more air cavity features 430, providing insulation between the colder fluid contained in first chamber 415 and the conductively heated fluid contained in the second chamber 414, thereby conserving heat loss and energy.

Further Alternative Embodiments

Figure 25:
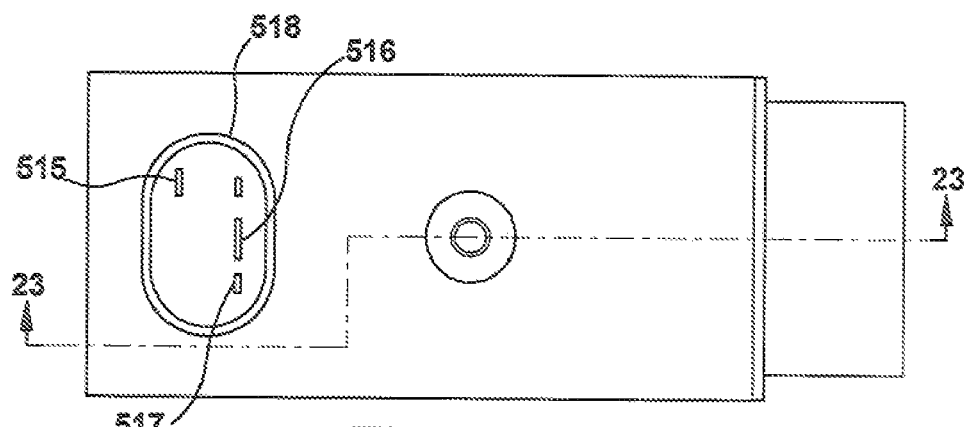
FIG. 25 is a projected top view of the heating assembly depicted in FIG. 23.
Figure 26:
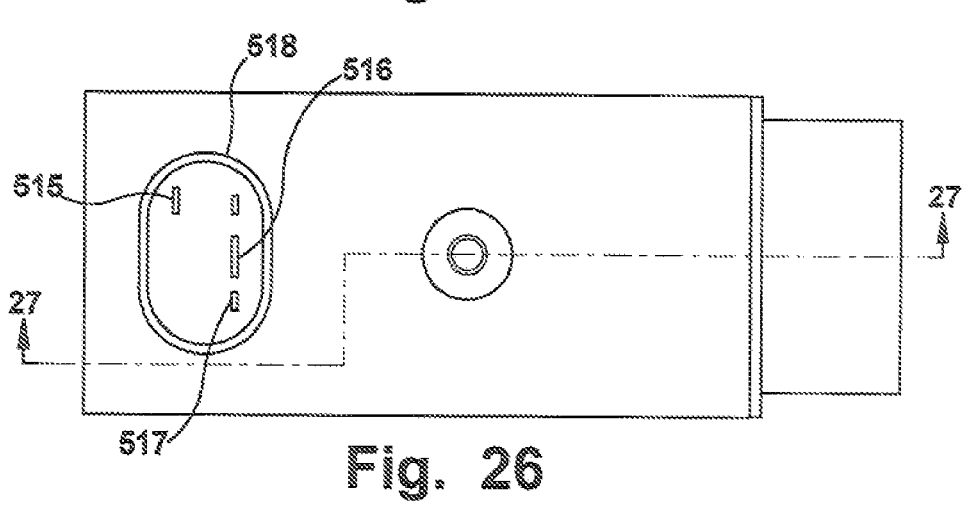
FIG. 26 is a projected top view of the heating assembly depicted in sectional view FIG. 27 of a heating assembly with dual coils constructed in accordance with an additional embodiment of the invention.
Figure 27:
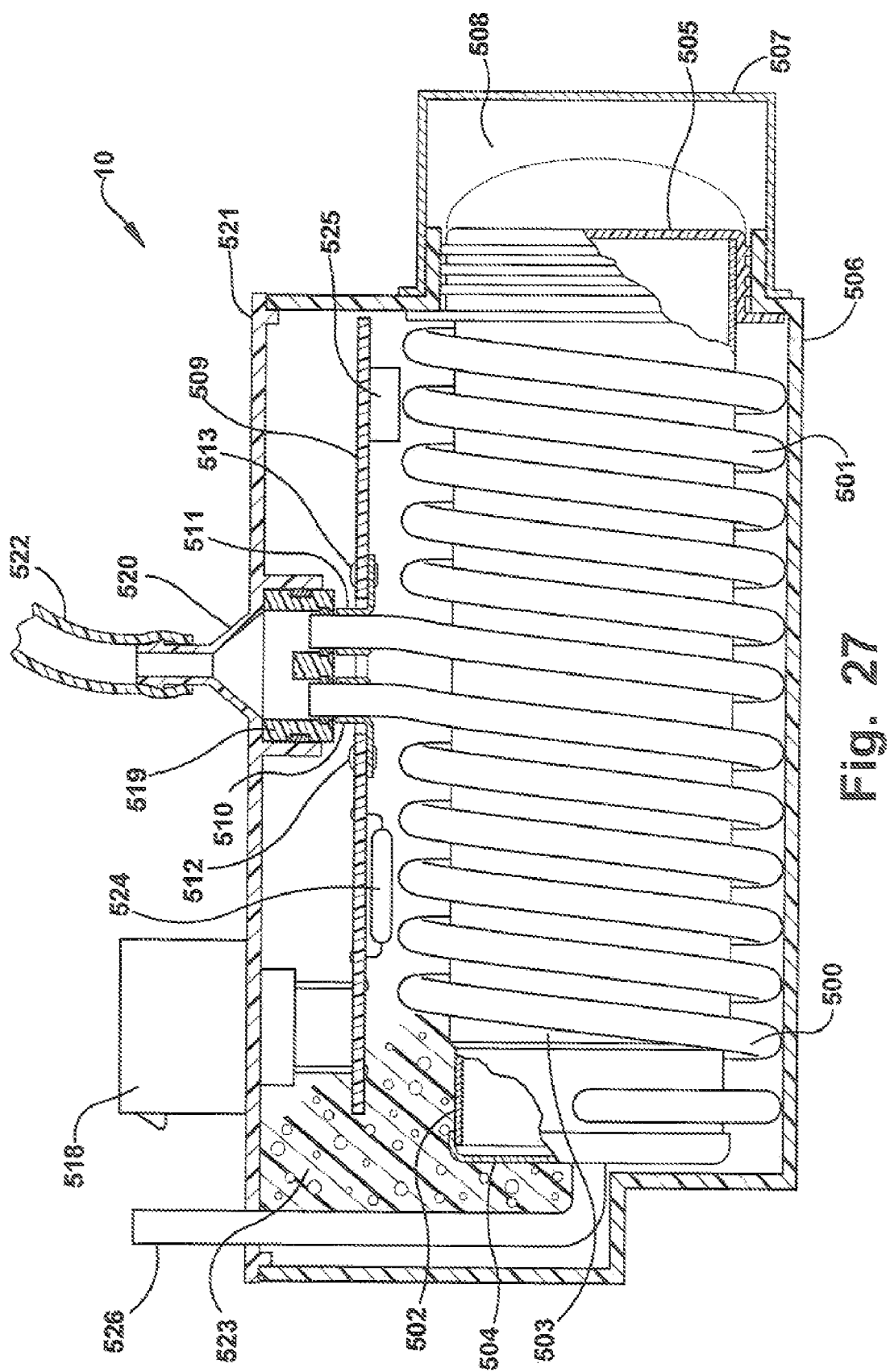
FIG. 27 is a projected top view of the heating assembly depicted in FIG. 26.

Referring to FIG. 23, a washer control system 10 in accordance with another embodiment is shown in cross-section. This embodiment includes features as described in FIG. 22 for reducing pressure drop, as well as compensation for freeze expansion as previously described in FIG. 9 and other embodiments. FIG. 25 represents a projected top view of FIG. 23.

A heater element is comprised of first and second heater coils 500 and 501, which are brazed or otherwise attached to a reservoir 502. An insulator 503 surrounding the reservoir electrically isolates the coils 500, 501 from the reservoir 502. The reservoir 502 is enclosed on one end by cap 504, and on the other by freeze expansion elastic 505, which seals against the open end of a housing 506. The freeze expansion elastomer 505 is protected from damage by a protective cup 507, which is secured against the open end of housing 506. This provides a sealed chamber 508 to allow freeze expansion. A PCB 509 is electrically connected to the heater coils 500 and 501 by means of terminals 510 and 511, which are brazed onto the coils 500 and 501. Rivet fasteners 512 and 513 make a mechanical attachment between the terminals and the PCB.

A power FET component 514 is also attached to the PCB by means of the rivet 512. Battery positive and ground are applied to washer control system 10 through terminals 515 and 516, as shown in FIG. 25. Ignition source is provided through terminal 517. All terminals are electrically connected to the PCB 509. Mating connections are made through connector 518. The heater coils 500 and 501 exit fluid into a fluid coupler 519, where it is dispensed through outlet feature 520 in cover 521. Fluid hose 522 carries heated fluid to the vehicle windshield, headlamps, etc. The exit ends of the heater coils 500 and 501 are sealed into the fluid coupler 519 by means of o-rings. Likewise, the fluid coupler 519 seals into the cover 521 with an o-ring. The washer control system 10 is sealed using potting compound 523.

Figure 24:
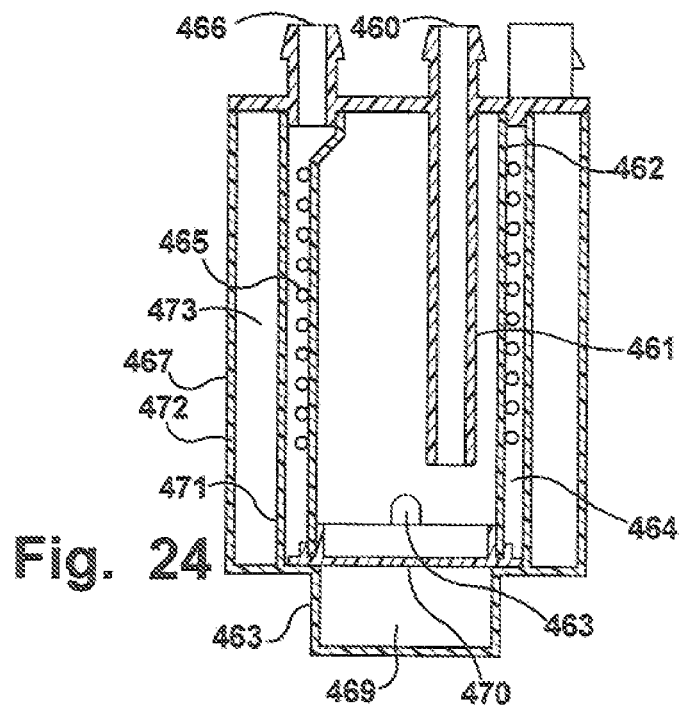
FIG. 24 is a sectional view of a heating assembly including a submerged heater wire and a freeze expansion feature.

Another embodiment shown in FIG. 24 has a primary heating wire 465 submerged in the fluid. This allows for direct heating of the fluid contained in the reservoir 462 as compared to the conduction heating of the fluid by the outer coil through the encapsulant material. The fluid in a reservoir 462 exits an exit port 463 at the bottom of the reservoir and passes into a fluid chamber 464 along an outer surface of the reservoir. The fluid then comes in contact with the heater wire 465, where it is heated before exiting through an exit port 466. In the described embodiment, the heater wire has an uncoiled length of 6 to 7 feet and is constructed of 10 gage stainless steel solid wire. When coiled to the configuration shown in FIG. 24, the coiled heating element has an inside diameter of 1 and ½ inches. A tube 461 extends from the inlet port 460 through a length of the reservoir 462 to route cold fluid to the bottom of the reservoir because as the fluid heats inside the reservoir it tends to rise.

Fluid chamber 464 holds a relatively small volume of fluid to minimize the heating time and allow heat from the heated fluid to then conduct through the wall of reservoir 462 and provide secondary heating of the fluid contained therein. The reservoir 462 is constructed from a plastic material, preferably containing glass fiber reinforcement for better conduction of heat. One suitable reservoir is constructed from glass reinforced High Density Polyethylene (HDPE). Another preferred construction of the reservoir 462 is to include a spiral feature that mates with heater wire 465 and functions to prohibit unintentional electrical shorting of adjacent coils.

As also depicted in FIG. 24, a plastic housing 467 of the embodiment has a stepped bottom portion 468 that has an open chamber 469 sized to allow the elastic member 470 to expand outwardly into the chamber during freeze conditions. The housing 467 is a molded plastic and includes inner and outer walls 471, 472 that define an air gap 473 between the walls. The air gap functions as an insulator for the heated fluid inside the fluid chamber 464 and the reservoir 462. One suitable housing is constructed from glass reinforced High Density Polyethylene (HDPE).

Figure 33A:
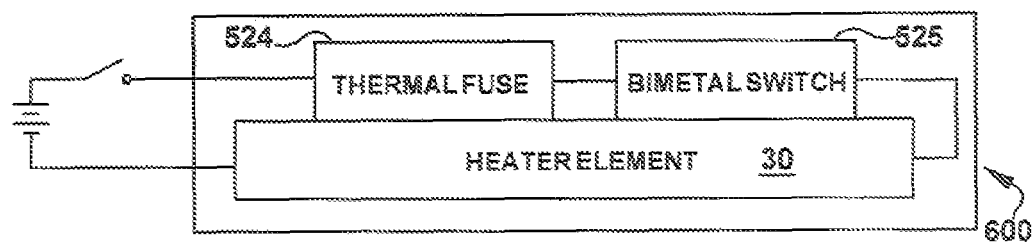
FIGS. 33a and 33b are schematic depictions of control circuits for use with a washer control system constructed according to an alternative embodiment of the present invention.
Figure 33B:
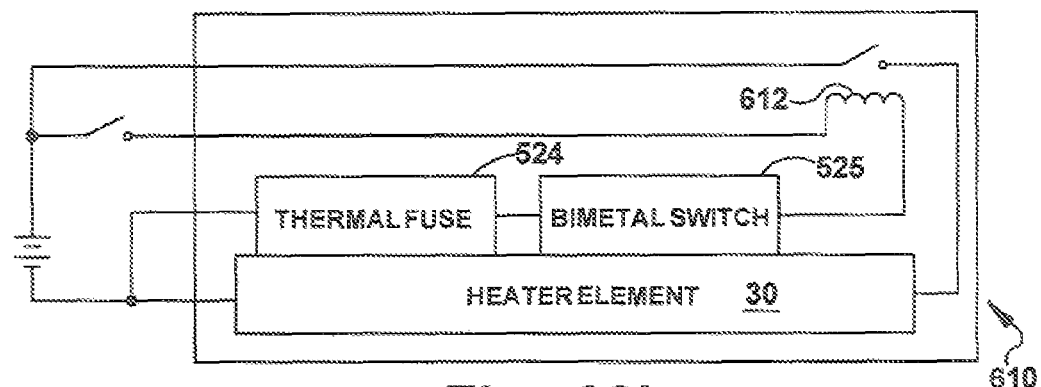

FIGS. 33a and 33b illustrate an embodiment of a washer control system 10 that is different from that described previously due to the replacement of control circuit 14 with a thermal fuse device 524 and a bi-metal device 525. FIG. 33a is a schematic depiction of such a control circuit. The thermal fuse 524 prevents the washer control system 10 from overheating, while the bi-metal device 525 regulates heating during operation. The bi-metal device could control a relay 612 (see control circuit schematic 33b) that supplies power to the heating element. In addition, at least one temperature sensor could be used in conjunction with a reference to control a relay that supplies power to the heating element.

Figure 28:
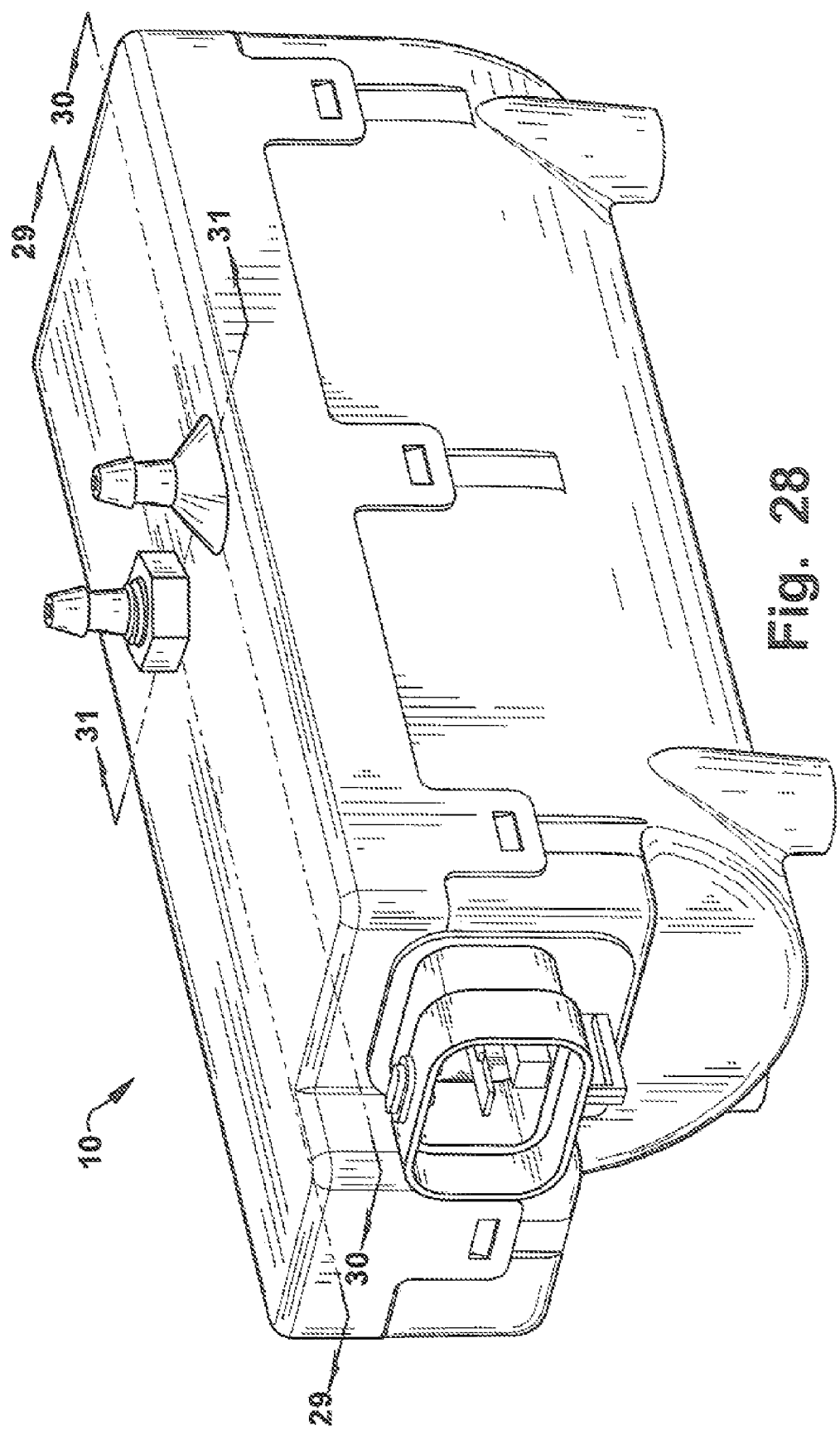
FIG. 28 is an isometric view of a heating assembly with dual coils constructed in accordance with an additional embodiment of the invention.
Figure 29:
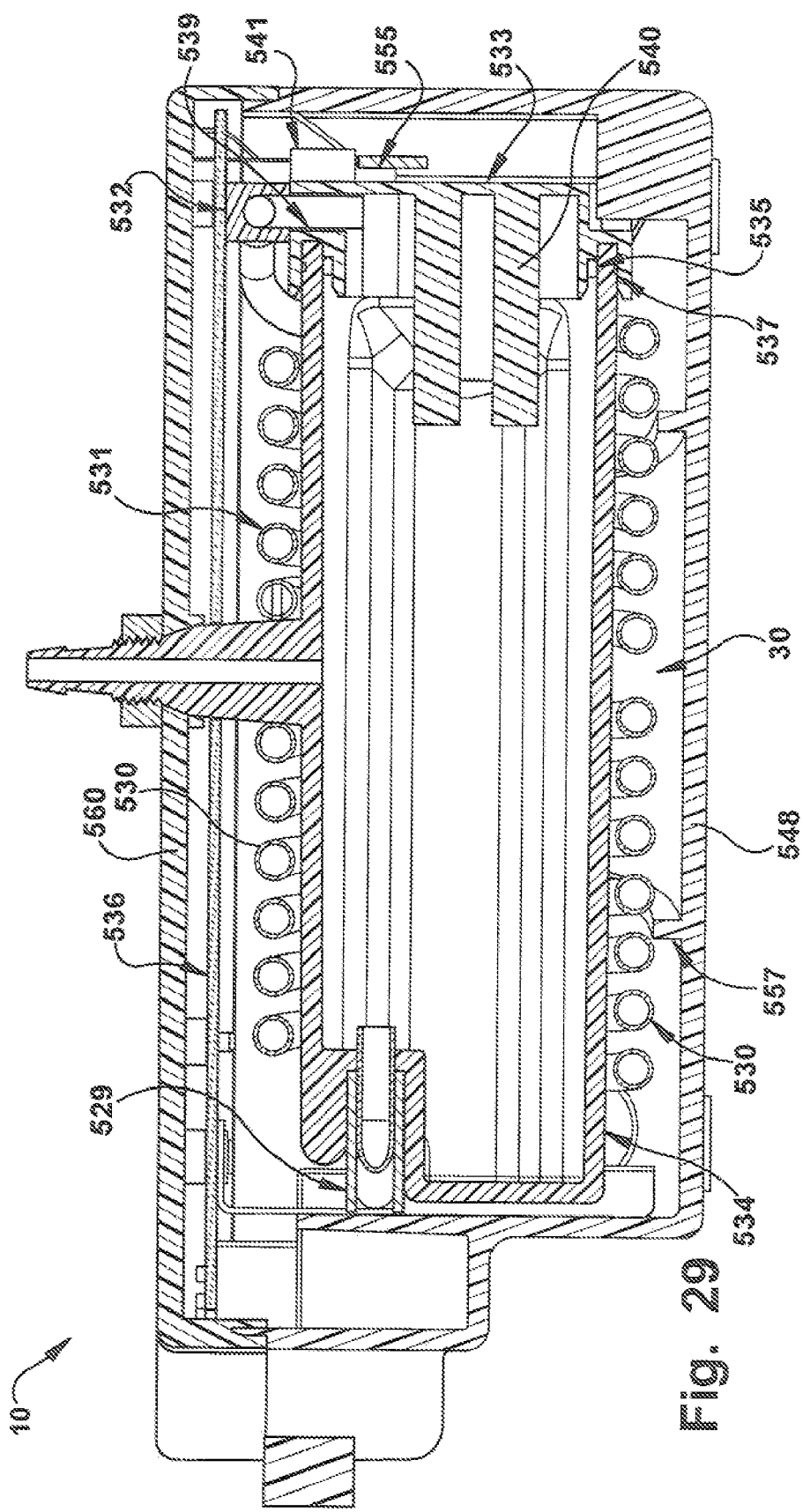
FIG. 29 is a sectional view of the heating assembly shown in FIG. 28.

FIGS. 28 and 29 illustrate a washer control system 10 that includes a heater element 30 that is comprised of first and second heater coils 530 and 531 positioned closely around a reservoir 534. The reservoir 534 is made from a plastic material with a combination of stiffness and flexibility, such as high density polyethylene (HDPE) blended with thermoplastic rubber. The Kuraray Group makes a formulation of 85% HDPE blended with 15% HYBRAR® 5127 thermoplastic rubber. An alternative material could be a polypropylene (PP) such as Marlex® HHX-007 from Phillips Sumika Polypropylene Company). The reservoir 534 is enclosed on one end and open on the other end until joined with reservoir end cap 533, which forms a liquid tight seal by means of inner o-ring 535, and outer o-ring 537. An outer band portion 539 of the end cap 533 provides support for the open end portion of the reservoir 534 against plastic creep from sealing forces exerted by the inner o-ring 535. The outer o-ring 537 provides redundant sealing to prevent fluid leakage during high pressure operation of the washer control system 10. The end cap 533 is made from copper alloy for electrical and thermal conductivity properties, employing powder metallurgy processing techniques in the preferred embodiment. The end cap 533 could also be made from other materials with good thermal conductivity properties, such as brass or aluminum, and could be manufactured using other methods such as die casting.

Figure 38:
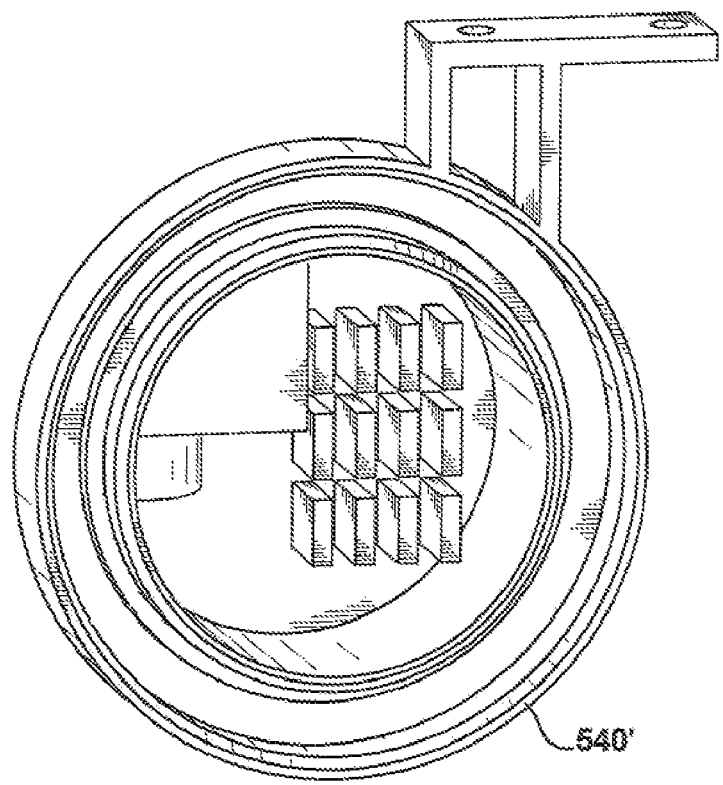
FIG. 38 is a perspective view of an end cap component used in the washer control system of FIG. 34.

The reservoir 534 could have both ends open, using another metal end cap similar to that described for end cap 533 to make a fluid container. A power FET component 541 is soldered to the PCB 536 and then attached to the end cap 533 by means of fastener 555. The end cap 533 is constructed with a plurality of heat-sink projections 540 which project into the fluid chamber of the reservoir 534, allowing the power FET 541 to dissipate heat during operation. In the preferred embodiment, the heat-sink protrusions 540 are generally round in shape, but could be any shape that provides adequate surface area for heat-sinking performance, such as heat-sink protrusions 540' shown in FIG. 38.

The washer fluid contained inside the reservoir 534 acts to cool the heat-sink contact surface by means of thermal conduction through the copper material of end cap 533. Conversely, the dissipating heat from the power FET 541 thermally conducts heat into the washer fluid contained in reservoir 534 to provide added heat for cleaning, thereby increasing performance efficiency. An adapter 532, preferably also made from powdered metal copper alloy, can be fastened to the end cap 533 by any means well known in the art to provide a liquid tight seal with good electrical connection, including brazing, soldering or welding. The preferred method of fastening is by means of bonding into a one-piece part with the end cap 533 during sintering in the powdered metal process.

Referring to FIG. 29, the coil 530 can be fastened to reservoir adapter 532 by any means well known in the art to provide a liquid tight seal with good electrical connection, including brazing, soldering or welding. The preferred method of fastening is by means of flaring the tube end and connecting with compression fitting to the adapter 532. Coils 530 and 531 are electrically connected to each other by means of bus bar 545, which is made from a spring brass or copper material for current carrying capability. The bus bar 545 has two holes with die cut spring features for providing a press or interference fit when the coils 530 and 531 pass through the holes in assembly, eliminating the need to mechanically and electrically attach parts with soldering, brazing or welding methods. The PCB 536 is electrically connected to the heater coil 531 by means of an adapter 532, which extends to be in contact with a printed copper conductor on PCB 536 and is secured in place with a fastener. Likewise, the heater coil 530 electrically connects to the PCB 536 by means of an adapter 529, which extends to be in contact with a printed copper conductor on the PCB 536 and is secured in place with a fastener (not shown).

Referring to FIG. 32, terminals 562 and 546 are tin plated brass conductors for carrying high current from the vehicle battery to the PCB 536. In the preferred embodiment, these terminals are 0.250 inch wide and 0.032 inch thick, and are constructed with features intended to secure them into the connector shell 547 using methods well known in the art. Tab portions of terminals 562 and 546 pass through the openings in PCB 536 and are soldered to make the electrical connection of the coils 530 and 531. In the preferred embodiment, the tab portion is crimped once it passes through the PCB 536 in order to provide a mechanical connection during solder processing.

Figure 30:
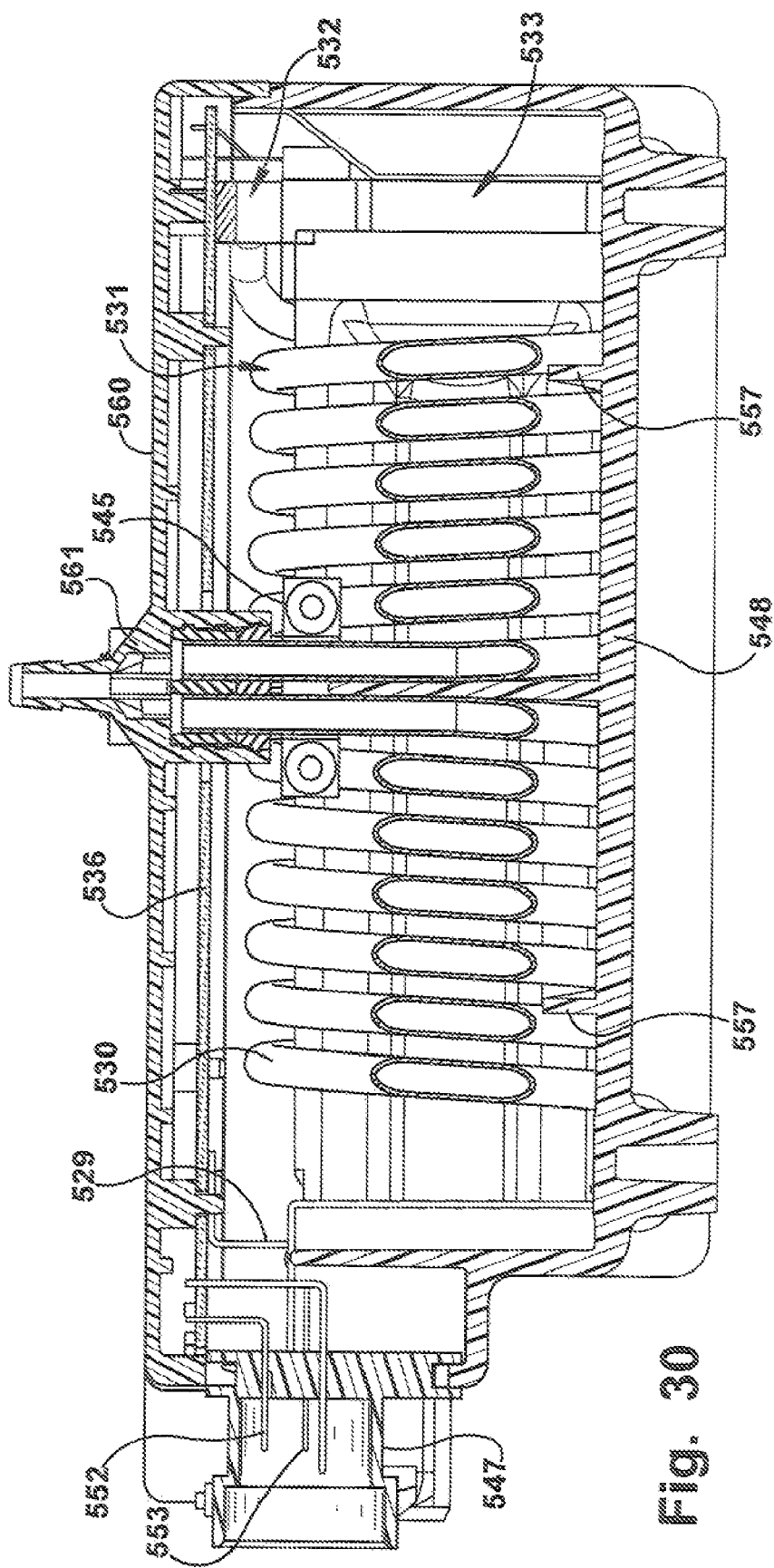
FIG. 30 is a sectional view of the heating assembly shown in FIG. 28.

A connector shell 547, which is preferably made from 30% glass reinforced polybutylene-terephthalate (polyester PBT), such as G.E. Plastics Valox® 420, also accepts terminals 549, 550, 551, 552 and 553, which also pass through openings in the PCB 536 and are soldered in place to carry electrical signal commands to and from a control circuit such as the control circuit 14 (FIG. 1). The terminals 549, 550, 551, 552 and 553 are preferably made from tin plated brass. The connector shell 547 secures into housing 548 by means of matching tongue and groove features in each part, and seals (not shown). The housing 548 is preferably made from 30% glass reinforced polybutylene-terephthalate (polyester PBT), such as G.E. Plastics Valox® 420, and accepts heater assembly 556. A plurality of ribs 557 extend from the walls of the housing 548 and function to locate the coils 530 and 531, keeping them electrically isolated. In addition, ribs 557 provide support for the heater assembly 556. The PCB is supported on alignment bosses 597 (FIG. 30) molded into the housing 548. The PCB 536 is sealed against the shelf with silicone or other such types of adhesive gasket forming materials. A cover 560 is preferably made from 15% glass reinforced PBT such as G.E. Plastics Valox® DR51.

Another source of heating for the fluid contained in the reservoir 534 is by means of heat radiated off the heated coils 530 and 531. The heat contained within the housing 548 thereby acts to warm the fluid contained in the reservoir 534, again increasing performance efficiency. Heat radiation can be enhanced by means of providing a reflective surface on the inside of housing 548. Black and other colored plastics would absorb heat, causing radiated heat from coils 530 and 531 to dissipate away from reservoir 534. A reflective surface, such as one that may be applied by means of vacuum deposition for instance, selectively plated to the walls of the housing 548 adjacent to the coils 530 and 531, would assist in keeping the radiated heat contained.

Figure 44:
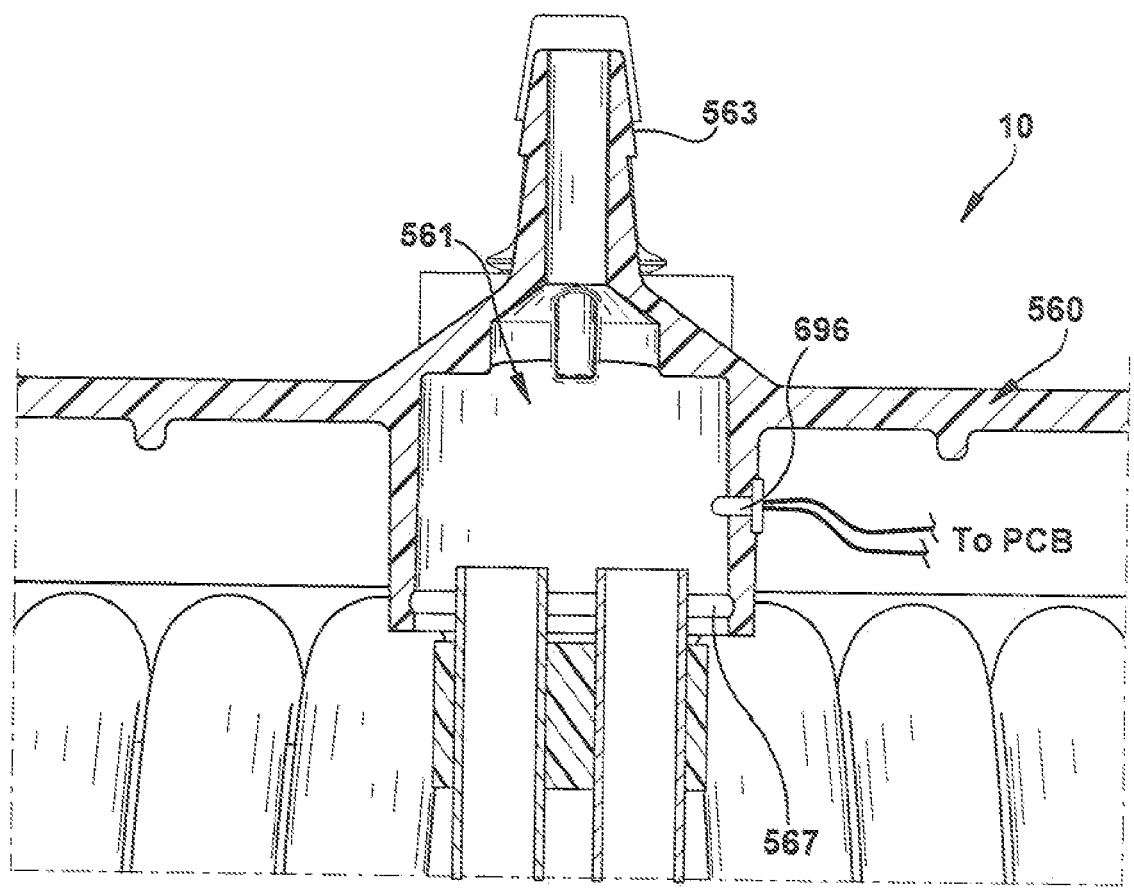
FIG. 44 is a partially section view of a control wherein probes sense alcohol content of washer fluid.

Battery positive and ground are applied to washer control system 10 through terminals 562 and 546, as shown in FIG. 32. Ignition source is provided through terminal 549. The heater coils 530 and 531 exit fluid into a fluid coupler 561, as shown in FIG. 44, where it is dispensed through an outlet feature 563 in a cover 560. A fluid hose (FIGS. 16 and 21) carries heated fluid to the vehicle windshield, headlamps, etc. The exit ends of heater coils 530 and 531 are sealed into the fluid coupler 561 by means of a seal 567. Fluid coupler 561 is integral to cover 560. The washer control system 10 can be sealed using potting compound such as is shown in FIG. 23, reference character 523.

Referring to FIG. 31, a cross-section view from the end of washer control system 10 shows reservoir 534 is shaped with inwardly contoured spring features 541, 542, 543 and 544. During conditions where the fluid is allowed to freeze inside reservoir 534, the spring features 541, 542, 543 and 544 can expand outward to accommodate the volume of the frozen fluid. The flexible properties of plastic reservoir 534 is such to allow expansion for preventing damage that would cause fluid leakage, and contraction for return to its pre-expanded shape. A further function of the contoured spring features of reservoir 534 is their strength to withstand normal operation fluid pressure, which could be as high as 50 psi. It is important that reservoir 534 maintain its non-expanded shape during operation in order to avoid extra fluid exiting the vehicle spray nozzles following a wash command by the user. If operating pressure causes reservoir 534 to expand, unwanted extra fluid can be dispensed when pressure is relieved following a user ending a wash command. Pressures higher than 50 psi, such as those caused by the expansion of freezing fluid, allow spring features 541, 542, 543 and 544 to move outwardly.

Figure 34:
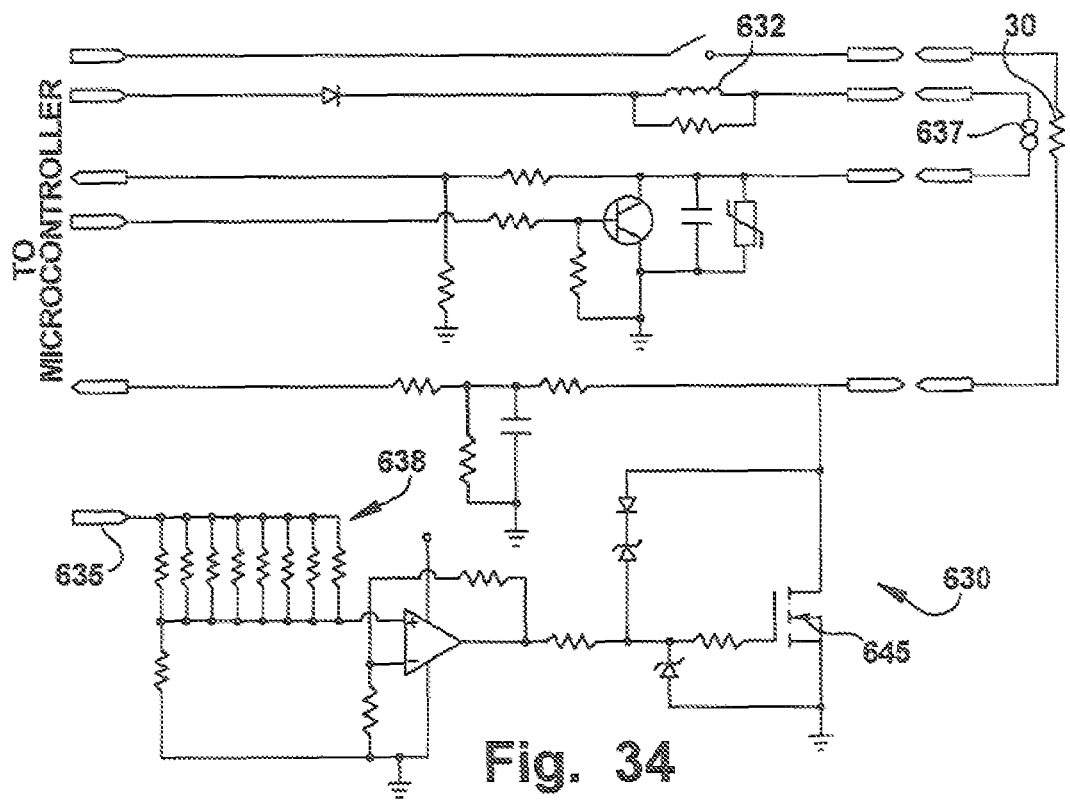
FIG. 34 is a schematic depiction of a control circuit for use with a washer control system constructed according to an alternative embodiment of the present invention.

FIGS. 34-38 illustrate an alternative embodiment of the inventive washer system. Referring to FIG. 34, the heater 30 is energized with battery voltage by a relay 632 that is activated by ignition of the vehicle. A thermal fuse 637 is in series with the relay coil and is in proximity to the heater coil 30. If the heater coil becomes too hot, the thermal fuse will open and voltage is removed from the heater. The control circuit 14 shown in FIG. 1 provides a digital signal to a heater energization circuit 630 shown in FIG. 34. The digital signal 635 from the controller is converted to an analog voltage by a converter circuit 638. The converted voltage is provided to a FET 645 as a gate voltage. The gate voltage varies between zero to a FET saturation voltage. The FET 645 is part of a current path for the heater 30 and dissipates an amount of heat that is proportional to the driving voltage that is supplied to it. Since battery voltage is monitored, and the resistance of the heater coil is known, current flowing through the heater can be calculated by the control circuit 14 to set and regulate the gate voltage. By controlling the relative amounts of power dissipated in the FET and heater coils, the control circuit can apply varying amounts of heat from each of the two heat sources to maintain a desired fluid temperature.

Figure 35:
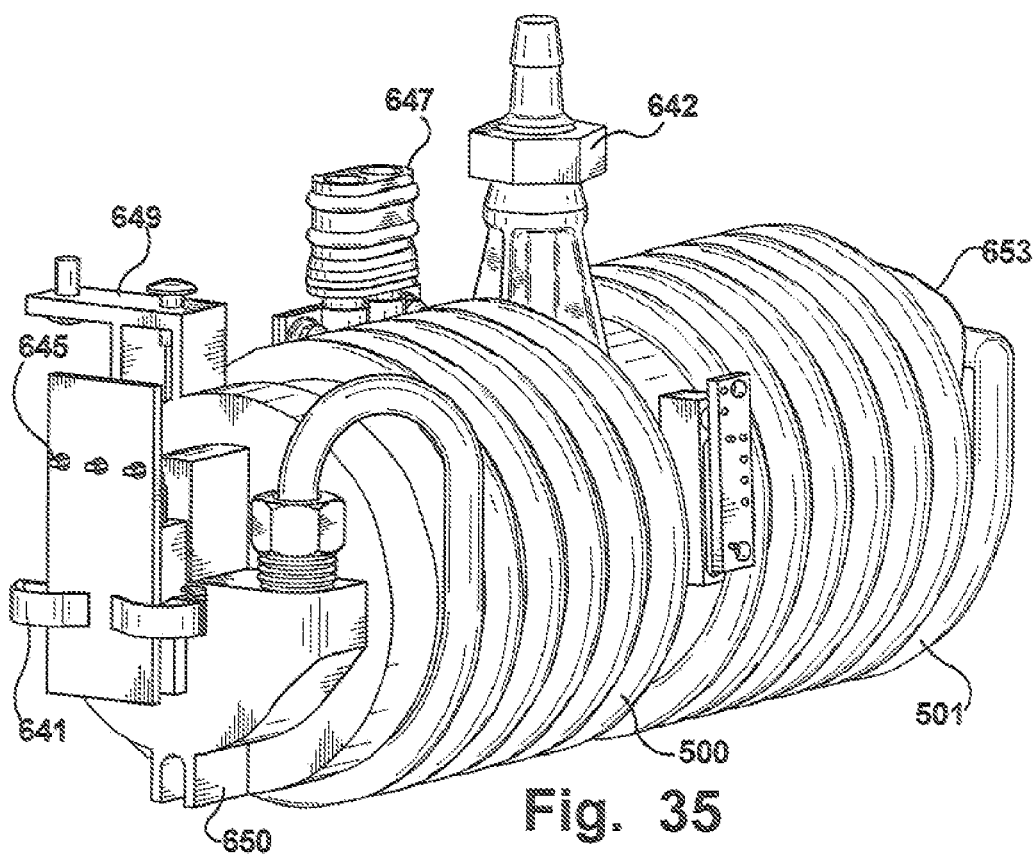
FIG. 35 is a front perspective view of a washer control system constructed according to an embodiment of the present invention.
Figure 36:
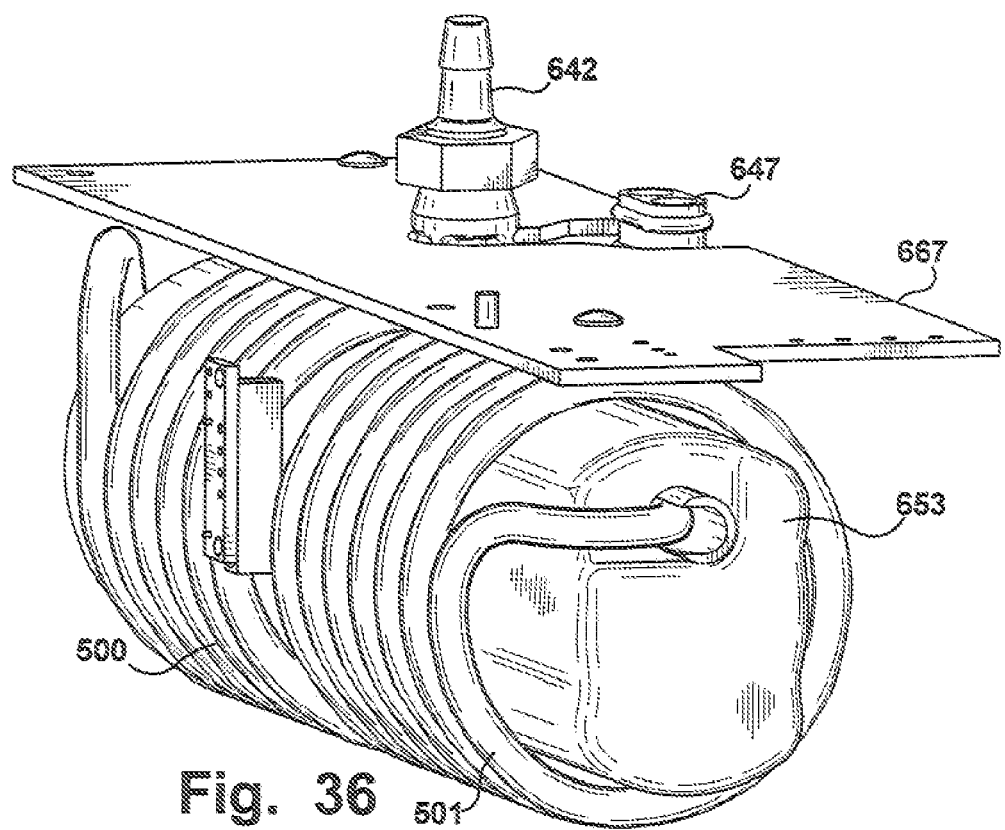
FIG. 36 is a rear perspective view of the washer control system of FIG. 34.
Figure 37:
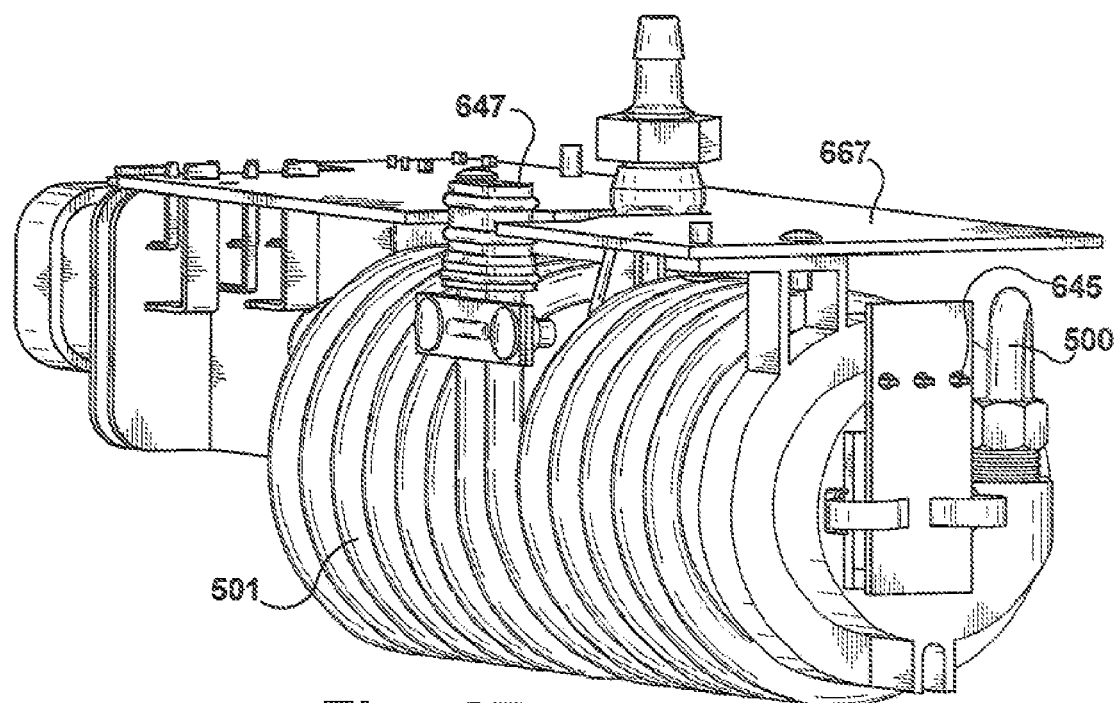
FIG. 37 is a side perspective view of the washer control system of FIG. 34.

FIG. 35 is a perspective view of washer control system that includes the heater energization circuit described in conjunction with FIG. 34. A reservoir 653 is surrounded by heater coils 500, 501. Fluid enters the reservoir through inlet 642. Fluid flows from the reservoir 653 to the heater coil 500 through an end cap 650. Fluid exits the nozzles through an adapter 647 that has an outlet for each heater coil. The FET 645 is mounted on a dedicated board held in place with a clip on the end cap 650. The thermal communication between the FET 645 and the end cap 650 allows heat to be conducted from the FET through the end cap into the reservoir 653 to heat the fluid in the reservoir prior to its entry into the heater coils. FIGS. 36 and 37 show the washer control system with a circuit board 667 that houses the control circuit 14. The heater coil 501 can be seen as it is connected to the reservoir 653.

Figure 39:
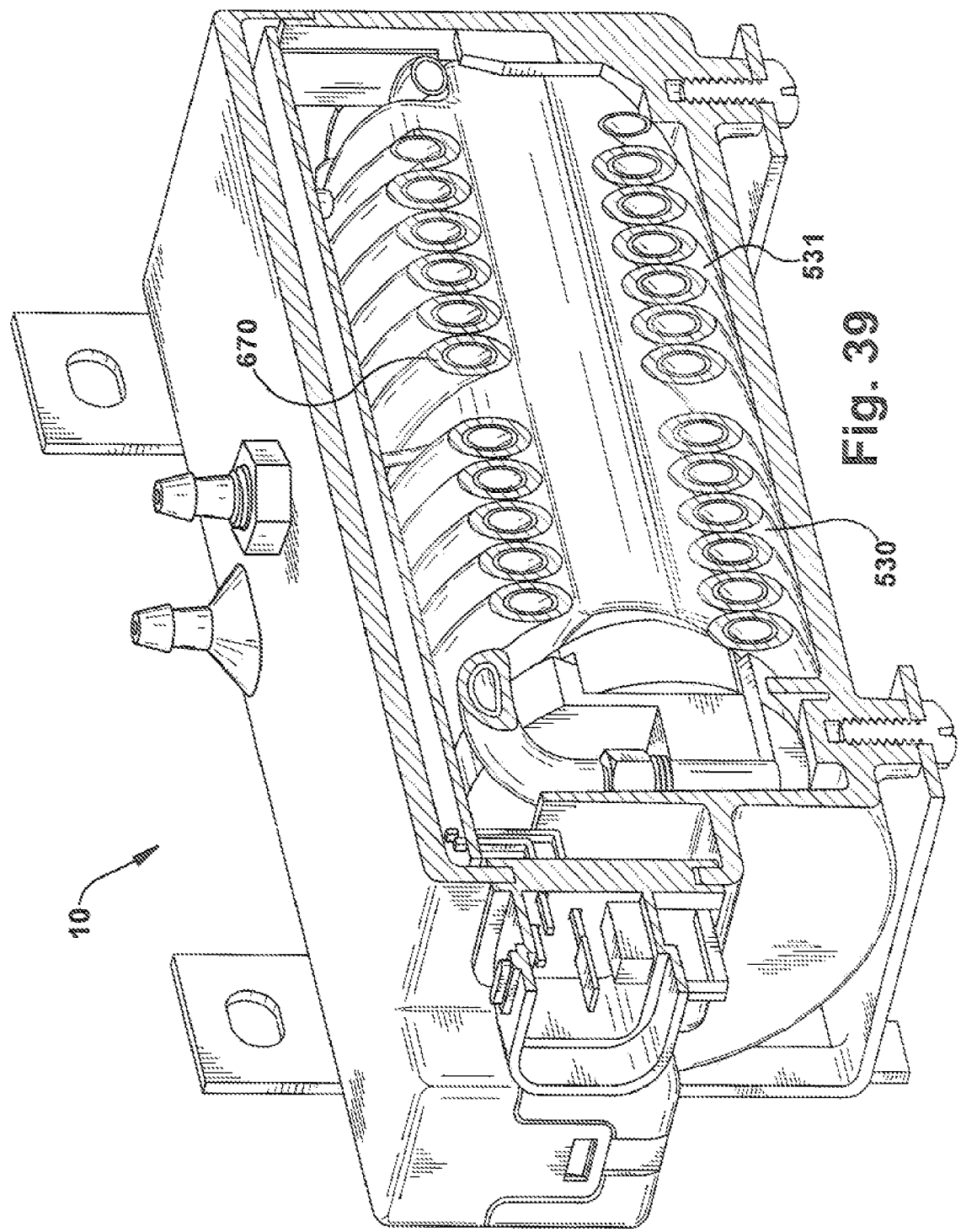
FIG. 39 is a section view of washer control system showing heater coils covered with an elastic material constructed according to an alternate embodiment of FIG. 24.

Referring to FIG. 39, a section view of control system 10 shows heater coils 530 and 531 covered with an elastic material 670. During conditions where fluid is allowed to freeze inside the heater coils, it is well known that the metal tubing from which they are constructed will expand. After repeated freeze and thaw cycles, the metal can expand to the point where it yields completely, causing thawed fluid to leak out of the control system 10. In the preferred embodiment, the fluid containing heater coils 530 and 531 are enclosed within elastic material 670, which can be any material such as urethane tubing, nylon tubing or the like, covering the majority of the surface areas of heater coils 530 and 531 to contain fluid within the heating element, ensuring that control system functionality is maintained even if the metal heating coils burst.

The heater coils 530 and 531 could also have a multiplicity of notches introduced to the heater element surfaces to serve as stress concentration points for the purpose of directing the described expansion yield point to a specific location or locations. These notches could be very shallow details, approximately 0.005 inch in depth and 0.25 inches in length, located approximately 3 inches apart or the like. The sectional shape could be in the form of a "V" to accentuate the stress concentration. The introduction of such notches would serve to force ruptures to occur in a controlled location.

In a preferred embodiment, elastic material 670 is non-electrically conductive. Those properties provide a further function of elastic material 670 to electrically insulate heater coils 530 and 531 to prevent electrical shorting.

Figure 40:
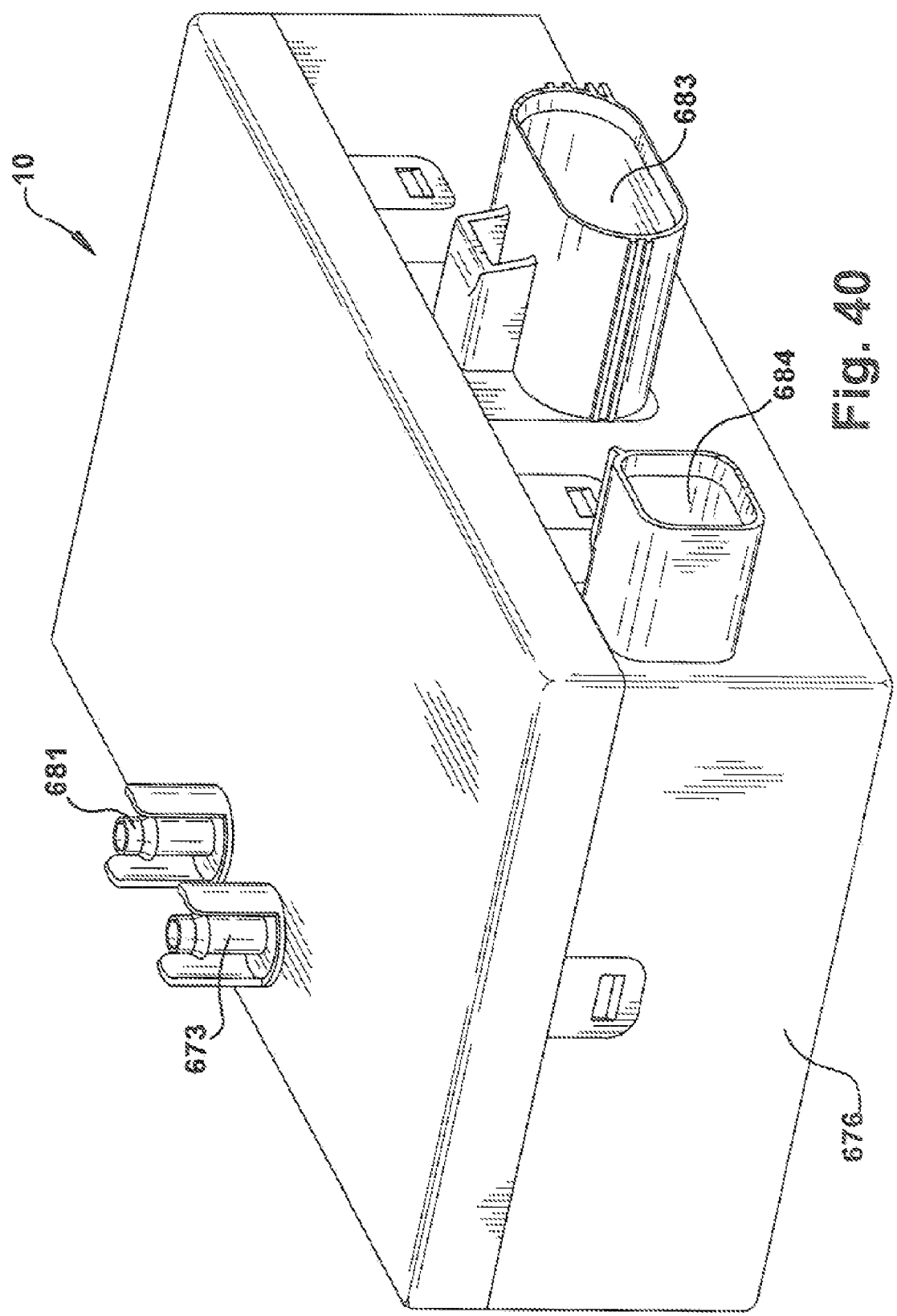
FIG. 40 depicts an alternate embodiment of washer control system.
Figure 41:
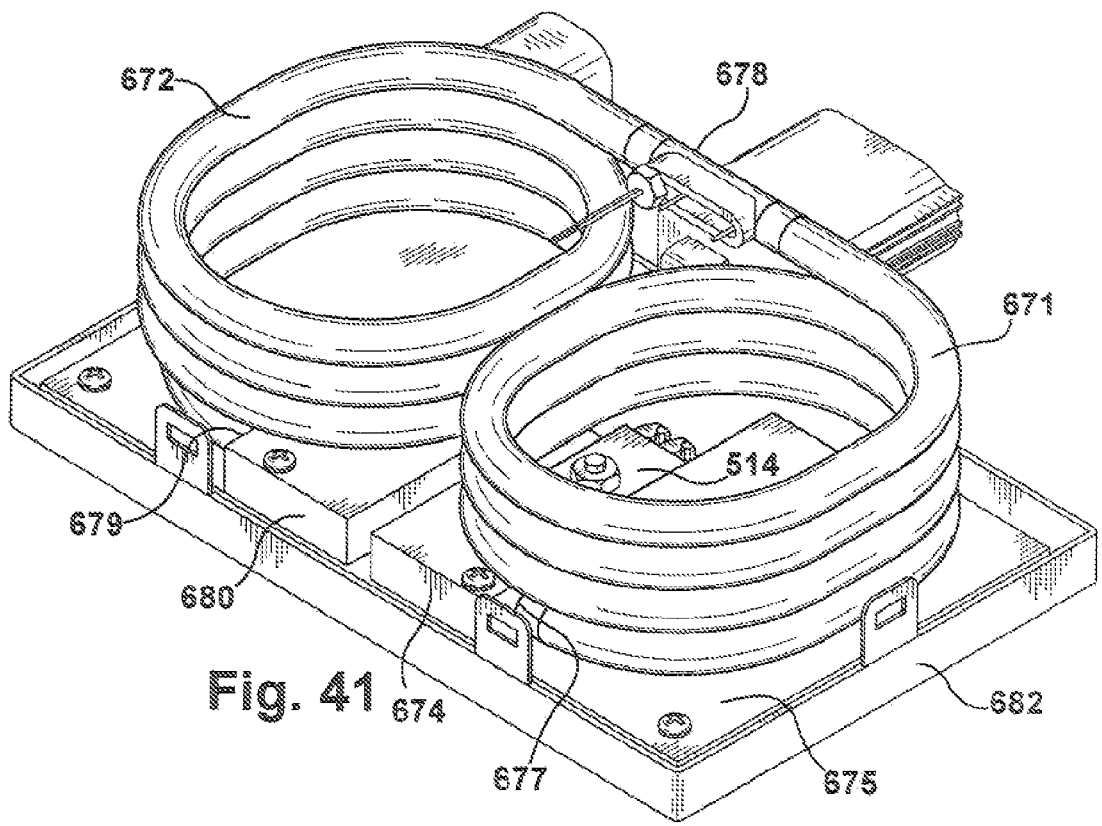
FIG. 41 is a rear perspective view of the washer control system with cover removed.
Figure 42:
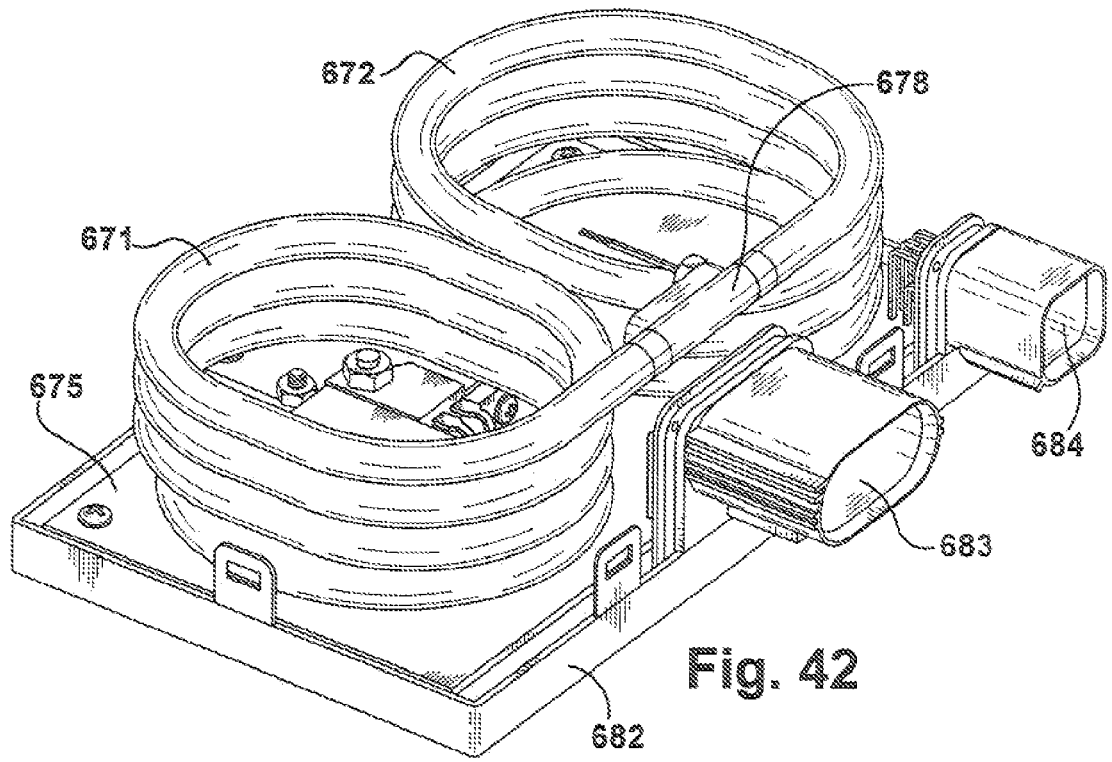
FIG. 42 is a front perspective view of the washer control system with cover removed.

FIGS. 40, 41, and 42 depict an alternate embodiment of control system 10. FIGS. 41 and 42 show the system with a cover component 676 removed. In this embodiment, control system 10 receives fluid through an inlet port 681 that then enters into a heatsink 674. A previously described power FET component 514 is electrically and mechanically attached to printed circuit board (PCB) 675, using well known methods, and is joined with heatsink 674 by means of a threaded fastener or the like. The heatsink 674 is preferably made from copper, or alloy materials such as aluminum that are similarly effective in thermal transfer. The heatsink 674 is configured such to contain a small volume of fluid, preferably situated directly opposite the flat mounting surface of power FET 514, ideally for the purpose of cooling power FET 514 during system operation. Conversely, heat transferring from power FET 514 through the heatsink 674 serves to heat the fluid in the reservoir area, adding to the performance of control system 10. Heatsink 674 also provides electrical connection between the PCB 675 and the first heater coil 671. Fluid passes from heatsink 674 into first heater coil 671 through aperture 677, through temperature sensor fitting 678 and into second heater coil 672. Fluid dispenses into check valve block 680 through an entryway 679 and exits control system 10 by means of outlet port 673. Check valve block 680 also provides electrical connection between PCB 675 and second heater coil 672, and is preferably made from copper, or any alloy material capable of withstanding long term exposure to typical fluids used in vehicle washer systems. The assembly as described is preferably attached to base component 682 and enclosed in the cover 676, which are preferably molded from plastic material such as 30% glass reinforced polyester, such as that made by GE Plastics under the trade name Valox®. There are many other suitable materials available capable of withstanding the environment and conditions typical of those under a vehicle engine compartment. Power is supplied to this embodiment of control system 10 by means of a connector assembly 683, while input and output commands are administered by means of a connector assembly 684.

Figure 43:
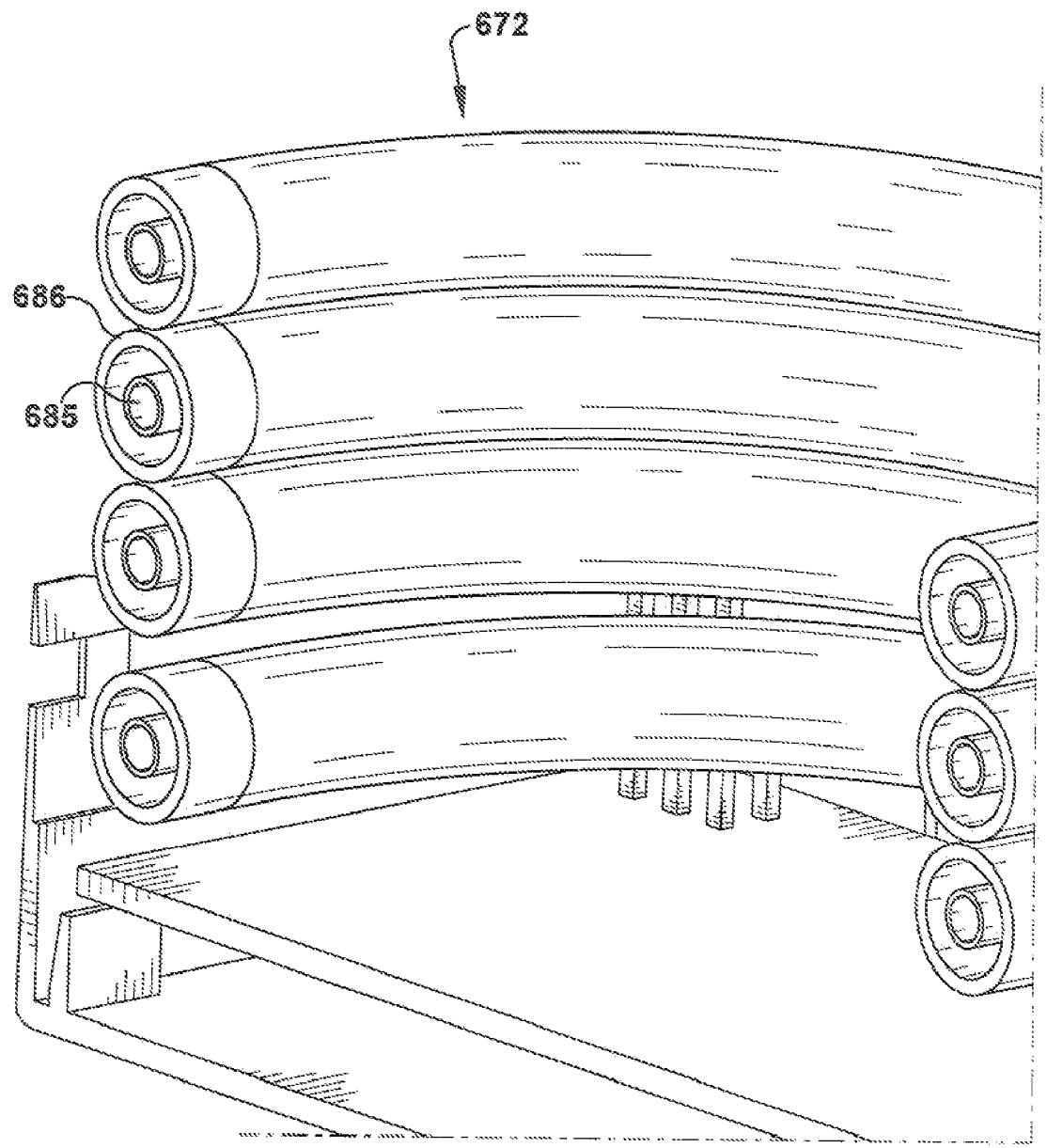
FIG. 43 is a section view of heater coil constructed according to an alternate embodiment with fluid internal and external to the heater.

Referring now to FIG. 43, a section view is shown of heater coil 672 within control system 10. A portion of washer fluid is allowed to pass through heating element 685, while another portion flows outside and is contained within loosely fit outer tube 686. Fluid enters both tubes generally simultaneously through the outlet 677 of heatsink 674 and both portions exit generally together through the inlet 679 to check valve block 680. Fluid is heated by being in direct contact with both the inside and outside diameters of heating element 685 along its entire length. The same inner and outer tubing arrangement described here is present in heater coil 671, which is not shown in FIG. 43.

As previously disclosed, the heating element 685 is made from an electrically conductive metal, preferably type 304 stainless steel, but could be any material with similar high electrical resistivity properties capable of conducting electricity dependent on the size restraints of a particular control system application. Outer tube 686 is preferably made from an electrically non-conductive material with elastic properties that is expandable during freeze conditions, thereby preventing loss of both fluid and system functionality in the event of a break in a heating element. It is preferred that this material also exhibits characteristics of strength in order to maintain its general size and shape in withstanding typical vehicle washer system operating pressures, which could be as high as 50 psi. One adequate material for this purpose is nylon 12.

This embodiment of the heater coil also ensures that a desired system fluid flow can be maintained. System size restraints often dictate the necessary tubing size required for given performance, and those restraints in some embodiments can result in undesirable fluid pressure drop at the nozzles where the fluid is dispensed onto a surface as previously described. In the embodiment as shown in FIGS. 40-43, a longer length of heating element 685 can be configured with a smaller inside diameter in an effort to reduce the overall size of control system 10. The resulting pressure drop along the length of the heating element caused by restricting the fluid flow through the small inside diameter of heating element 685 may not meet acceptable performance requirements for the system. However, if the heating element 685 and outer tube 686 are collectively used to convey heated fluid, sufficient flow to a vehicle windshield surface or the like is provided if the passageways are properly sized.

A further embodiment allows for the determination of alcohol content of the washer fluid. If the alcohol to water ratio is know with some level of particularity, it is possible to alter the temperature threshold accordingly to achieve higher temperatures if there is a higher concentration of water. It is well known that alcohols used in washer fluid will boil at a temperature lower than that of water. Typically, the boiling points of said alcohols are around 150° F. while water is at 212° F. Raising the temperature threshold based on alcohol content may allow for improved efficiency in the removal of frost/ice and protein deposits. A further function of knowing the concentration of alcohol in the washer fluid is to provide a warning to the operator in the event of inadequate alcohol so that damage to the system will not occur due to freezing.

Referring to FIG. 44, a section view of control system 10 shows probe 696 mounted in the lid 560 of control system 10. The probes protrude through a wall section of the lid and into communication with fluid contained within the fluid coupler 561. Signals of some particularity are then placed on probe 696 for the purpose of providing signals to circuitry located on a printed circuit board that can be used to determine an approximation of the dielectric constant of the fluid. The dielectric constant of isopropyl alcohol is approximately 18 at 68° F. and that of water is 1 at 68° F. It can be seen that the ratio of water to alcohol can be derived by using the dielectric constant of the fluid. This method can be used to determine the alcohol content of the washer fluid. Additional details of alcohol sensing are found in issued U.S. Pat. No. 7,055,505 B2 which is incorporated herein by reference.

A further embodiment the heater assembly is integrated into a wiper motor system. Referencing FIG. 47 the system 700 contains the elements of heater assembly 10 and wiper control electronics typically found in an automotive environment. The system further consists of a motor, linkages, gears, wiper arms and the like of a typical automotive wiper system. Integrated control 710 is mounted to the wiper arm assembly forming a wiper motor and heated washer system. Fluid flow going to spray nozzles may be remote from the heated washer system or the spray nozzles may be integral with the windshield wiper arm portion of the wiper arm assembly. It is understood that the electronic control could also be mounted integral to the motor housing. The control accepts input to energize the wiper motor either continuously or on an intermittent or delayed basis. The control also accepts input to instigate the heating functions. It is understood that the control electronics could be packaged remotely from the wiper assembly. It is further understood that the control electronics with the heater function could be located remotely from the wiper assembly.

Figure 47:
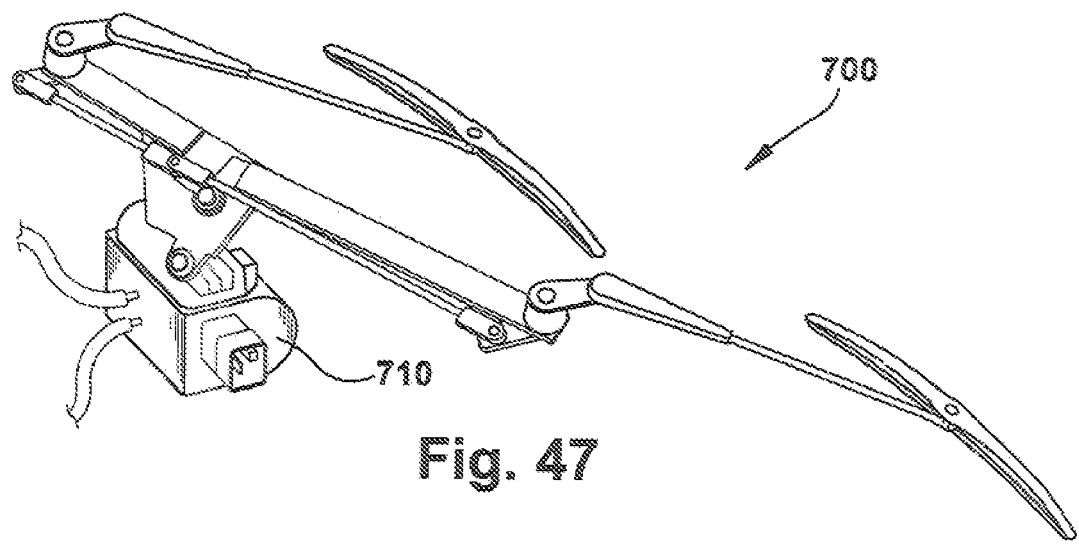

A further embodiment of the heater and wiper motor assembly referenced in FIG. 47 is to integrate the washer pump function into the assembly. Washer pumps are typically found in or in proximity to the washer fluid reservoir which may or may not be in proximity to the wiper motor. A typical washer pump consists of components typical of a dc motor driven pump such as an armature, a motor shaft, an impeller, brushes, etc. The embodiment shown in FIG. 48 has integrated the washer pump function into the wiper motor assembly to provide a common assembly 800 for driving the windshield wipers 802, 804.

Figure 49:
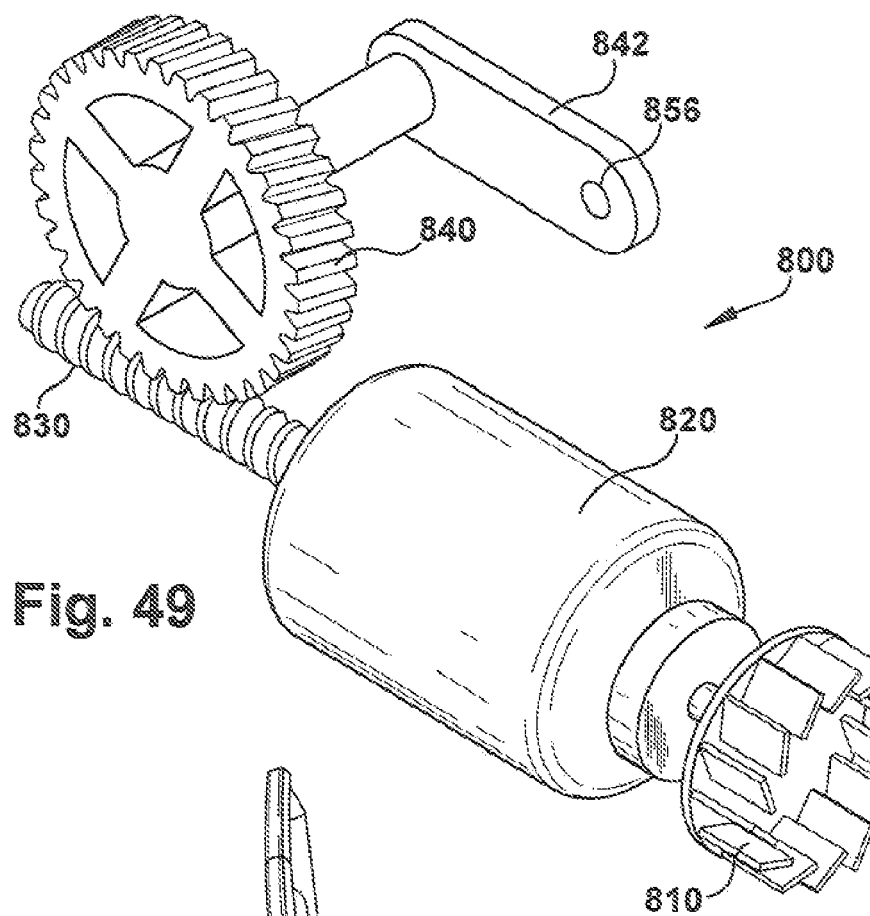
FIG. 49 detailed drawing of pump components and wiper motor components.

FIG. 49 shows pump components and the wiper motor components that make up a part of assembly 800. An electric motor 820 drives a worm gear 830 that is connected to a motor output shaft. The worm gear 830 in turn rotates a drive gear 840 that is connected to a wiper arm mechanism 842. Wiper arm mechanism 842 connects to wiper arm drive linkage 855 using a bearing pin or shaft through hole 856. Worm and worm gear design is a well known art and design guidelines can be found in various sources such as on Page 1876 of the Machinery's Handbook, $23^{rd}$ edition, Third printing 1990, printed by Industrial Press Inc., 200 Madison Ave., New York N.Y. 10015-4078. Conversion of rotational motion of the mechanism 842 into back and forth motion of a wiper blade is a well known and can be accomplished in a number of ways.

Typically the motor shaft and worm gear are rotating at a rate approximately 50 times faster than the drive gear 840. This higher speed on the motor shaft can be used to drive an impeller 810 located in a pump housing 812 (FIG. 50) that will pump washer fluid whenever the wiper motor is active. The impeller could be activated by use of a clutch mechanism 815 (FIG. 50) that will connect the impeller 810 to the drive shaft of the motor 820. The clutch mechanism 815 is electrically activated whenever the washer button or switch 113 in the vehicle is pressed or when the washer heater control 14 requests washer activation. Alternately a fluid driven clutch mechanism could be used.

In the event washer arm 806 is not able to move due to mechanical issues or the blade being frozen to the windshield, the washer pump is prevented from dispensing fluid. If fluid was allowed to be dispensed it could adversely effect the driver's vision.

It is understood that the impeller could be mounted through a gear mechanism or flexible coupling that will change the orientation to the motor by an angle such as 90 degrees. It is further understood that if a different speed of rotation is needed for the impeller various standard means such as gear trains could be employed to achieve the desired rate of rotation. It is clear from the description that there is a cost advantage to be realized by the removal of a motor housing, an armature, a shaft, motor brushes, and other various components by using an existing motor to accomplish fluid pumping and wiper arm movement.

Figure 50:
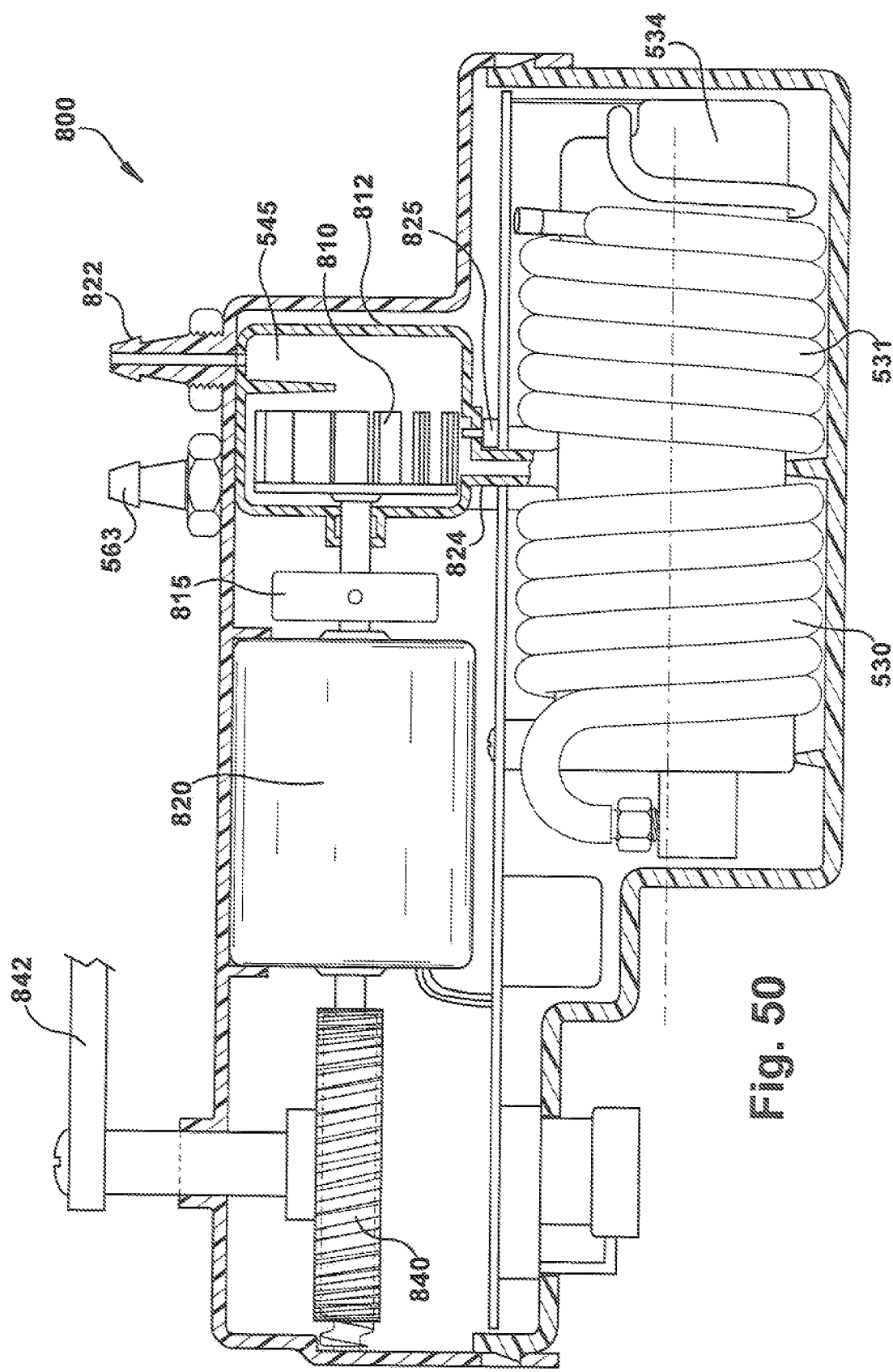
FIG. 50 is a partially section view of a wiper, washer, heater system.

As depicted in FIG. 50, the pump portion of assembly 800 would pull fluid from a washer fluid reservoir (not shown) through an inlet 822 whenever the wash function is requested by the vehicle operator. On demand pumping of fluid would dictate that the pump would need be self priming or be primed and ready to dispense fluid. Typically in automotive washer systems there are check valves in the washer system to prevent the back flow of fluid from the washer nozzles to the fluid reservoir. The check valve can be located in the fluid path located in the reservoir 534; other systems have check valves located in the spray nozzles such as those from Daimler Chrysler Corporation. The use of check valves will ensure that fluid is in the pumping chamber 545 in which impeller 810 resides. In the event that there is no fluid in the tubing or impeller chamber, the pump mechanism will be capable of self priming by using established techniques know in the arts by creating a low pressure area at the impeller chamber inlet thus causing washer fluid to be drawn into the pump.

The pump portion of the assembly could contain sensing capabilities to determine if fluid was present in the pump chamber. If fluid was not present there would be less pressure at the outlet of the impeller chamber. This lower pressure could be sensed by a pressure sensor. The pressure sensor could be electronic or mechanical in construction. An electronic sensor 825 could be employed such as the piezoresistive silicon pressure sensor Model number 1451-050G-T from Measurement Specialties, Inc., Sensor Division and Consumer Sales, 1000 Lucas Way, Hampton Va. 23666. Alternately a mechanical construction could be a spring loaded plunger that held a magnet. With sufficient pressure the magnet would be pressed into proximity with a magnetic reed switch. A closed switch would result from a higher level of pressure indicating that there was fluid present. An open switch would result from lower pressure and indicate the need to add fluid. An alternate sensing mechanism could be a spring load vane to sense fluid flow. Similar configurations using magnets and reed switches previously described could be used with this mechanism. A further alternate fluid sensing method employs dielectric sensor 696. (FIG. 44) When there is no fluid available the sensor will give an indication of a very low dielectric constant approaching 1 (air). The fact that the fluid level is low or that there is no fluid will be communicated to the vehicle operator via an indication such as a light or and audible tone or a text message displayed on an information center display.

FIG. 50 shows assembly 800 including the motor with integral washer pump further integrated with a washer fluid heater forming a wiper/washer/heater system. A section view is shown of heater coils 530 and 531 within control system 10. A fluid inlet 822 of system 10 accepts fluid from the washer fluid reservoir and directs it to pump chamber 545. An outlet 824 of pump chamber 545 directs fluid flow into heater reservoir 534 and heater coils 530 and 531. The heater coils 530 and 531 exit fluid into a fluid coupler 561 where it is dispensed through an outlet feature 563 in a cover 560 (FIG. 44). A fluid hose (FIGS. 16 and 21) carries heated fluid to the vehicle windshield. It is understood that the fluid coming from the assembly 800 could route fluid to spray nozzles mounted either on the wiper arms or remote to the wiper arms such as the hood of an automobile or on a cowling located at the base of a windshield.

Figure 48:
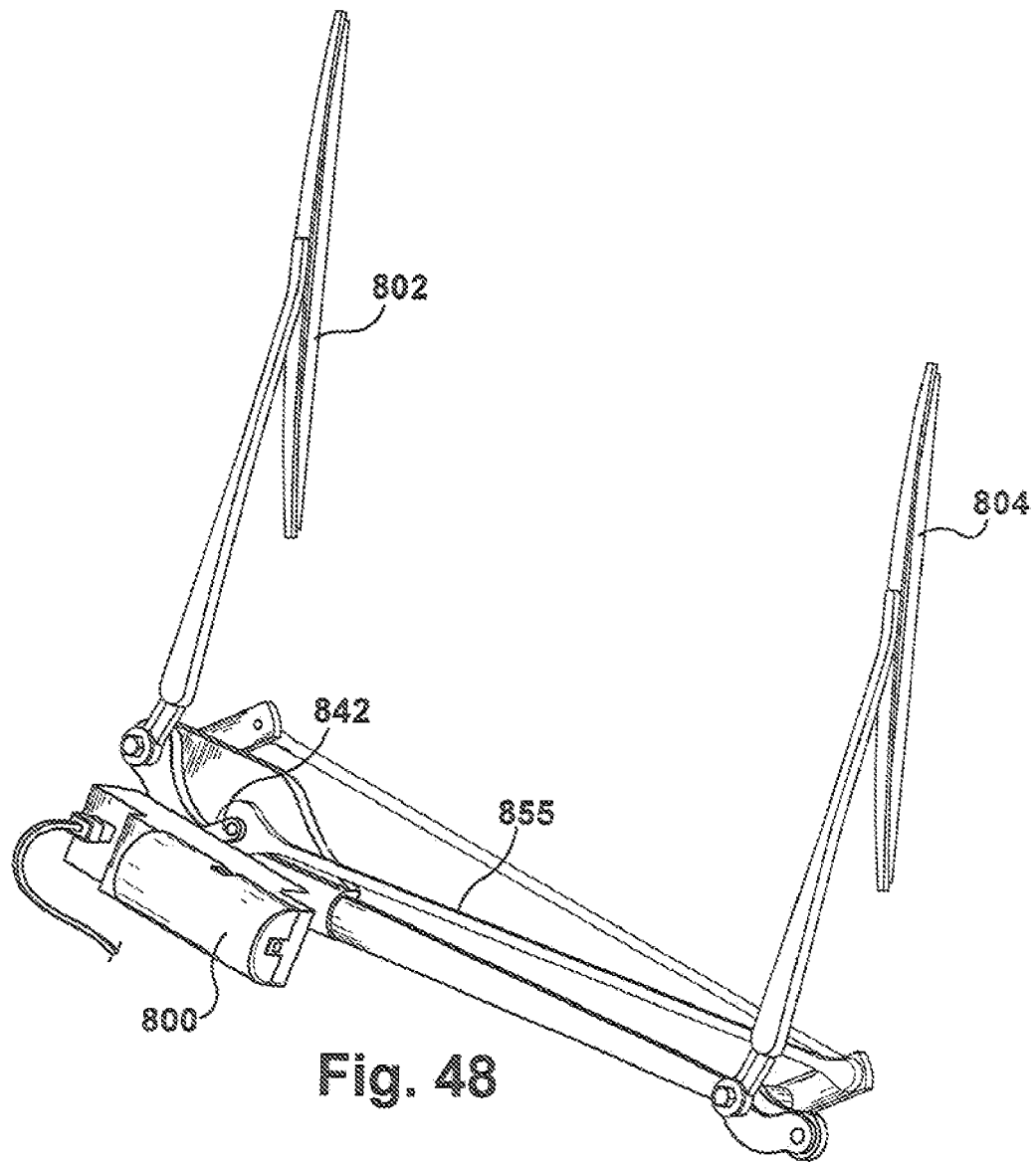
FIG. 48 shows a wiper drive assembly including a motor with integral washer pump further integrated with a washer fluid heater forming a wiper, washer, heater system.
Figure 51:
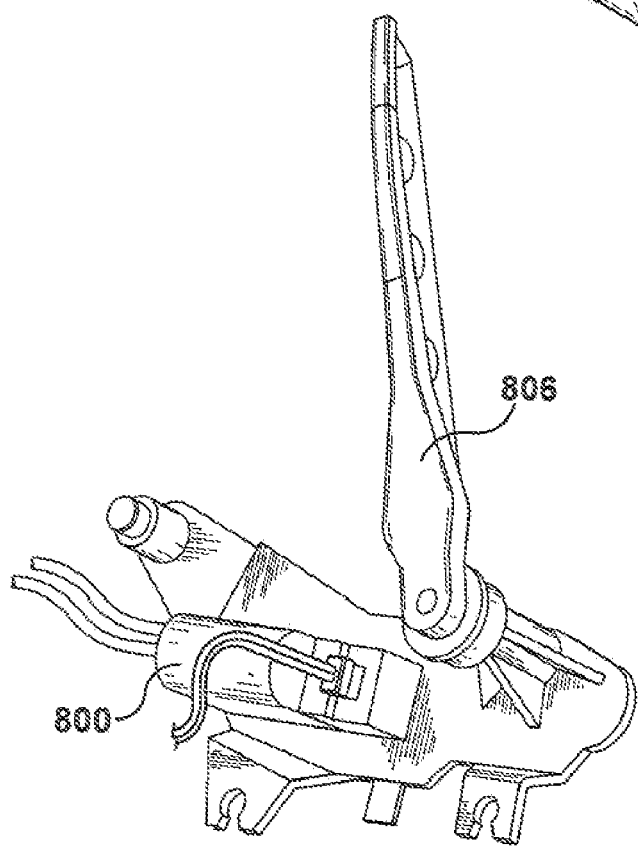
FIG. 51 shows a system similar to that described in FIG. 49 but for a single wiper arm such as what would be found on the rear window of an SUV or a minivan.

FIG. 51 shows a system similar to that described in FIG. 48 but for a single wiper arm 806 such as what would be found on the rear window of an SUV or a minivan. It is understood that various configuration are possible including having the control electronics mounted remote from the motor and heater. It is further understood that the control electronics could be integrated with the motor and pump assembly and the heater coils and reservoir could be located remote from said assembly.

While the invention has been described with a degree of particularity, it is the intent that the invention includes all modifications and alterations from the disclosed design falling within the spirit or scope of the appended claims.

The invention claimed is:

1. Apparatus for providing a heated cleaning fluid to a motor vehicle surface comprising:
   a) a heating vessel having a vessel interior and an inlet and outlet port, said vessel for heating fluid that passes from the inlet to the outlet through said vessel interior;
   b) a heater positioned within the heating vessel interior that is at least partially submerged within fluid in said vessel interior and comprises a heat conducting wall that defines a back and forth interior passageway for conducting heat to the fluid as the fluid moves from the inlet to the outlet port through the passageway;
   c) a user operated control for dispensing fluid onto the motor vehicle surface;
   d) a controller coupled to the user operated control comprising:
      i) an energizing component coupled to the heater for providing an energizing voltage to heat the heat conducting wall of the heater and thereby heat fluid passing through the interior passageway from the inlet to the outlet in response to user actuation of the user control, and
      ii) an integral wiper motor control for actuating a motor vehicle surface wiper as heated fluid is dispensed from the heating vessel in response to said user actuation.

2. The apparatus according to claim 1, wherein the controller has a controller housing and further wherein a wiper arm motor assembly is supported within the controller housing.

3. The apparatus according to claim 1, wherein a washer pump control is integrally housed with the controller.

4. The apparatus according to claim 1, wherein the controller comprises a controller housing and further comprising circuitry for communicating with vehicle components external to a controller housing.

5. The apparatus according to claim 1 comprising a housing supporting the controller and further wherein said housing supports a wiper arm assembly.

6. The apparatus of claim 1 wherein a single motor both pumps fluid through the vessel and provides motive power to drive the motor vehicle surfaces wiper.

\* \* \* \* \*